US007210150B2

(12) United States Patent
Urushihara et al.

(10) Patent No.: US 7,210,150 B2
(45) Date of Patent: Apr. 24, 2007

(54) OPTICAL DISK DRIVING APPARATUS CAPABLE OF DETECTING OVERLAPPED DISC INSERTION

(75) Inventors: Kenji Urushihara, Kanagawa (JP); Takanori Hayashi, Kanagawa (JP); Masakazu Kashikawa, Kanagawa (JP); Shoji Asakawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 680 days.

(21) Appl. No.: 10/675,013

(22) Filed: Sep. 30, 2003

(65) Prior Publication Data

US 2004/0062155 A1   Apr. 1, 2004

(30) Foreign Application Priority Data

Jun. 25, 2003   (JP) ............................. 2003-181294

(51) Int. Cl.
*G11B 17/04* (2006.01)
(52) U.S. Cl. ...................................... 720/620; 720/626
(58) Field of Classification Search ................ 720/626, 720/645, 624, 619, 623, 620
See application file for complete search history.

(56) References Cited

U.S. PATENT DOCUMENTS

| 5,038,337 | A | * | 8/1991 | Muramatsu et al. ......... 720/645 |
| 5,136,570 | A | * | 8/1992 | Takai et al. ................. 720/624 |
| 5,150,349 | A | * | 9/1992 | Takai et al. ................. 720/626 |
| 5,828,641 | A | * | 10/1998 | Abe et al. ................... 720/645 |
| 6,288,982 | B1 | * | 9/2001 | Kato ........................... 720/645 |
| 6,880,160 | B1 | * | 4/2005 | Lee et al. .................... 720/623 |
| 6,883,174 | B1 | * | 4/2005 | Kunze et al. ............... 720/626 |
| 6,963,519 | B2 | * | 11/2005 | Otsuki et al. ............... 720/626 |
| 6,990,673 | B2 | * | 1/2006 | Lee ............................. 720/623 |
| 2003/0103434 | A1 | * | 6/2003 | Kuo ............................ 720/626 |
| 2003/0231571 | A1 | * | 12/2003 | Kudara et al. .............. 720/626 |
| 2005/0088922 | A1 | * | 4/2005 | Urushihara et al. ........ 720/626 |

FOREIGN PATENT DOCUMENTS

JP     2000-163840   *  6/2000   ................. 720/626

* cited by examiner

*Primary Examiner*—Tan Dinh
(74) *Attorney, Agent, or Firm*—Pearne & Gordon LLP

(57) ABSTRACT

Herein disclosed is an optical disc driving apparatus 100, 200 for driving an optical disc while reading out information contained in the optical disc, the optical disc having an outer peripheral surface, comprising: a housing 101 formed with an loading slot having the optical disc passed therethrough; first detecting means 102 for performing a detection of the outer peripheral surface of the optical disc to be moved into the housing 101; and second detecting means 103 for performing a detection of the outer peripheral surface of the optical disc to be moved into the housing 101 after the detection of the outer peripheral surface of the optical disc is performed by the first detecting means 102; and judging means 104 for judging whether one optical disc or partially overlapped optical discs are passed through the loading slot 101a of the housing 101 based on results detected by the first and second detecting means 102 and 103.

52 Claims, 49 Drawing Sheets

OPTICAL DISK DRIVING APPARATUS CAPABLE OF DETECTING OVERLAPPED DISC INSERTION

BACKGROUND OF THE INVENTION

1. Technical Field of the Invention

The present invention relates to an optical disc driving apparatus, and more particularly to an optical disc driving apparatus to be installed in an automotive vehicle, and adapted to drive an optical disc such as for example a compact disc and a digital versatile disc while reading out information contained in the optical disc.

2. Description of the Related Art

Up until now, there have been provided a wide variety of optical disc driving apparatus of this type one typical example of which is disclosed in, for example, Japanese Patent Laying-Open Publication No. 2000-163840 and shown in FIG. 45.

The conventional optical disc driving apparatus 300 is shown in FIG. 45 as comprising a housing 301 formed with a loading slot having passed therethrough an optical disc "A" having an outer peripheral surface, a base plate 313 disposed in the vicinity of the loading slot of the housing 301, and an operation member 320 slidably supported by the base plate 313. The base plate 313 has formed therein first and second slots 313a and 313b respectively having a longitudinal central lines parallel to each other, while the operation member 320 is formed with first and second pins 320a and 320b to be slidable received by the first and second slots 313a and 313b of the base plate 313.

The housing 301 has a disc path on which the optical disc moves into and out of the housing 301, while the disc path extends inwardly from the loading slot of the housing 301 under the condition that the disc path is in parallel relationship with the longitudinal central line of the loading slot of the housing 301. The operation member 320 has a longitudinal end portion formed with a pin member 322 extending toward the disc path. The pin member 322 is movable between operational positions while being held in contact with the outer peripheral surface of the optical disc partially passed into the housing 301.

The conventional optical disc driving apparatus 300 further comprises urging member 321 for urging the longitudinal end portion of the operation member 320 toward the center plane of the housing 101. The operation member 320 has a hock portion held in engagement with one of end portions of the urging member 321, while the base plate 313 has a hock portion held in engagement with the other of the end portions of the urging member 321.

The conventional optical disc driving apparatus 300 further comprises first and second optical sensors 360 and 361 each for performing a detection of the optical disc "A" partially passed through the loading slot of the housing 301. The first and second optical sensors 360 and 361 are, as shown in FIG. 46, spaced apart from each other, and each disposed in the vicinity of the loading slot of the housing 301.

The first optical sensor 360 includes a light source 360a for projecting a light on a light path toward the disc path, and a light receiver 360b disposed on the light path of the light source 360a, and adapted to receive the projected light from the light source 360a through the disc path. The light receiver 360b is adapted to assume two different operational state consisting of a first operational state to receive the projected light from the light source 360a, and a second operational state to fail to receive the projected light from the light source 360a.

The first optical sensor 360 is adapted to produce a first signal indicative of the first operational state of the light receiver 360b thereof when the projected light is received by the light receiver 360b thereof without being intercepted by the optical disc "A" partially passed through the loading slot of the housing 301. On the other hand, the first optical sensor 360 is adapted to produce a second signal indicative of the second operational state of the light receiver 360b thereof when the projected light is intercepted by the optical disc "A" partially passed through the loading slot of the housing 301 without being received by the light receiver 360b thereof.

In a similar fashion, the second optical sensor 361 includes a light source 361a for projecting a light on a light path toward the disc path, and a light receiver 361b disposed on the light path of the light source 361a, and adapted to receive the projected light from the light source 361a through the disc path. The light receiver 361b is adapted to assume two different operational state consisting of a first operational state to receive the projected light from the light source 361a, and a second operational state to fail to receive the projected light from the light source 361a in response to the optical disc "A" partially passed through the loading slot of the housing 301.

The second optical sensor 361 is adapted to produce a first signal indicative of the first operational state of the light receiver 361b thereof when the projected light is received by the light receiver 361b thereof without being intercepted by the optical disc "A" partially passed through the loading slot of the housing 301. On the other hand, the second optical sensor 361 is adapted to produce a second signal indicative of the second operational state of the light receiver 361b thereof when the projected light is intercepted by the optical disc "A" partially passed through the loading slot of the housing 301 without being received by the light receiver 361b thereof.

In the operation of the conventional optical disc driving apparatus 300 thus constructed as previously mentioned, the lights respectively projected by the light sources 360b to 362b of the first to third optical sensors 360 to 362 are firstly respectively received by the light receivers 360a to 362a in association with the light sources 360b to 362b of the first to third optical sensors 360 to 362 when the optical disc "A" is not inserted into the loading slot of the housing 301 of the optical disc driving apparatus 300. The first signals "Lo" indicative of the first operational state of the light receivers 360a to 362a of the first to third optical sensors 360 to 362 are respectively produced by the first to third optical sensors 360 to 362 when the optical disc "A" is not inserted into the loading slot of the housing 301 of the optical disc driving apparatus 300.

When the optical disc "A" is partially passed through the loading slot of the housing 301 of the optical disc driving apparatus 300, the light projected by the light source 361b of the second optical sensor 361 is intercepted by the outer peripheral portion of the optical disc "A" partially passed through the loading slot of the housing 301 without being received by the light receiver 361a of the second optical sensor 361. On the other hand, the lights respectively projected by the light sources 360b and 362b of the first and third optical sensors 360 and 362 are respectively received by the light receivers 360a and 362a of the first and third optical sensors 360 and 362 without being intercepted by the outer peripheral portion of the optical disc "A" partially passed through the loading slot of the housing 301.

The judgment is firstly made as the optical disc "A" is moved to the position "A2" based on results produced by the first to third optical sensors 360 and 362. The conveying means 306 is operated to perform the conveyance of the optical disc in such a manner that the optical disc "A" partially passed through the loading slot of the housing 301 is moved in the loading direction 13 along the disc path while being held in contact with a surface of a roller member 365 of the conveying means 306.

When the optical disc "A" is further moved in the loading direction 13 along the disc path (see FIG. 47), the lights projected by the light sources 360*b* to 362*b* of the first to third optical sensors 360 to 362 are intercepted by the outer peripheral portion of the optical disc "A" further moved in the loading direction 13 along the disc path without being received by the light receivers 360*a* to 362*a* of the first to third optical sensors 360 to 362. The second signals "Hi" indicative of the second operational state of the light receivers 360*a* to 362*a* of the first to third optical sensors 360 to 362 are respectively produced by the first to third optical sensors 360 to 362. The judgment is made as the optical disc "A" is moved to the position "A3" based on results produced by the first to third optical sensors 360 to 362.

The pin member 322 of the second detecting means 303 is moved toward one of the operational positions of the operation member 320 from the other of the operational positions of the operation member 320 while being held in contact with the outer peripheral surface of the optical disc "A" to be further moved in the loading direction 13 toward the position "A4" from the position "A3".

If one of partially overlapped two optical discs "A and B" are moved into the loading slot of the housing 301 of the optical disc driving apparatus 300, the light projected by the light source 361*b* of the second optical sensor 361 is intercepted by the outer peripheral portion of one of the optical discs "A and B" partially passed through the loading slot of the housing 301 without being received by the light receiver 361*a* of the second optical sensor 361. On the other hand, the lights respectively projected by the light sources 360*b* and 362*b* of the first and third optical sensors 360 and 362 are respectively received by the light receivers 360*a* and 362*a* of the first and third optical sensors 360 and 362 without being intercepted by the outer peripheral portion of one of the optical discs "A and B" partially passed through the loading slot of the housing 301.

The judgment is firstly made as the optical disc "A" is partially inserted into the loading slot of the housing 301 based on results produced by the first to third optical sensors 360 and 362. The conveying means 306 is operated to perform the conveyance of the optical disc in such a manner that the optical disc "A" partially inserted into the loading slot of the housing 301 is moved in the loading direction 13 along the disc path.

When the optical discs "A and B" partially overlapped with each other are further moved in the loading direction 13 along the disc path (see FIG. 48), the lights projected by the light sources 361*b* and 362*b* of the second to third optical sensors 361 and 362 are intercepted by the optical discs "A and B" partially overlapped with each without being received by the light receivers 361*a* to 362*a* of the second to third optical sensors 361 to 362. On the other hand, the lights projected by the light source 360*b* of the first optical sensor 360 is received by the light receiver 360*a* of the first optical sensor 360 after being intercepted by one of the optical discs "A and B" partially overlapped with each. The lights projected by the light source 360*b* of the first optical sensor 360 is intercepted by the other of the optical discs "A and B" partially overlapped with each after being received by the light receiver 360*a* of the first optical sensor 360.

The judgment is firstly made whether or not one optical disc "A" or two optical discs "A and B" are inserted into the loading slot of the housing 301 based on results produced by the first to third optical sensors 360 and 362. The conveying means 306 is operated to perform the conveyance of the optical disc in such a manner that the optical disc "A" partially inserted into the loading slot of the housing 301 is moved in the loading direction 13 along the disc path. If the judgment is made as the optical discs "A and B" are inserted into the loading slot of the housing 301 based on results produced by the first to third optical sensors 360 and 362, the conveying means 306 is operated to perform the conveyance of the optical disc in such a manner that the optical discs "A and B" partially overlapped with each other are move out of the loading direction 13 along the disc path.

The conventional optical disc driving apparatus constructed as previously mentioned, however, encounters such a problem that almost overlapped and entirely overlapped optical discs "A and B" tends to be moved into the housing without being interrupted the optical discs "A and B" almost overlapped with each other are inserted into the loading slot of the housing.

SUMMARY OF THE INVENTION

It is, therefore, an object of the present invention to provide an optical disc driving apparatus which can prevent partially or entirely overlapped optical discs from being moved into the housing.

It is an another object of the present invention to provide an optical disc driving apparatus which can be inexpensive in production cost.

According to the first aspect of the present invention, there is provided an optical disc driving apparatus for driving an optical disc while reading out information contained in the optical disc, the optical disc having an outer peripheral surface, comprising: a housing formed with a loading slot having the optical disc passed therethrough; first detecting means for performing a detection of the outer peripheral surface of the optical disc to be moved into the housing; and second detecting means for performing a detection of the outer peripheral surface of the optical disc to be moved into the housing after the detection of the outer peripheral surface of the optical disc is performed by the first detecting means; and judging means for judging whether one optical disc or partially overlapped optical discs are passed through the loading slot of the housing based on results detected by the first and second detecting means.

The first detecting means may include a pivotal member pivotably movable between angular positions thereof while being held in contact with the outer peripheral surface of the optical disc to be moved into the housing, and a detecting device for detecting the angular positions of the pivotal member. The second detecting means may include an operation member accommodated in the housing in spaced relationship with the pivotal member of the first detecting means to be movable between operational positions thereof while being held in contact with the outer peripheral surface of the optical disc to be moved into the housing, a pivotal member to be pivotably movable between angular positions thereof in association with the operational positions of the operation member while being held in contact with the operation member, and a detecting device for detecting the angular positions of the pivotal member.

The detecting device of the first detecting means may be constituted by an optical sensor including a light source for projecting a light on a light path thereof, and a light receiver disposed on the light path of the light source. The light receiver may be adapted to receive the projected light from the light source. The pivotal member of the first detecting means may have a projected portion for having the optical sensor perform the detection of the pivotal member by intervening between the light source and the light receiver of the optical sensor. The pivotal member of the first detecting means may be operative to assume two different operational states consisting of a first operational state to have the light receiver of the optical sensor receive the projected light from the light source of the optical sensor, the optical sensor being operative to produce a first signal indicative of the first operational state of the pivotal member of the first detecting means when the projected light is received from the light source by the light receiver without being intercepted by the projected portion of the pivotal member, and a second operational state to have the light receiver of the optical sensor fail to receive the projected light from the light source of the optical sensor. The optical sensor may be operative to produce a second signal indicative of the second operational state of the pivotal member of the first detecting means when the projected light is intercepted by the projected portion of the pivotal member without being received by the light receiver.

The detecting device of the second detecting means may be constituted by an optical sensor including a light source for projecting a light on a light path thereof, and a light receiver disposed on the light path of the light source. The light receiver may be adapted to receive the projected light from the light source. The pivotal member of the second detecting means may have a projected portion for having the optical sensor perform the detection of the pivotal member by intervening between the light source and the light receiver of the optical sensor. The pivotal member of the second detecting means may be operative to assume two different operational states consisting of a first operational state to have the light receiver of the optical sensor receive the projected light from the light source of the optical sensor, and a second operational state to have the light receiver of the optical sensor fail to receive the projected light from the light source of the optical sensor. The optical sensor may be operative to produce a first signal indicative of the first operational state of the pivotal member of the second detecting means when the projected light is received from the light source by the light receiver without being intercepted by the projected portion of the pivotal member. The optical sensor may be operative to produce a second signal indicative of the second operational state of the pivotal member of the second detecting means when the projected light is intercepted by the projected portion of the pivotal member without being received by the light receiver.

The optical disc driving apparatus may further comprise third detecting means for performing a detection of the optical disc partially passed through the loading slot of the housing along the disc path, conveying means for performing a conveyance of the optical disc along the imaginary disc path, and controlling means for controlling the conveying means to have the conveying means perform the conveyance of the optical disc along the imaginary disc path in response to results judged by the judging means and results detected by the third detecting means.

The third detecting means may be constituted by a plurality of optical sensors each includes a light source for projecting a light toward the imaginary disc path on a light path thereof, and a light receiver disposed on the light path of the light source. The light receiver of each of the optical sensors may be adapted to receive the projected light from the light source in association with the light receiver of each of the optical sensors through the imaginary disc path. The light receiver may be operative to assume two different operational states consisting of a first operational state to receive the projected light from the light source in association with the light receiver without being intercepted by the optical disc partially passed through the loading slot of the housing, a second operational state to fail to receive the projected light from the light source in association with the light receiver in response to the optical disc partially passed through the loading slot of the housing. The optical sensors of the third detecting means each may be operative to produce a first signal indicative of the first operational state of the light receiver thereof when the projected light is received by the light receiver thereof without being intercepted by the optical disc partially passed through the loading slot of the housing, and to produce a second signal indicative of the second operational state of the light receiver thereof when the projected light is intercepted by the optical disc partially passed through the loading slot of the housing without being received by the light receiver thereof.

The conveying means may include a driving motor for producing a rotation torque, and a roller member rotatable around a rotation axis thereof. The roller member may have a surface to be brought into contact with a surface of the optical disc. The controlling means may be operative to control the conveying means to have the roller member of the conveying means rotatably moved around the rotation axis thereof in response to the rotation torque produced by the driving motor of the conveying means under the condition that the judgment is made by the judging means as the optical disc is passed through the loading slot of the housing based on results judged by the judging means.

The controlling means may be operative to control the conveying means to allow the driving motor to stop producing the rotation torque under the condition that the judgment is made by the judging means as the partially overlapped optical discs are passed through the loading slot of the housing based on results detected by the first and second detecting means.

The controlling means may be operative to control the conveying means to have the conveying means stop performing the conveyance of the partially overlapped optical discs in a loading direction before having the conveying means perform the conveyance of the partially overlapped optical discs in an ejection direction opposite to the loading direction under the condition that the judgment is made by the judging means as the partially overlapped optical discs are passed through the loading slot of the housing based on results detected by the first and second detecting means.

The pivotal member of the first detecting means may be operative to push the optical disc toward a specific position on which the information contained in the optical disc is read out after the conveyance of the optical disc to be moved into the housing is performed by the conveying means. The judging means may be operative to judge whether or not the conveyance of the optical disc to be moved into the housing is complete by the conveying means based on results detected by the second detecting means.

The first detecting means may include a pivotal member pivotably movable around a pivotal axis thereof while being held in contact with the outer peripheral surface of the optical disc to be moved into the housing, and a detecting device for performing a detection of the pivotal member. The second detecting means may include an operation member accommodated in the housing in spaced relationship with the pivotal member of the first detecting means to be movable between operational positions thereof while being held in contact with the outer peripheral surface of the optical disc to be moved into the housing, a first pivotal member to be pivotably movable around a pivotal axis thereof while being held in contact with the operation member, a second pivotal member pivotably movable around the pivotal axis of the first pivotal member after the pivotal member of the first detecting means is brought into contact with the outer peripheral surface of the optical disc to be moved into the housing, an urging member for resiliently urging the second pivotal member toward the first pivotal member, and a detecting device for performing a detection of the second pivotal member.

The detecting device of the second detecting means may be constituted by an optical sensor including a light source for projecting a light on a light path thereof, and a light receiver disposed on the light path of the light source. The light receiver may be adapted to receive the projected light from the light source. The second pivotal member of the second detecting means may have a projected portion for having the optical sensor perform the detection of the second pivotal member by intervening between the light source and the light receiver of the optical sensor. The second pivotal member of the second detecting means may be operative to assume two different operational states consisting of a first operational state to have the light receiver of the optical sensor receive the projected light from the light source of the optical sensor, and a second operational state to have the light receiver of the optical sensor fail to receive the projected light from the light source of the optical sensor. The optical sensor may be operative to produce a first signal indicative of the first operational state of the second pivotal member of the second detecting means when the projected light is received from the light source by the light receiver without being intercepted by the project portion of the second pivotal member. The optical sensor may be operative to produce a second signal indicative of the second operational state of the second pivotal member of the second detecting means when the projected light is intercepted by the project portion of the second pivotal member without being received by the light receiver.

The pivotal member may be adapted to assume two different operational states consisting of a first operational state to be held in engagement with the second pivotal member of the second detecting means without being brought into contact with the outer peripheral surface of the optical disc to be moved into the housing under the condition that the second signal is produced by the detecting device of the second detecting means, and a second operational state to be held in disengagement with the second pivotal member of the second detecting means while being brought into contact with the outer peripheral surface of the optical disc to be moved into the housing under the condition that the first signal is produced by the detecting device of the second detecting means.

The controlling means may be operative to control the conveying means to allow the driving motor of the conveying means to stop producing the rotation torque under the condition that the judgment is made by the judging means as the optical disc partially passed through the loading slot of the housing is ejected from the loading slot of the housing based on results detected by the first and second detecting means.

The optical disc driving apparatus as set forth in claim may further comprise regulating means for allowing the optical disc to be moved into and out of the housing on the imaginary disc path while preventing the optical disc from being movable toward and away from the imaginary disc path.

The regulating means may include a base member retained by the housing, a first member supported by the base member, and second members each movable toward and away from the first member. The second members may respectively have lever portions each having first surface to be brought into contact with a peripheral edge of the optical disc to be moved into and out of the housing. The lever portions of the second members each may have second surface extending outwardly from longitudinally outer end of the first surface thereof. The first member of the regulating means may have longitudinal end portions and a central plate portion intervening between the longitudinal end portions. The longitudinal end portions of the first member each may have a first surface on which the optical disc to be moved into and out of the housing is rested under the condition that the peripheral edge of the optical disc is brought into contact with the first surface of each of the longitudinal end portions of the first member. The longitudinal end portions of the first member each may have a second surface on which the lever portion of the second member is rested under the condition that the second surfaces of the lever portions of the second members are respectively brought into contact with the second surfaces of the longitudinal end portions of the first member.

The optical disc driving apparatus may further comprise urging means for resiliently urging each of the second members of the regulating means in the second direction.

The first surfaces of the longitudinal end portions of the first member of the regulating means each may be inclined with respect to the imaginary disc path at a predetermined first inclination angle. The first lower surfaces of the lever portions of the second members each may be inclined with respect to the imaginary disc path at a predetermined second inclination angle.

The first surfaces of the longitudinal end portions of the first member and the first lower surfaces of the lever portions of the second members may form in combination an imaginary passageway in the form of a rectangle shape in cross-section taken along the imaginary disc path. The imaginary passageway may have the optical disc passed therethrough on the imaginary disc path. The imaginary passageway may have first and second imaginary surfaces each parallel to the imaginary disc path, and upright imaginary surfaces respectively equally spaced apart from the upright surfaces of the longitudinal end portions of the first member. The imaginary passageway may have first peripheral imaginary edges respectively held in contact with the first lower surfaces of the lever portions of the second members. The imaginary passageway may have second peripheral imaginary edges respectively held in contact with the first surfaces of the longitudinal end portions of the first member. The upright imaginary surfaces of the imaginary passageway may be in spaced relationship with each other at a distance equal to a diameter of the optical disc to be moved into and out of the housing. The first and second imaginary surfaces of the imaginary passageway may be in spaced relationship with each other at a distance larger in length than a thickness of the optical disc to be moved into and out of the housing, and smaller in length than twice of the thickness of the optical disc to be moved into and out of the housing.

The upright surfaces of the longitudinal ends portions of the first member of the regulating means may constitute in combination guiding means for allowing the optical disc to be moved into and out of the housing on the imaginary disc path while preventing the optical disc from being moved in third and fourth directions each perpendicular to the imaginary center plane of the housing, and each parallel to the imaginary disc path.

The urging means may be adapted to assume two different operational states consisting of a first operational state to resiliently urging each of the second members of the regulating means in the second direction with a first resilient force thereof under the condition that the conveyance of the optical disc to be moved in the loading direction is performed by the conveying means, and a second operational state to resiliently urging each of the second members of the regulating means in the second direction with a second resilient force thereof which is smaller than the first resilient force under the condition that the conveyance of the optical disc to be moved in the ejection direction opposite to the loading direction is performed by the conveying means. The optical disc driving apparatus may further comprise setting means for having the urging means selectively assume the first and second operational states in response to results judged by the judging means.

The first surfaces of the longitudinal end portions of the first member may be collectively adapted to bring the surface of the optical disc into contact with the surface of the roller member of the conveying means before failing to bring the surface of the optical disc into contact with each of the first lower surfaces of the second members of the regulating means under the condition that the conveyance of the one optical disc to be moved in the loading direction is performed by the conveying means. The first surfaces of the longitudinal end portions of the first member may be collectively adapted to bring the surface of the partially overlapped optical discs into contact with the surface of the roller member of the conveying means before bring the surface of the partially overlapped optical discs into contact with each of the first lower surfaces of the second members of the regulating means under the condition that the conveyance of the partially overlapped optical discs to be moved in the loading direction is performed by the conveying means.

The roller member of the conveying means may be supported by the base member of the regulating means to be movable toward and away from the imaginary disc path. The regulating means may include third members collectively for preventing the roller member of the conveying means from being moved in the first direction the third members each supported by the base member of the regulating means to be movable toward and away from the imaginary disc path. The urging means is adapted to resiliently urge each of the third members of the regulating means in the second direction.

The roller member of the conveying means may include supporting members for rotatably supporting the roller member. The supporting members respectively having outer surfaces. The third members of the regulating means may respectively have projected portions respectively having surfaces to be brought into contact with the outer surfaces of the supporting members. The first surfaces of the longitudinal end portions of the first member of the regulating means may be adapted to fail to bring the outer surfaces of the supporting members of the conveying means into contact with the surfaces of the third members of the regulating means with the surface of the one optical disc brought into contact with the surface of the roller member of the conveying means under the condition that the conveyance of the one optical disc to be moved in the loading direction is performed by the conveying means. The first surfaces of the longitudinal end portions of the first member of the regulating means may be adapted to bring the outer surfaces of the supporting members of the conveying means into contact with the surfaces and of the third members of the regulating means with the surface of the partially overlapped optical discs brought into contact with the surface of the roller member of the conveying means under the condition that the conveyance of the partially overlapped optical discs to be moved in the loading direction is performed by the conveying means.

The lower surface of one of the third members of the regulating means and the outer surface of one of the supporting members of the conveying means may form in combination a first gap between the lower surface of one of the third members of the regulating means and the outer surface of one of the supporting members of the conveying means under the condition that the surface of the roller member of the conveying means is brought into contact with the surface of the one optical disc to be moved into the housing. The first surfaces of the longitudinal end portions of the first member of the regulating means may be brought into contact with the peripheral edge of the one optical disc to be moved into the housing. The surface of the other of the third members of the regulating means and the outer surface of the other of the supporting member of the conveying means may form in combination a second gap between the surface of the other of the third members of the regulating means and the outer surface of the other of the supporting members of the conveying means under the condition that the surface of the roller member of the conveying means is brought into contact with the surface of the one optical disc to be moved into the housing, and the first surfaces of the longitudinal end portions of the first member of the regulating means being brought into contact with the peripheral edge of the one optical disc to be moved into the housing. The first gap between the lower surface of one of the third members of the regulating means and the outer surface of one of the supporting members of the conveying means may be smaller than the thickness of the one optical disc to be moved into and out of the housing. The second gap between the surface of the other of the third members of the regulating means and the outer surface of the other of the supporting members of the conveying means may be smaller than the thickness of the one optical disc to be moved into and out of the housing.

The second members of the regulating means may be disposed in spaced relationship with the loading slot of the housing. The roller member of the conveying means may be disposed between the second member of the regulating means and the loading slot of the housing. The first surfaces of the lever portions of the second members of the regulating means and the first and upright surfaces of one of the longitudinal end portions of the first member of the regulating means may form in combination grooves each having the outer peripheral portion of the one optical disc passed therethrough. The optical disc may be released from the roller member of the conveying means without being held in contact with the surface of the roller member of the conveying means after the peripheral portion of the optical disc is passed through each of the grooves under the condition that the conveyance of the optical disc to be moved in the loading direction is performed by the conveying means.

The urging means may be adapted to assume two different operational states consisting of a first operational state to resiliently urging each of the third members of the regulating means in the second direction with a first resilient force thereof under the condition that the conveyance of the optical disc to be moved in the loading direction is performed by the conveying means, and a second operational state to resiliently urging each of the third members of the regulating means in the second direction with a second resilient force thereof which is smaller than the first resilient force under the condition that the conveyance of the optical disc to be moved in the ejection direction opposite to the loading direction is performed by the conveying means. The optical disc driving apparatus may further comprise setting means for having the urging means selectively assume the first and second operational states in response to results judged by the judging means.

The urging means may constituted by first and second urging members. The first urging member may be adapted to resiliently urge both one of the second members of the regulating means and one of the third members of the regulating means in the second direction. The second urging member may be adapted to resiliently urge both the other of the second members of the regulating means and the other of the third members of the regulating means in the second direction.

The first urging member of the urging means may have a plate portion, and first and second lever portions respectively having a first free end held in engagement with one of the second members of the regulating means, and a second free end held in engagement with one of the third members of the regulating means. The first and second lever portions forming part of the first urging member may respectively have first and second fix ends each integrally formed with the plate portion forming part of the first urging member. The second urging member of the urging means may have a plate portion, and first and second lever portions respectively having a first free end held in engagement with the other of the second members of the regulating means, and a second free end held in engagement with the other of the third members of the regulating means. The first and second lever portions forming part of the second urging member may respectively have first and second fix ends each integrally formed with the plate portion forming part of the second urging member.

The setting means may include first and second base members each supported by the housing, and first and second cam members respectively slidably supported by the first and second base members each to be movable between first and second operational positions in association with the first and second operational states of the first and second urging members of the urging means.

The controlling means may be adapted to control the first and second cam members of the setting means to have the first and second cam members of the setting means selectively assume the first and second operational positions based on results judged by the judging means.

The controlling means may be adapted to control the first and second cam members of the setting means to have each of the first and second cam members of the setting means assume the first operational position when the conveyance of the optical disc to be moved in the loading direction is performed by the conveying means. The controlling means may be adapted to control the roller member of the conveying means to have the roller member of the conveying means stop performing the conveyance of the optical disc when the judgment is made by the judging means as the conveyance of the optical disc to be moved into the housing is complete based on results judged by the judging means.

The controlling means may be adapted to control the first and second cam members of the setting means to have each of the first and second cam members of the setting means assume the second operational position before controlling the roller member of the conveying means to have the roller member of the conveying means perform the conveyance of the optical disc to be moved in the ejection direction.

The regulating means may include a base member retained by the housing, a first member supported by the base member, and at least one second member movable toward and away from the first member. The second member may have a first surface to be brought into contact with one of peripheral edges of the optical disc to be moved into and out of the housing, and a second surface extending outwardly from longitudinally outer end of the first surface thereof. The first member of the regulating means may have longitudinal end portions each having a first surface on which the optical disc to be moved into and out of the housing is rested under the condition that one of the peripheral edges of the optical disc is brought into contact with the first surface of each of the longitudinal end portions of the first member. The longitudinal end portions of the first member each may have a second surface on which the second member is rested under the condition that the second surface of the lever portion of the second member is brought into contact with one of the second surfaces of the longitudinal end portions of the first member.

The optical disc driving apparatus may further comprise urging means for resiliently urging the second member of the regulating means toward the imaginary disc path.

The first surface of each of the longitudinal end portions of the first member of the regulating means may be inclined with respect to the imaginary disc path at a predetermined first inclination angle. The first surface of the second member may be inclined with respect to the imaginary disc path at a predetermined second inclination angle.

The first surface of each of the longitudinal end portions of the first member and the first surface of the second member may form in combination an imaginary passageway in the form of a rectangle shape in cross-section taken along the imaginary disc path. The imaginary passageway may have the optical disc passed therethrough on the imaginary disc path. The imaginary passageway may have first and second imaginary surfaces each parallel to the imaginary disc path, and third and fourth imaginary surfaces each parallel to the center plane of the housing. The first surface of the second member may be held in contact with one of the longitudinal extreme ends of one of the first and second imaginary surfaces of the imaginary passageway. The first surfaces of the longitudinal end portions of the first member may be respectively held in contact with the longitudinal extreme ends of the other of the first and second imaginary surfaces of the imaginary passageway. The third and fourth imaginary surfaces of the imaginary passageway may be in spaced relationship with each other at a first distance equal to a diameter of the optical disc to be moved into and out of the housing. The first and second imaginary surfaces of the imaginary passageway may be in spaced relationship with each other at a second distance larger in length than a thickness of the optical disc to be moved into and out of the housing, and smaller in length than twice of the thickness of the optical disc to be moved into and out of the housing.

The third and fourth surfaces of the longitudinal ends portions of the first member of the regulating means may constitute in combination guiding means for allowing the optical disc to be moved into and out of the housing on the imaginary disc path while preventing the optical disc from being moved in third and fourth directions each perpendicular to the imaginary center plane of the housing, and each parallel to the imaginary disc path.

The urging means may be adapted to assume two different operational states consisting of a first operational state to resiliently urging the second member of the regulating means toward the imaginary disc path with a first resilient force thereof under the condition that the conveyance of the optical disc to be moved in the loading direction is performed by the conveying means, and a second operational state to resiliently urging the second member of the regulating means toward the imaginary disc path with a second resilient force thereof which is smaller than the first resilient force under the condition that the conveyance of the optical disc to be moved in the ejection direction opposite to the loading direction is performed by the conveying means. The optical disc driving apparatus may further comprise setting means for having the urging means selectively assume the first and second operational states in response to results judged by the judging means.

The second member of the regulating means may be in spaced relationship with the loading slot of the housing. The roller member of the conveying means may be disposed between the second member of the regulating means and the loading slot of the housing.

The roller member of the conveying means may be supported by the base member of the regulating means to be movable toward and away from the imaginary disc path. The regulating means may include at least one third member for preventing the roller member of the conveying means from being movable toward and away the imaginary disc path. The third member may be supported by the base member of the regulating means to be movable toward and away from the imaginary disc path. The urging means may be adapted to resiliently urge the third member of the regulating means toward the imaginary disc path.

The roller member of the conveying means may include supporting members for rotatably supporting the roller member, the supporting members respectively having outer surfaces. The third member of the regulating means may respectively have projected portion having a surface to be brought into contact with the outer surface of the supporting members. The first surfaces of the longitudinal end portions of the first member of the regulating means may be adapted to fail to bring the outer surfaces of the supporting members of the conveying means into contact with the surface of the third member of the regulating means with the surface of the one optical disc brought into contact with the surface of the roller member of the conveying means under the condition that the conveyance of the one optical disc to be moved in the loading direction is performed by the conveying means. The first surfaces of the longitudinal end portions of the first member of the regulating means may be adapted to bring the outer surfaces of the supporting members of the conveying means into contact with the surface of the third member of the regulating means with the surface of the partially overlapped optical discs brought into contact with the surface of the roller member of the conveying means under the condition that the conveyance of the partially overlapped optical discs to be moved in the loading direction is performed by the conveying means.

The surface of the third member of the regulating means and the outer surface of one of the supporting members of the conveying means may form in combination a first gap between the surface of the third member of the regulating means and the outer surface of one of the supporting members of the conveying means under the condition that the surface of the roller member of the conveying means is brought into contact with the surface of the one optical disc to be moved into the housing, and the first surfaces of the longitudinal end portions of the first member of the regulating means being brought into contact with the peripheral edge of the one optical disc to be moved into the housing. The first gap between the surface of the third member of the regulating means and the outer surface of one of the supporting members of the conveying means may be smaller than the thickness of the one optical disc to be moved into and out of the housing.

The second member of the regulating means may be disposed in spaced relationship with the loading slot of the housing. The roller member of the conveying means may be disposed between the second member of the regulating means and the loading slot of the housing. The first surface of the lever portion of the second member of the regulating means and the first and upright surfaces of one of the longitudinal end portions of the first member of the regulating means may form in combination a groove having the outer peripheral portion of the one optical disc passed therethrough. The optical disc may be released from the roller member of the conveying means without being held in contact with the surface of the roller member of the conveying means after the peripheral portion of the optical disc is passed through the groove under the condition that the conveyance of the optical disc to be moved in the loading direction is performed by the conveying means.

The urging means may be adapted to assume two different operational states consisting of a first operational state to resiliently urging the third member of the regulating means toward the imaginary disc path with a first resilient force thereof under the condition that the conveyance of the optical disc to be moved in the loading direction is performed by the conveying means, and a second operational state to resiliently urging the third member of the regulating means toward the imaginary disc path with a second resilient force thereof which is smaller than the first resilient force under the condition that the conveyance of the optical disc to be moved in the ejection direction opposite to the loading direction is performed by the conveying means. The optical disc driving apparatus may further comprise setting means for having the urging means selectively assume the first and second operational states in response to results judged by the judging means.

The urging means may be constituted by at least one urging member. The urging member may be adapted to resiliently urge both the second member of the regulating means and the third member of the regulating means toward the imaginary disc path.

The urging member of the urging means may have a plate portion, and first and second lever portions respectively having a first free end held in engagement with the second member of the regulating means, and a second free end held in engagement with the third member of the regulating means. The first and second lever portions forming part of the urging member may respectively have first and second fix ends each integrally formed with the plate portion forming part of the urging member.

The setting means may include at least one base member supported by the housing, and at least one cam member slidably supported by the base member to be movable between first and second operational positions in association with the first and second operational states of the urging member of the urging means.

The controlling means may be adapted to control the cam member of the setting means to have the cam members of the setting means selectively assume the first and second operational positions based on results judged by the judging means.

The controlling means may be adapted to control the cam member of the setting means to have the cam member of the setting means assume the first operational position when the conveyance of the optical disc to be moved in the loading direction is performed by the conveying means. The conveying means may be adapted to perform the conveyance of the optical disc to be moved in the loading direction. The controlling means may be adapted to control the roller member of the conveying means to have the roller member of the conveying means stop performing the conveyance of the optical disc when the judgment is made by the judging means as the conveyance of the optical disc to be moved into the housing is complete within the specific time interval by the conveying means based on results judged by the judging means.

The controlling means may be adapted to control the cam member of the setting means to have the cam member of the setting means assume the second operational position before controlling the roller member of the conveying means to have the roller member of the conveying means perform the conveyance of the optical disc to be moved in the ejection direction.

According to the second aspect of the present invention, there is provided an electronic apparatus for reproducing information contained in an optical disc having an outer peripheral surface comprising a casing and An optical disc driving apparatus accommodated by the casing, the optical disc driving apparatus for driving an optical disc while reading out information contained in the optical disc, including: a housing formed with a loading slot having the optical disc passed therethrough; first detecting means for performing a detection of the outer peripheral surface of the optical disc to be moved into the housing; and second detecting means for performing a detection of the outer peripheral surface of the optical disc to be moved into the housing after the detection of the outer peripheral surface of the optical disc is performed by the first detecting means; and judging means for judging whether one optical disc or partially overlapped optical discs are passed through the loading slot of the housing based on results detected by the first and second detecting means.

According to the third aspect of the present invention, there is provided a vehicular electronic apparatus for reproducing information contained in an optical disc having an outer peripheral surface comprising a casing and an optical disc driving apparatus accommodated by the casing, the optical disc driving apparatus for driving an optical disc while reading out information contained in the optical disc, including: a housing formed with a loading slot having the optical disc passed therethrough; first detecting means for performing a detection of the outer peripheral surface of the optical disc to be moved into the housing; and second detecting means for performing a detection of the outer peripheral surface of the optical disc to be moved into the housing after the detection of the outer peripheral surface of the optical disc is performed by the first detecting means; and judging means for judging whether one optical disc or partially overlapped optical discs are passed through the loading slot of the housing based on results detected by the first and second detecting means.

BRIEF DESCRIPTION OF THE DRAWINGS

The features and advantages of an optical disc driving apparatus according to the present invention will be more clearly understood from the following description taken in conjunction with the accompanying drawings in which.

DESCRIPTION OF THE EMBODIMENTS

Figure 1:
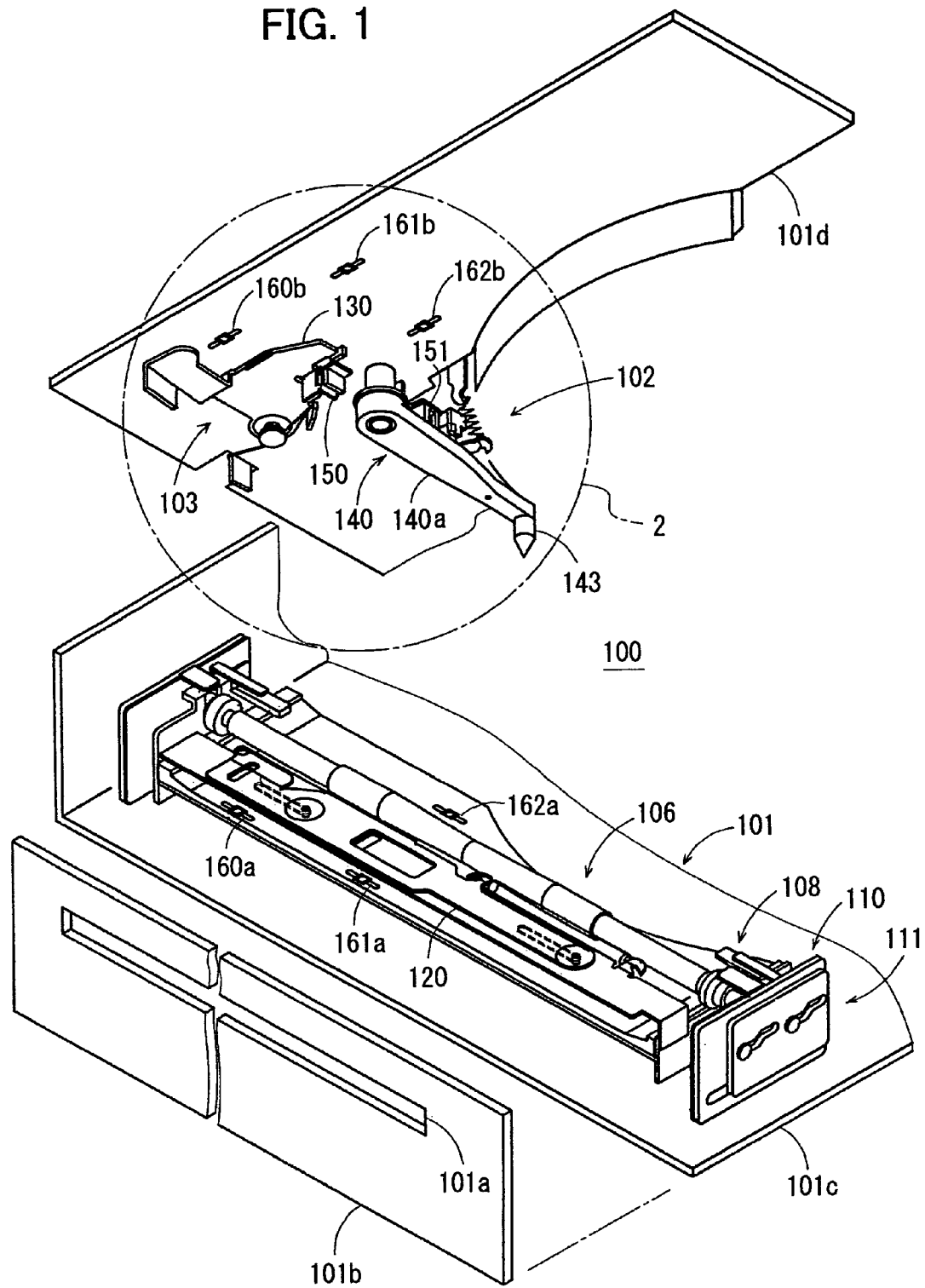
FIG. 1 is an exploded fragmental perspective view partly showing, with fragmental upper and front plates being opened, first and second detecting means, and their vicinity of the optical disc driving apparatus according to the first embodiment of the present invention.

Description will be hereinafter made with reference to the drawings in connection with the first and second embodiments of the optical disc driving apparatus according to the present invention.

The construction of the optical disc driving apparatus according to the first embodiment of the present invention will firstly be described.

Referring to FIGS. 1 to 4 of the drawings, there is shown an optical disc driving apparatus 100 for driving an optical disc such as for example a compact disc and a digital versatile disc while reading out information contained in the optical disc.

The optical disc driving apparatus 100 thus shown in FIGS. 1 to 4 comprises a housing 101 formed with a loading slot 101a having the optical disc passed therethrough, first detecting means 102 for performing a detection of the outer peripheral surface of the optical disc to be moved into the housing 101, second detecting means 103 for performing a detection of the outer peripheral surface of the optical disc to be moved into the housing 101 after the detection of the outer peripheral surface of the optical disc is performed by the first detecting means 102, and judging means 104 for judging whether one optical disc or partially overlapped optical discs are passed through the loading slot 101a of the housing 101 based on results detected by the first and second detecting means 102 and 103.

The housing 101 has an imaginary center plane on which the center axis of the optical disc extends when the optical disc moves into the housing 101, an imaginary lateral plane perpendicular to the imaginary center plane, and the loading slot 101a of the housing 101 having an imaginary disc path on which the optical disc moves into the housing 101. The imaginary disc path is in perpendicular relationship with each of the imaginary center plane and the imaginary lateral plane.

The first detecting means 102 includes a pivotal member 140 pivotably movable between angular positions thereof while being held in contact with the outer peripheral surface of the optical disc to be moved into the housing 101, and a detecting device 151 for detecting the angular positions of the pivotal member 140. The second detecting means 103 includes an operation member 120 accommodated in the housing 101 in spaced relationship with the pivotal member 140 of the first detecting means 102 to be movable between operational positions thereof while being held in contact with the outer peripheral surface of the optical disc to be moved into the housing 101, a pivotal member 130 to be pivotably movable between angular positions thereof in association with the operational positions of the operation member 120 while being held in contact with the operation member 120, and a detecting device 150 for detecting the angular positions of the pivotal member 130.

The detecting devices 150 and 151 of the first and second detecting means 102 and 103 are respectively constituted by optical sensors 150 and 151. The optical sensor 151 of the first detecting means 102 includes a light source for projecting a light on a light path thereof, and a light receiver disposed on the light path of the light source, and the light receiver being adapted to receive the projected light from the light source. The optical sensor 150 of the second detecting means 103 includes a light source for projecting a light on a light path thereof, and a light receiver disposed on the light path of the light source, and the light received being adapted to receive the projected light from the light source.

The pivotal member 140 of the first detecting means 102 has a projected portion 144 for having the optical sensor 151 of the first detecting means 102 perform the detection of the pivotal member 140 by intervening between the light source and the light receiver of the optical sensor 151 of the first detecting means 102, while the pivotal member 130 of the second detecting means 103 has a projected portion 134 for having the optical sensor 150 of the second detecting means 103 perform the detection of the pivotal member 130 by intervening between the light source and the light receiver of the optical sensor 150 of the second detecting means 103.

The pivotal member 140 of the first detecting means 102 is operative to assume two different operational states consisting of a first operational state to have the light receiver of the optical sensor 151 of the first detecting means 102 receive the projected light from the light source of the optical sensor 151 of the first detecting means 102, the optical sensor 151 of the first detecting means 102 being operative to produce a first signal indicative of the first operational state of the pivotal member 140 of the first detecting means 102 when the projected light is received from the light source by the light receiver of the optical sensor 151 of the first detecting means 102 without being intercepted by the projected portion 144 of the pivotal member 140, and a second operational state to have the light receiver of the optical sensor 151 of the first detecting means 102 fail to receive the projected light from the light source of the optical sensor 151 of the first detecting means 102, the optical sensor 151 of the first detecting means 102 being operative to produce a second signal indicative of the second operational state of the pivotal member 140 of the first detecting means 102 when the projected light is intercepted by the projected portion 144 of the pivotal member 140 without being received by the light receiver of the optical sensor 151 of the first detecting means 102.

The pivotal member 140 of the first detecting means 102 is adapted to assume one of the angular positions while being clockwise urged by the urging member 145 of the first detecting means 102 under the condition that the pivotal member 140 of the first detecting means 102 is not pivotally moved with respect to the housing 101 without being held in contact with the outer peripheral portion of the optical disc, on the other hand, the optical sensor 151 of the first detecting means 102 is operative to produce a first signal indicative of the first operational state of the pivotal member 140 of the first detecting means 102 under the condition that the pivotal member 140 of the first detecting means 102 is operated to assume one of the angular positions while being clockwise urged by the urging member 145 of the first detecting means 102.

The pivotal member 130 of the second detecting means 103 is operative to assume two different operational states consisting of a first operational state to have the light receiver of the optical sensor 150 of the second detecting means 103 receive the projected light from the light source of the optical sensor 150 of the second detecting means 103, the optical sensor 150 of the second detecting means 103 being operative to produce a first signal indicative of the first operational state of the pivotal member 130 of the second detecting means 103 when the projected light is received from the light source by the light receiver of the optical sensor 150 of the second detecting means 103 without being intercepted by the projected portion 134 of the pivotal member 130, and a second operational state to have the light receiver of the optical sensor 150 of the second detecting means 103 fail to receive the projected light from the light source of the optical sensor 150 of the second detecting means 103, the optical sensor of the optical sensor 150 of the second detecting means 103 being operative to produce a second signal indicative of the second operational state of the pivotal member 130 of the second detecting means 103 when the projected light is intercepted by the projected portion 134 of the pivotal member 130 without being received by the light receiver of the optical sensor 150 of the second detecting means 103.

Figure 6:
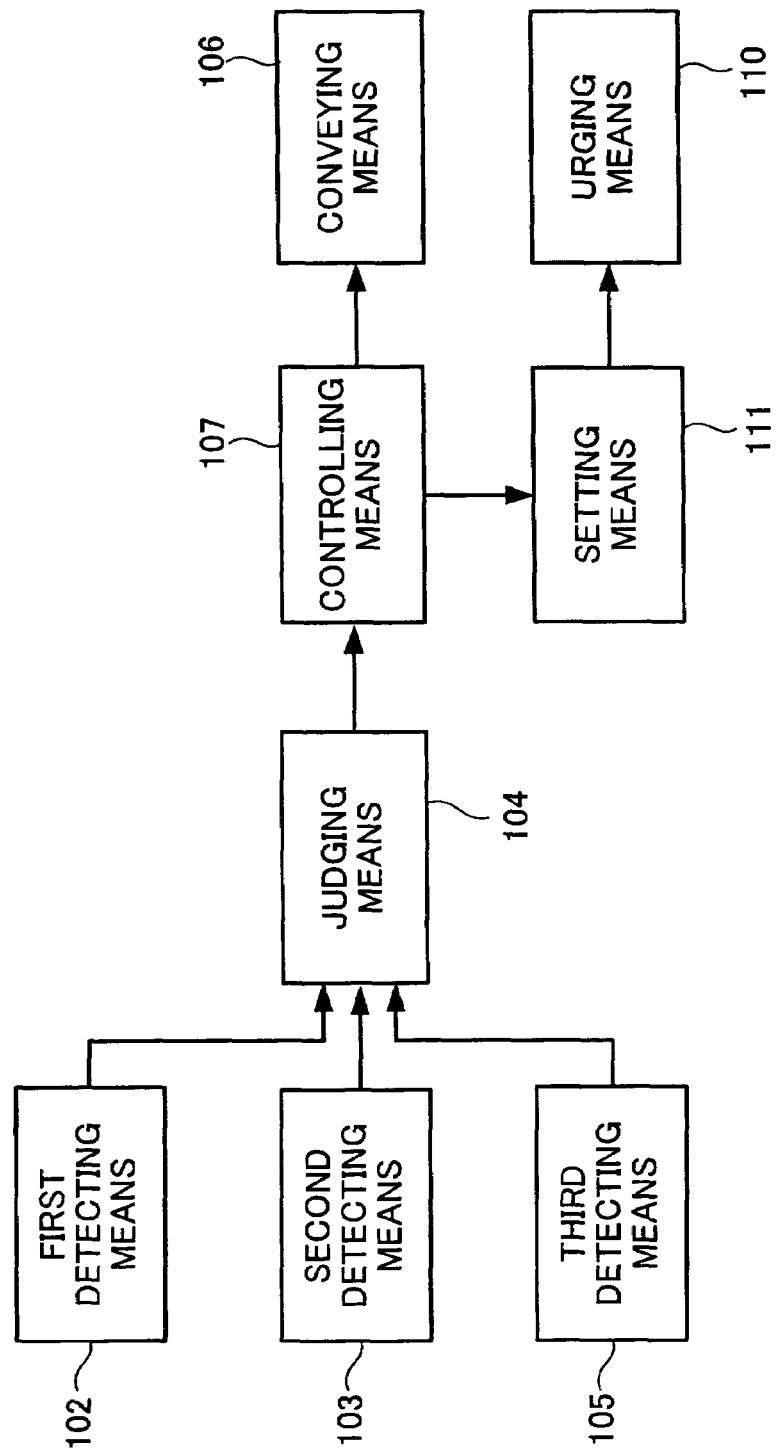
FIG. 6 is a block diagram of the optical disc driving apparatus according to the first embodiment of the present invention.

The optical disc driving apparatus 100 further comprises third detecting means 105 for performing a detection of the optical disc partially passed through the loading slot 101a of the housing 101 before the detection of the outer peripheral surface of the optical disc moved into the housing 101 is performed by each of the first and second detecting means 102 and 103, conveying means 106 for performing a conveyance of the optical disc along the imaginary disc path (see FIG. 6), and controlling means 107 for controlling the conveying means 106 to have the conveying means 106 perform the conveyance of the optical disc along the imaginary disc path in response to results judged by the judging means 104 and results detected by the third detecting means 105.

The third detecting means 105 (see FIGS. 3 and 4) is constituted by a plurality of optical sensors 160 to 162. The optical sensor 160 includes a light source 160b for projecting a light toward the imaginary disc path on a light path thereof, and a light receiver 160a disposed on the light path of the light source 160b. The light receiver 160a of the optical sensor 160 is adapted to receive the projected light from the light source 160b in association with the light receiver 160a of the optical sensor 160 through the imaginary disc path.

The light receiver 160a of the optical sensor 160 is operative to assume two different operational states consisting of a first operational state to receive the projected light from the light source 160b in association with the light receiver 160a without being intercepted by the optical disc partially passed through the loading slot 101a of the housing 101, a second operational state to fail to receive the projected light from the light source 160b in association with the light receiver 160a in response to the optical disc partially passed through the loading slot 101a of the housing 101.

The optical sensor 160 of the third detecting means 105 is operative to produce a first signal indicative of the first operational state of the light receiver 160a, thereof when the projected light is received by the light receiver 160a thereof without being intercepted by the optical disc partially passed through the loading slot 101a of the housing 101, and to produce a second signal indicative of the second operational state of the light receiver 160a thereof when the projected light is intercepted by the optical disc partially passed through the loading slot 101a of the housing 101 without being received by the light receiver 160a thereof.

The optical sensor 161 includes a light source 161b for projecting a light toward the imaginary disc path on a light path thereof, and a light receiver 161a disposed on the light path of the light source 161b. The light receiver 161a of the optical sensor 161 is adapted to receive the projected light from the light source 161b in association with the light receiver 161a of the optical sensor 161 through the imaginary disc path.

The light receiver 161a of the optical sensor 161 is operative to assume two different operational states consisting of a first operational state to receive the projected light from the light source 161b in association with the light receiver 161a without being intercepted by the optical disc partially passed through the loading slot 101a of the housing 101, a second operational state to fail to receive the projected light from the light source 161b in association with the light receiver 161a in response to the optical disc partially passed through the loading slot 101a of the housing 101.

The optical sensor 161 of the third detecting means 105 is operative to produce a first signal indicative of the first operational state of the light receiver 161a, thereof when the projected light is received by the light receiver 161a thereof without being intercepted by the optical disc partially passed through the loading slot 101a of the housing 101, and to produce a second signal indicative of the second operational state of the light receiver 161a thereof when the projected light is intercepted by the optical disc partially passed through the loading slot 101a of the housing 101 without being received by the light receiver 161a thereof.

The optical sensor 162 includes a light source 162b for projecting a light toward the imaginary disc path on a light path thereof, and a light receiver 162a disposed on the light path of the light source 162b. The light receiver 162a of the optical sensor 162 is adapted to receive the projected light from the light source 162b in association with the light receiver 162a of the optical sensor 162 through the imaginary disc path.

The light receiver 162a of the optical sensor 162 is operative to assume two different operational states consisting of a first operational state to receive the projected light from the light source 162b in association with the light receiver 162a without being intercepted by the optical disc partially passed through the loading slot 101a of the housing 101, a second operational state to fail to receive the projected light from the light source 162b in association with the light receiver 162a in response to the optical disc partially passed through the loading slot 101a of the housing 101.

The optical sensor 162 of the third detecting means 105 is operative to produce a first signal indicative of the first operational state of the light receiver 162a, thereof when the projected light is received by the light receiver 162a thereof without being intercepted by the optical disc partially passed through the loading slot 101a of the housing 101, and to produce a second signal indicative of the second operational state of the light receiver 162a thereof when the projected light is intercepted by the optical disc partially passed through the loading slot 101a of the housing 101 without being received by the light receiver 162a thereof.

The conveying means 106 includes a driving motor 95 for producing a rotation torque, and a roller member 61 having a surface to be brought into contact with an upper surface of the optical disc while having the optical disc move into the housing 101 on the imaginary disc path in response to the rotation torque produced by the driving motor 95, while the controlling means 107 is operative to control the conveying means 106 to allow the roller member 61 to have the optical disc move into the housing 101 on the imaginary disc path under the condition that the judgment is made by the judging means 104 as the optical disc is passed through the loading slot 101a of the housing 101 based on results judged by the judging means 104.

The roller member 61 of the conveying means 106 has a roller portion 60 and a rotation shaft portion 62. The roller portion 60 forming part of the roller member 61 has a pair of surfaces 61a, while the rotation shaft portion 62 forming part of the roller member 61 has a center axis thereof.

Figure 22:
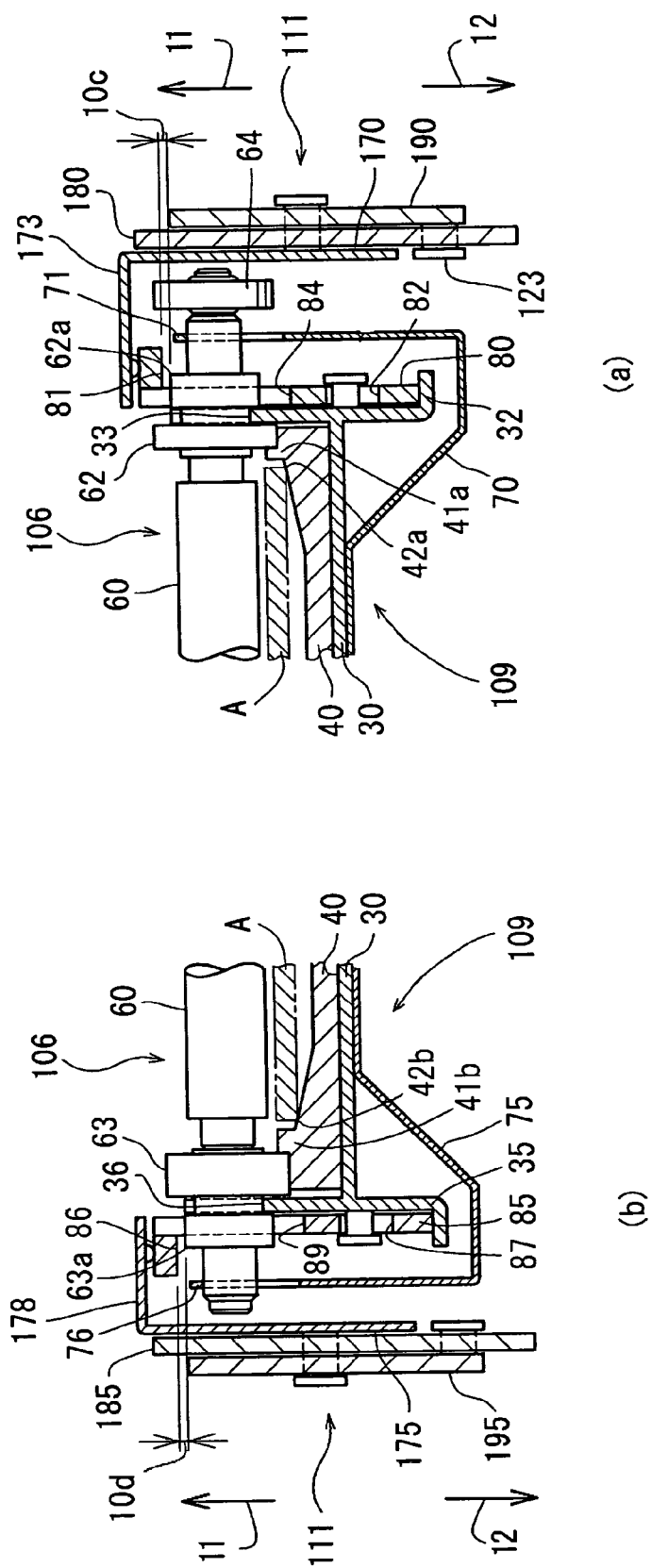
FIG. 22 is a side view showing the setting means of the first embodiment of the optical disc driving apparatus according to the present invention.
Figure 23:
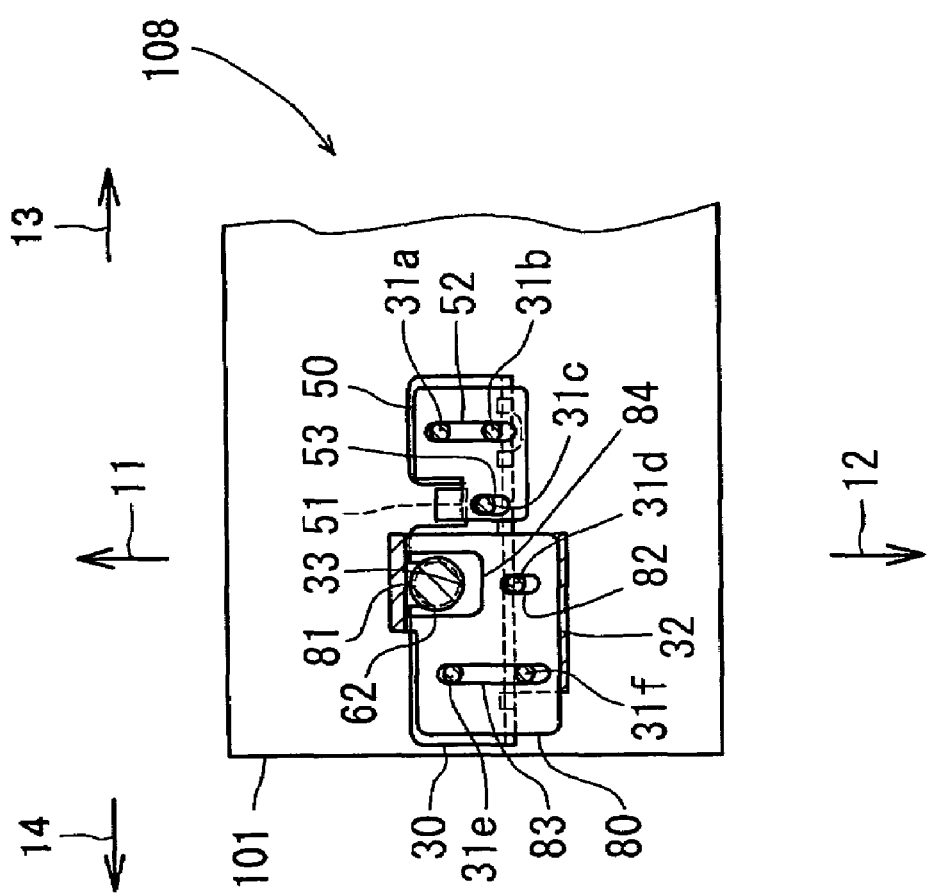
FIG. 23 is a fragmental plan view showing the conveying means and the regulating means of the first embodiment of the optical disc driving apparatus according to the present invention.
Figure 24:
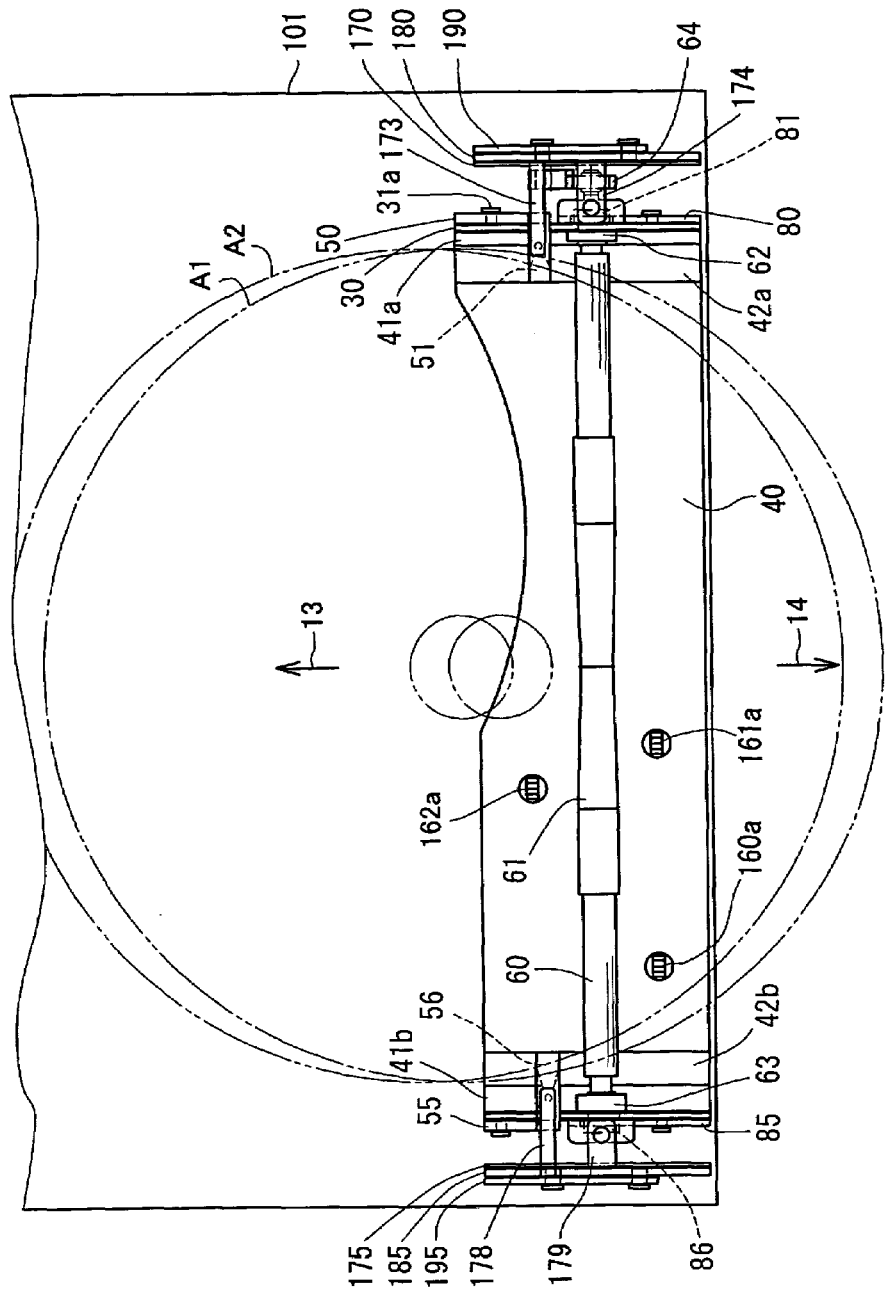
FIG. 24 is a schematic view showing the urging member of the urging means of the first embodiment of the optical disc driving apparatus according to the present invention.

The conveying means 106 has a pair of urging members 70 and 75 (see FIG. 22) for respectively resiliently urging longitudinal ends of the roller member 61 of the conveying means 106 toward the imaginary disc path, while the roller member 61 of the conveying means 106 is rested on the longitudinal end portions of the first member 40 of the regulating means 108. The urging member 70 and 75 are respectively constituted by leaf springs.

Figure 25:
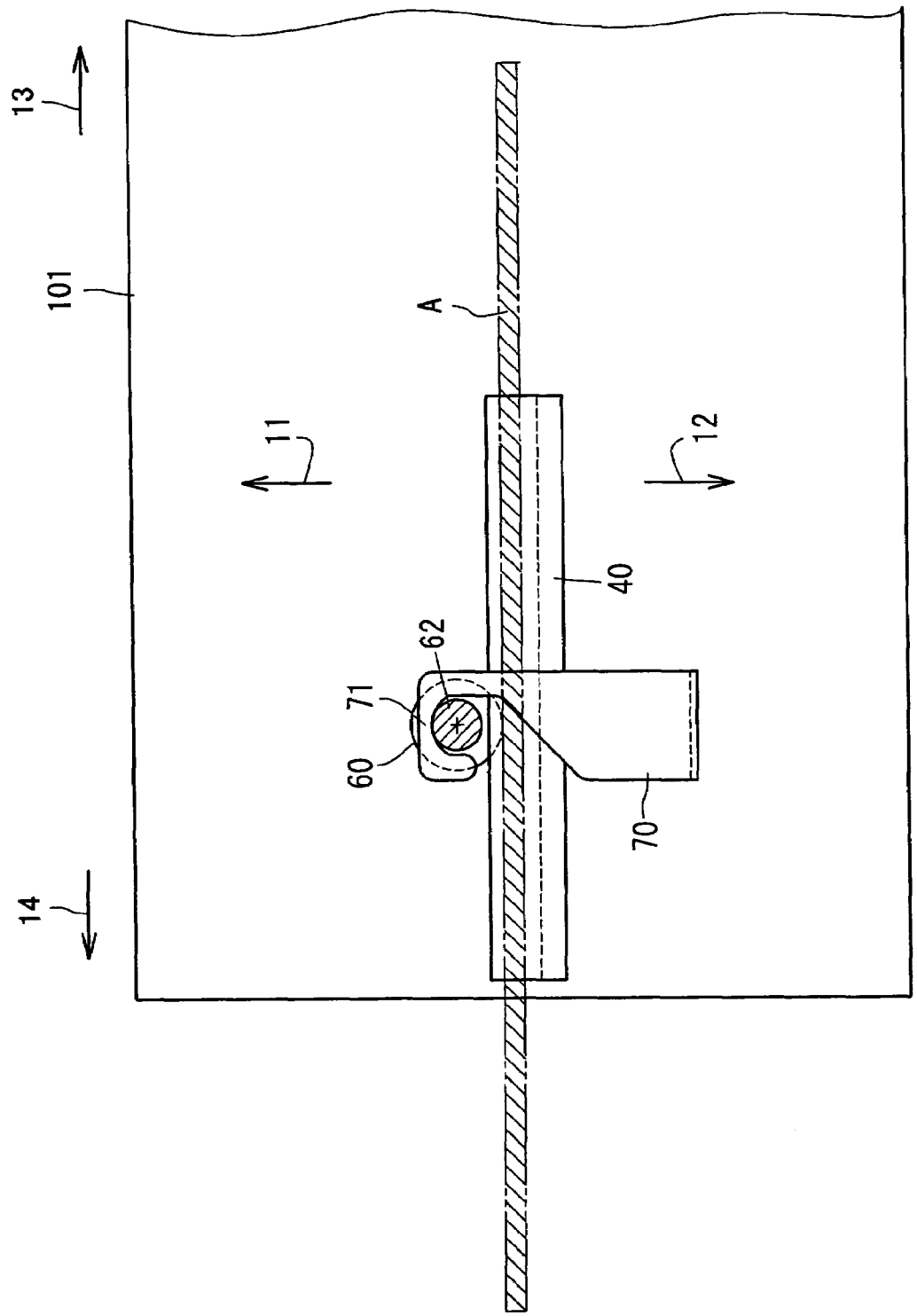
FIG. 25 is a schematic view showing the driving and driven gears of the conveying means of the first embodiment of the optical disc driving apparatus according to the present invention.

The urging members 70 and 75 each has a first portion retained by the base member 30 of the regulating means 108, a slanted portion inclined with respect to the center plane of the housing 101, a second portion formed with the slanted portion thereof, an upright portion, and a hock portion (see FIG. 25) held in engagement with rotation shaft 60 of the roller member 61 of the conveying means 106. The slanted portion forming part of one of the urging members 70 and 75 has one longitudinal end formed with the first portion forming part of one of the urging members 70 and 75, and the other longitudinal end formed with the second portion forming part of one of the urging members 70 and 75. The upright portion forming part of the other of the urging members 70 and 75 has one longitudinal end formed with the second portion forming part of the other of the urging members 70 and 75, and the other longitudinal end formed with the hock portion forming of the other of the urging members 70 and 75.

Figure 26:
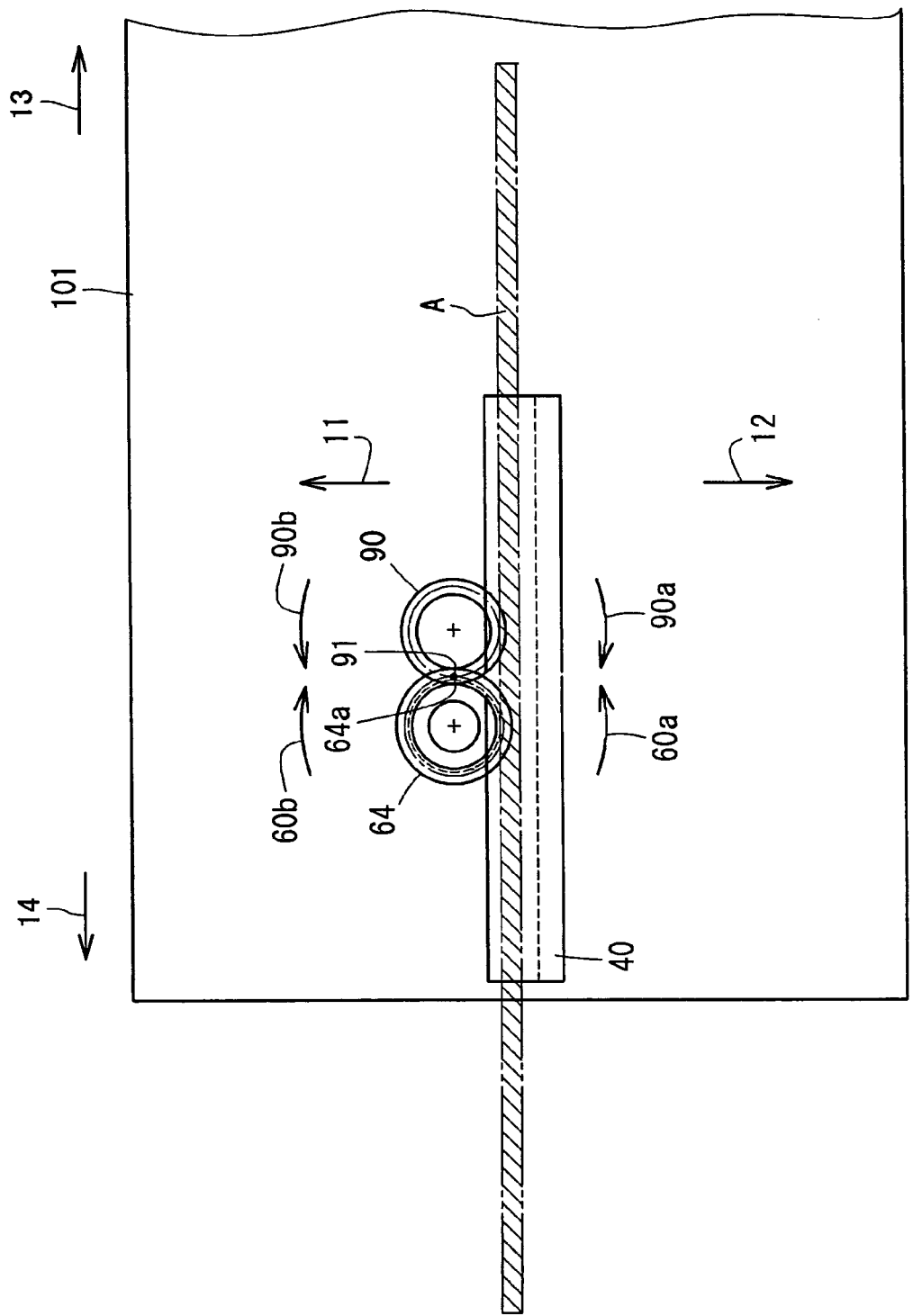
FIG. 26 is a side view of the setting member of the setting means of the first embodiment of the optical disc driving apparatus according to the present invention.
Figure 27:
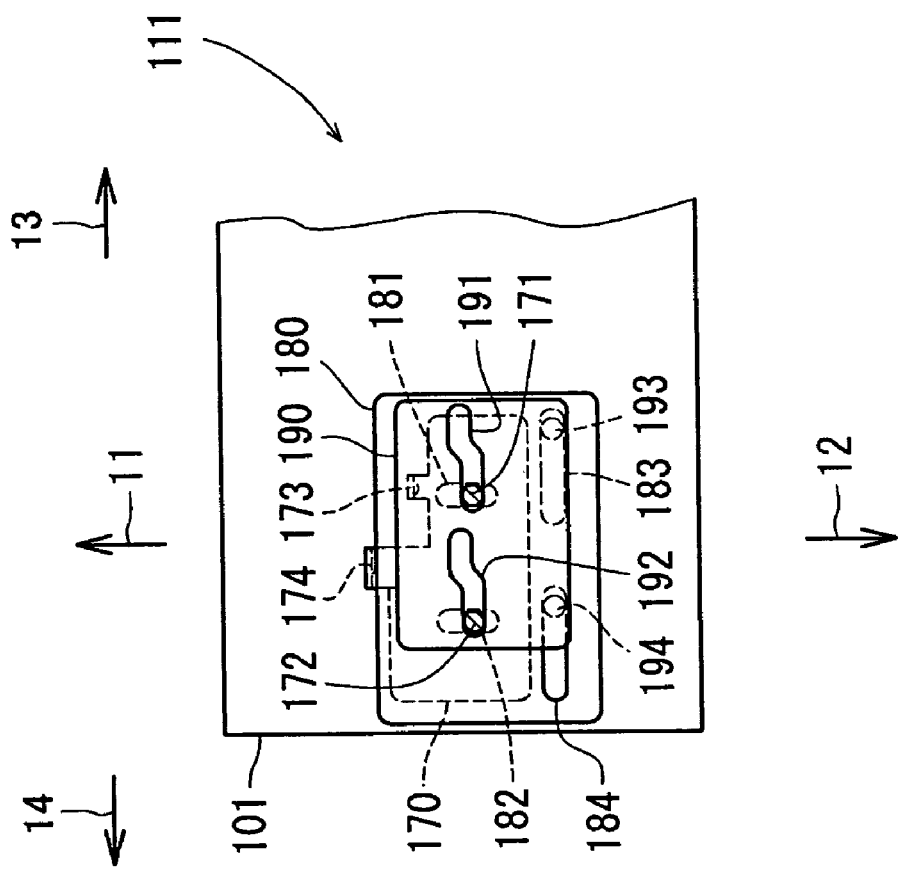
FIG. 27 is a plan view of the setting member of the setting means of the first embodiment of the optical disc driving apparatus according to the present invention.
Figure 28:
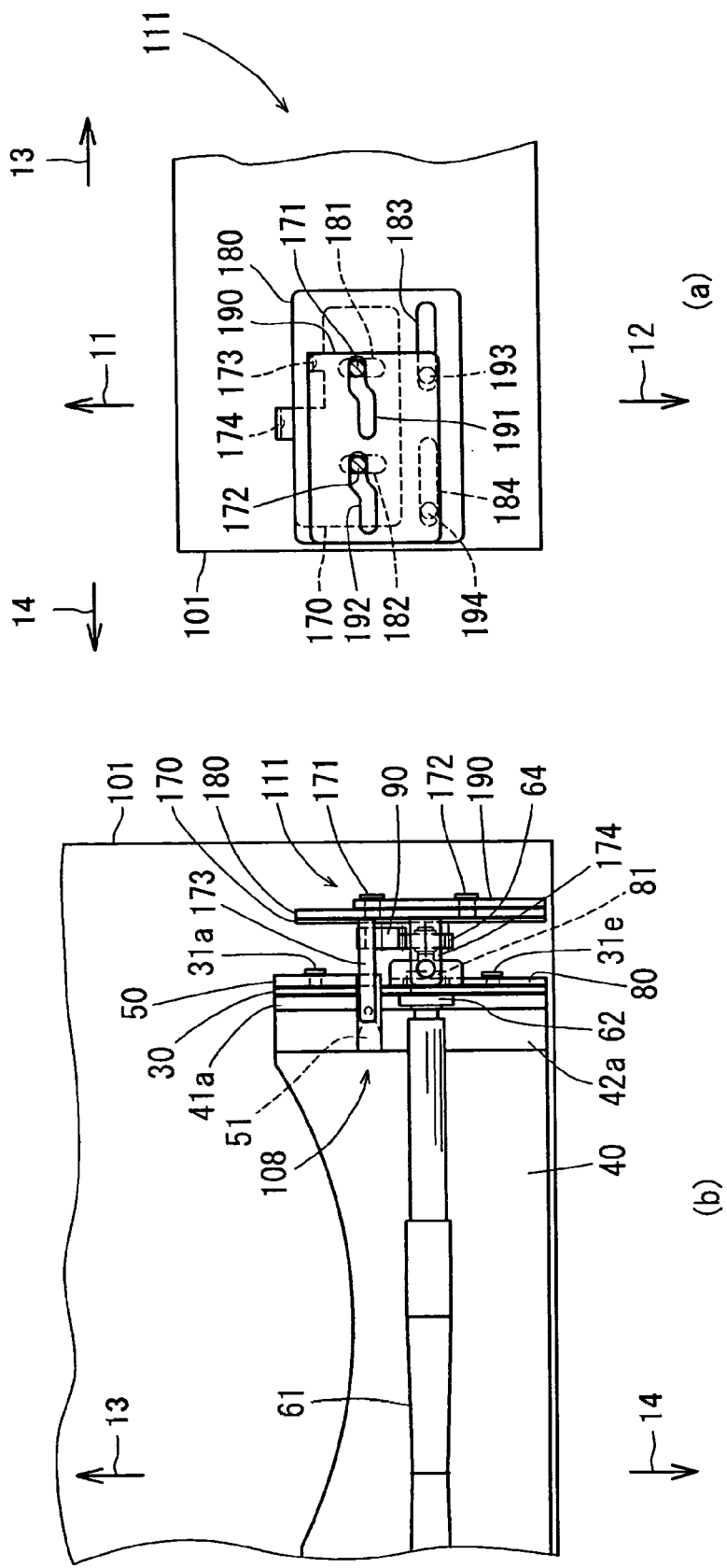
FIG. 28 is a plan view of the conveying means of the first embodiment of the optical disc driving apparatus according to the present invention.
Figure 29:
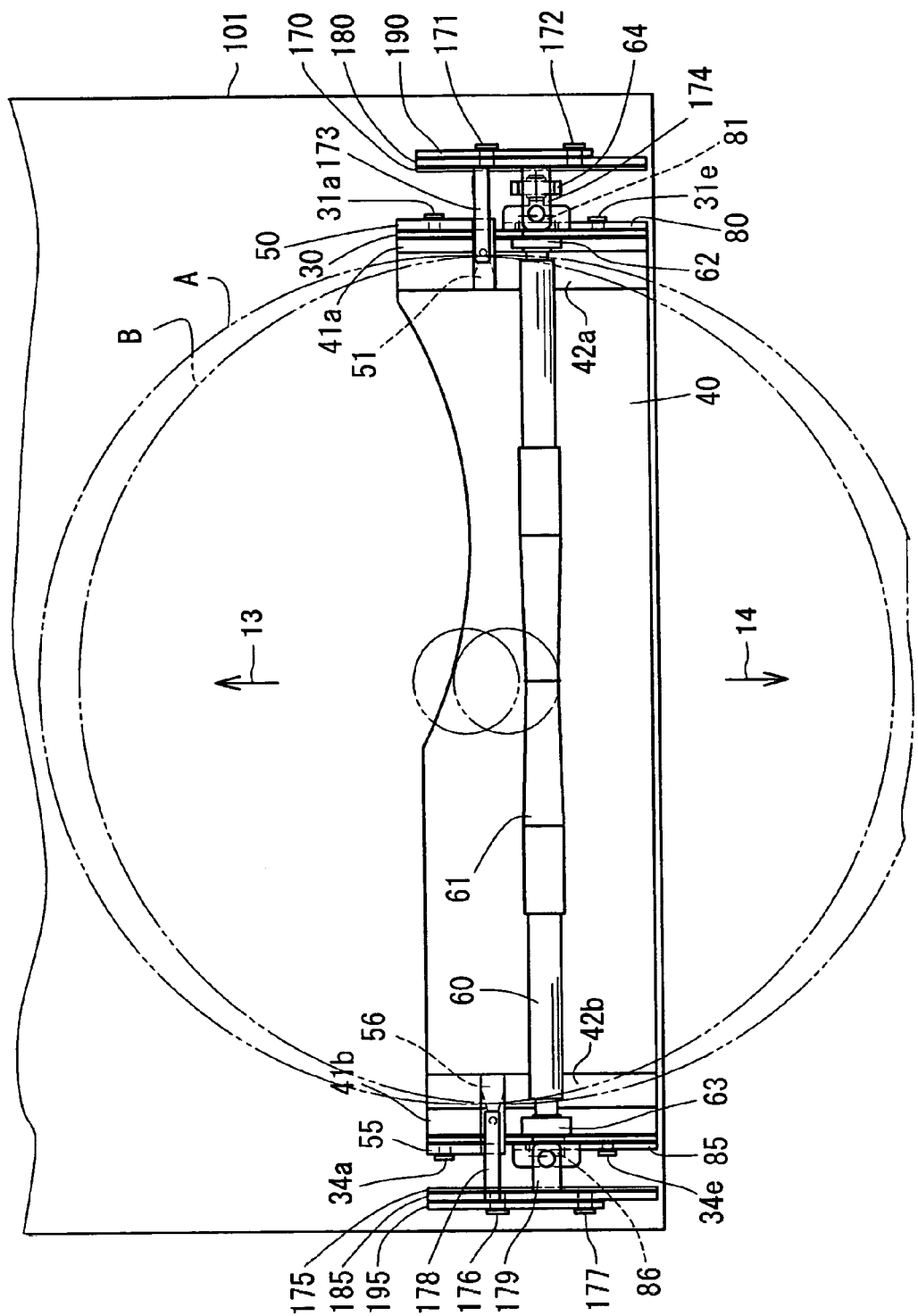
FIG. 29 is a front view of the conveying means of the first embodiment of the optical disc driving apparatus according to the present invention.
Figure 30:
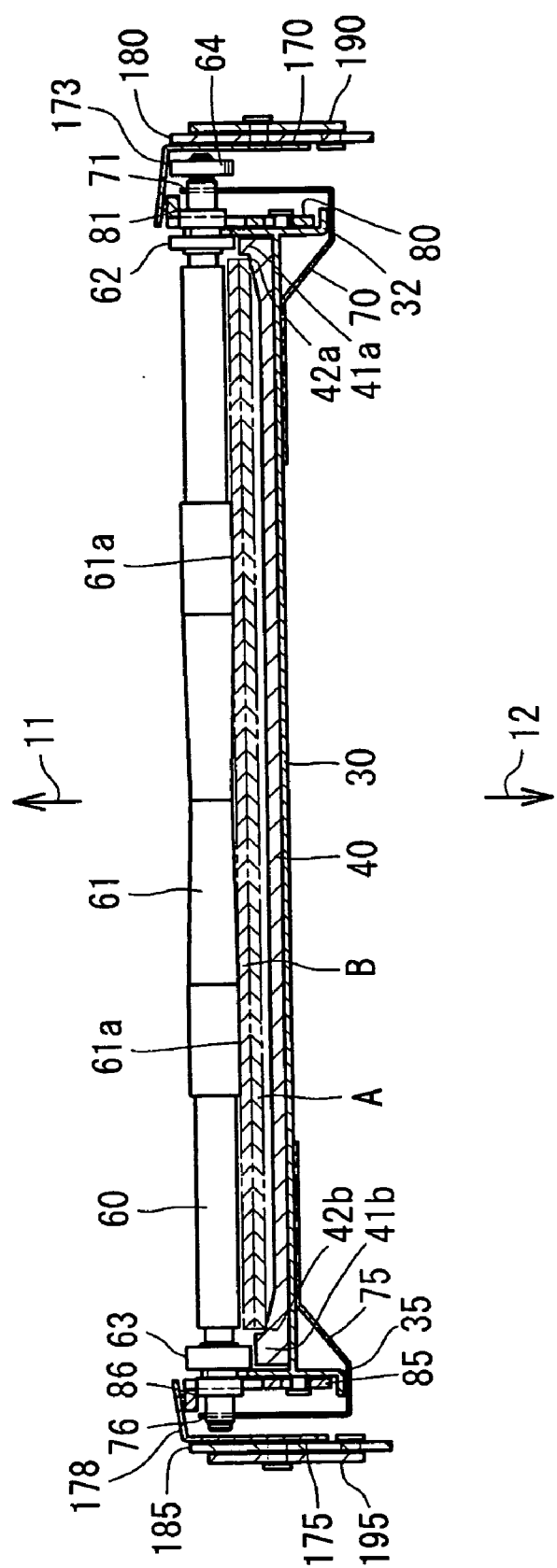
FIG. 30 is a fragmental front view of the conveying means of the first embodiment of the optical disc driving apparatus according to the present invention.
Figure 31:
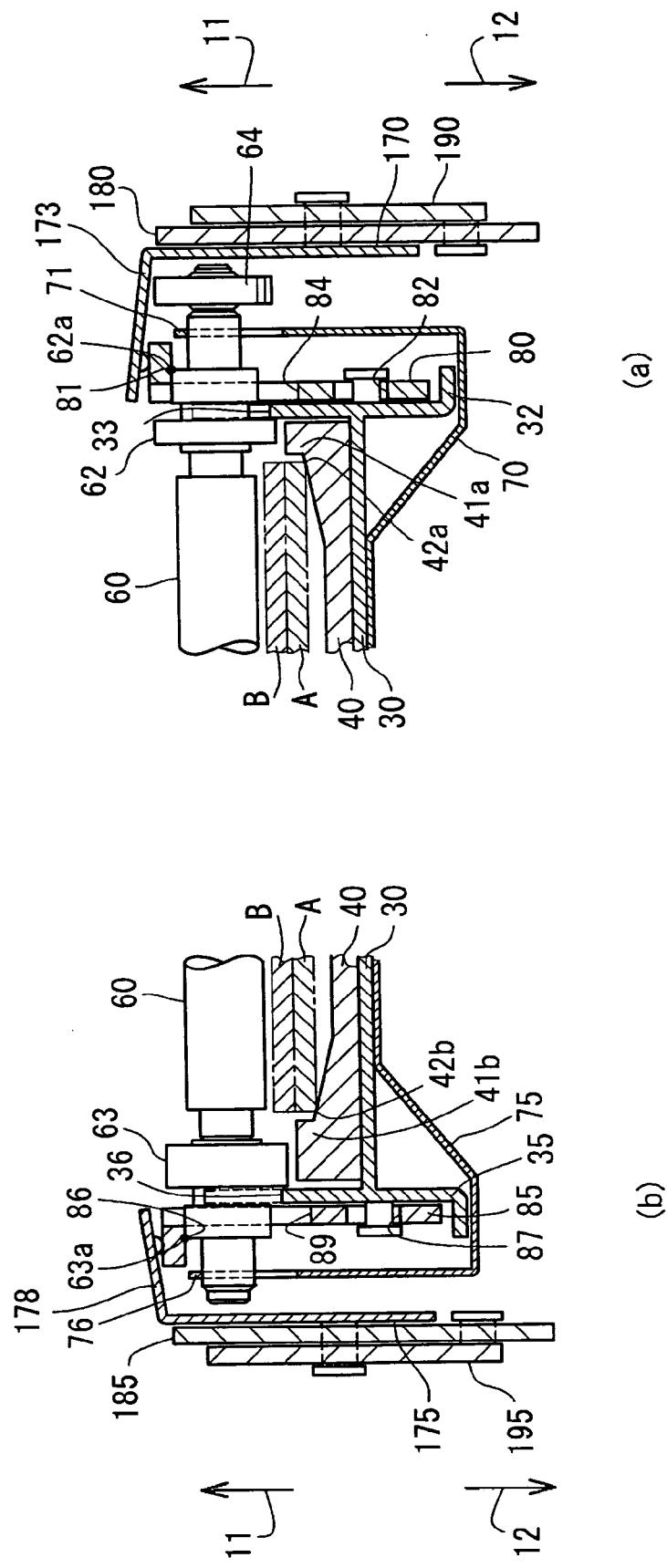
FIG. 31 is a front view of the regulating means of the first embodiment of the optical disc driving apparatus according to the present invention.
Figure 32:
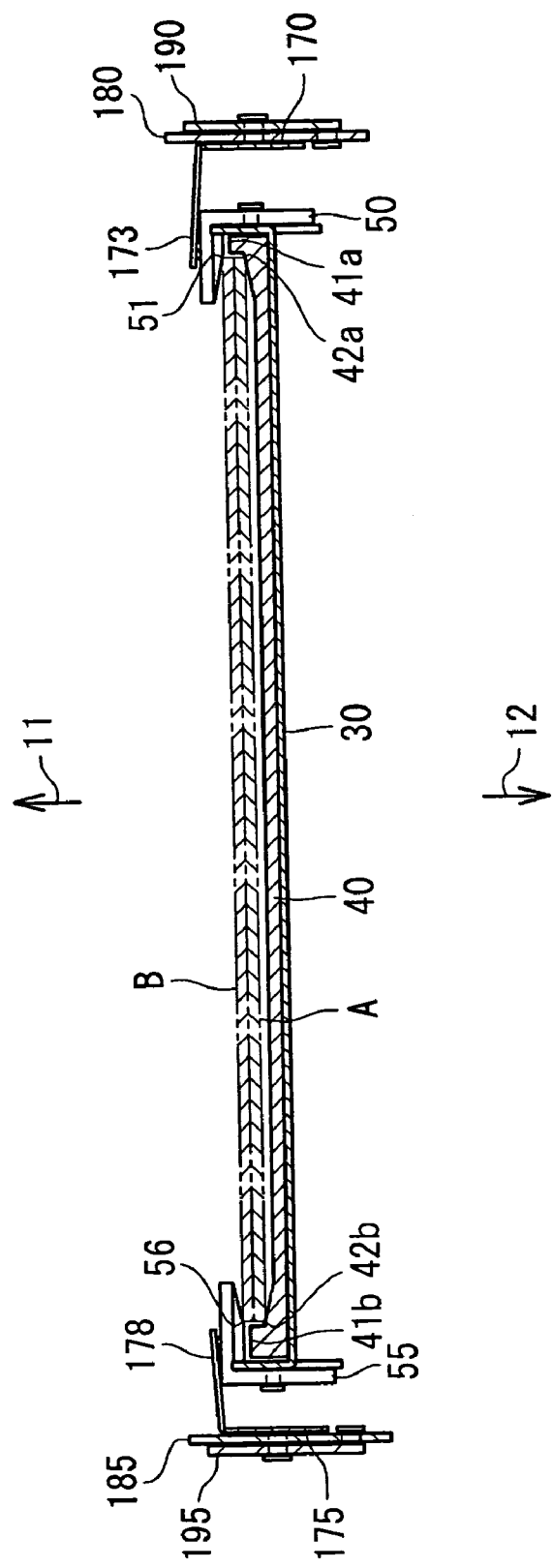
FIG. 32 is a fragmental front view of the regulating means of the first embodiment of the optical disc driving apparatus according to the present invention.
Figure 33:
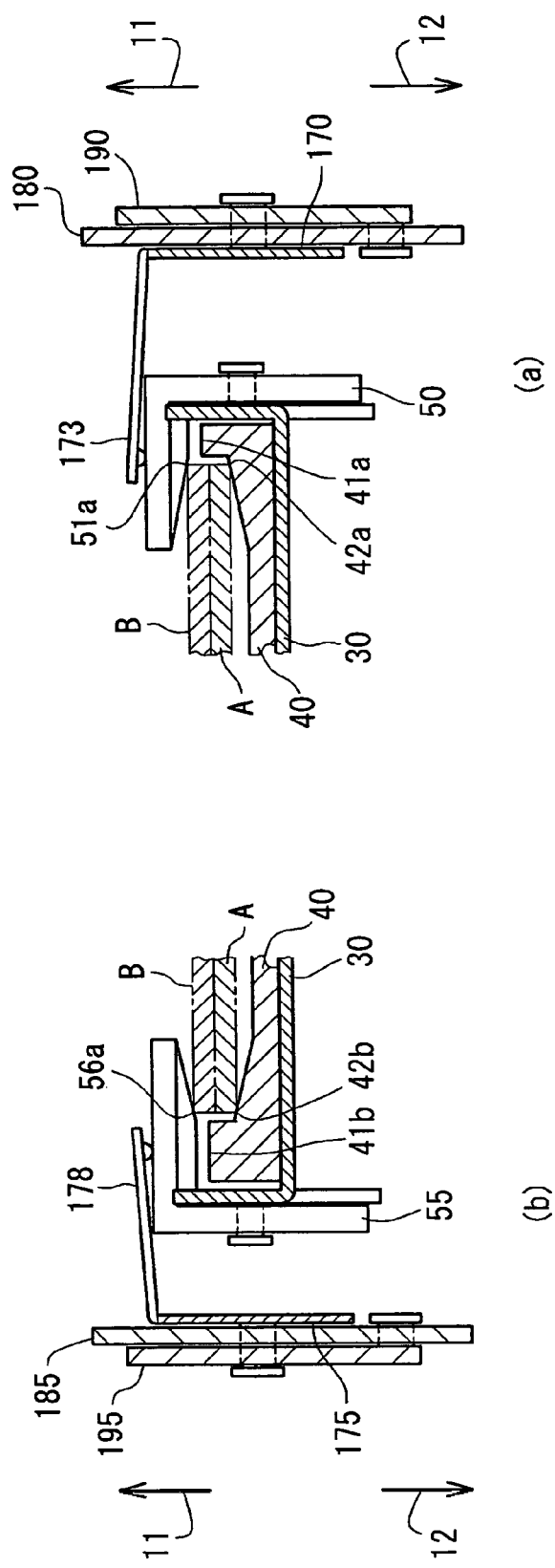
FIG. 33 is a fragmental front view of the regulating means of the first embodiment of the optical disc driving apparatus according to the present invention.
Figure 34:
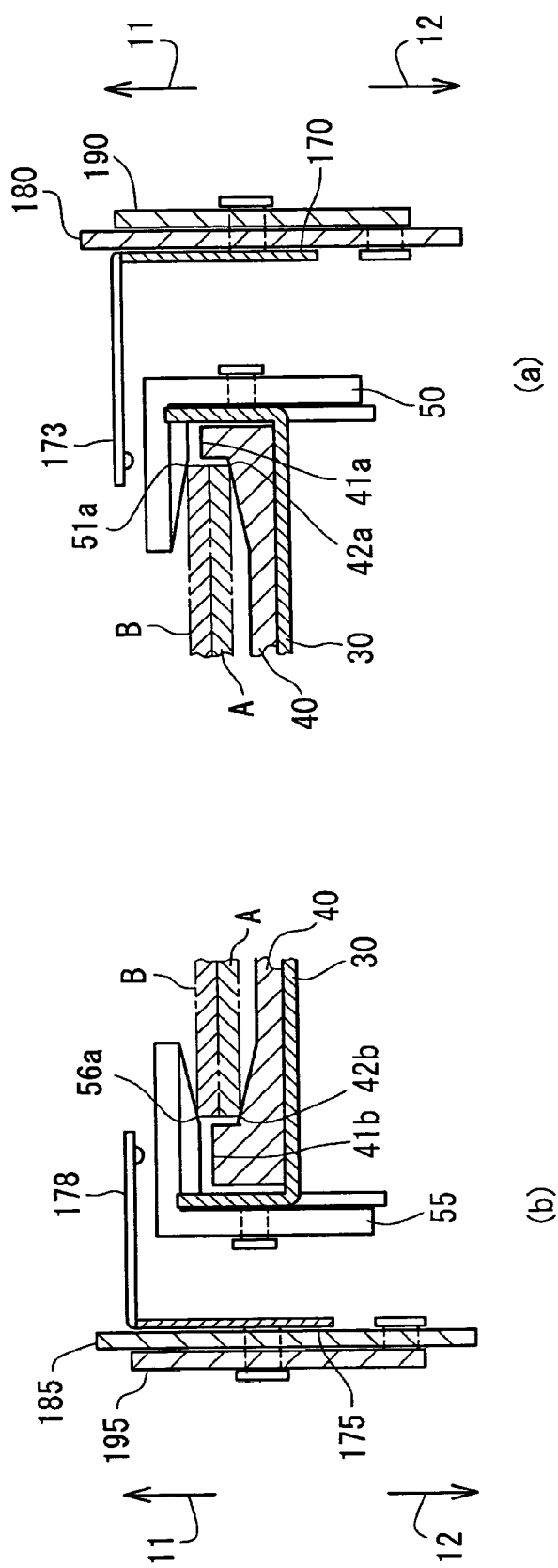
FIG. 34 is a fragmental front view of the conveying means of the first embodiment of the optical disc driving apparatus according to the present invention.
Figure 35:
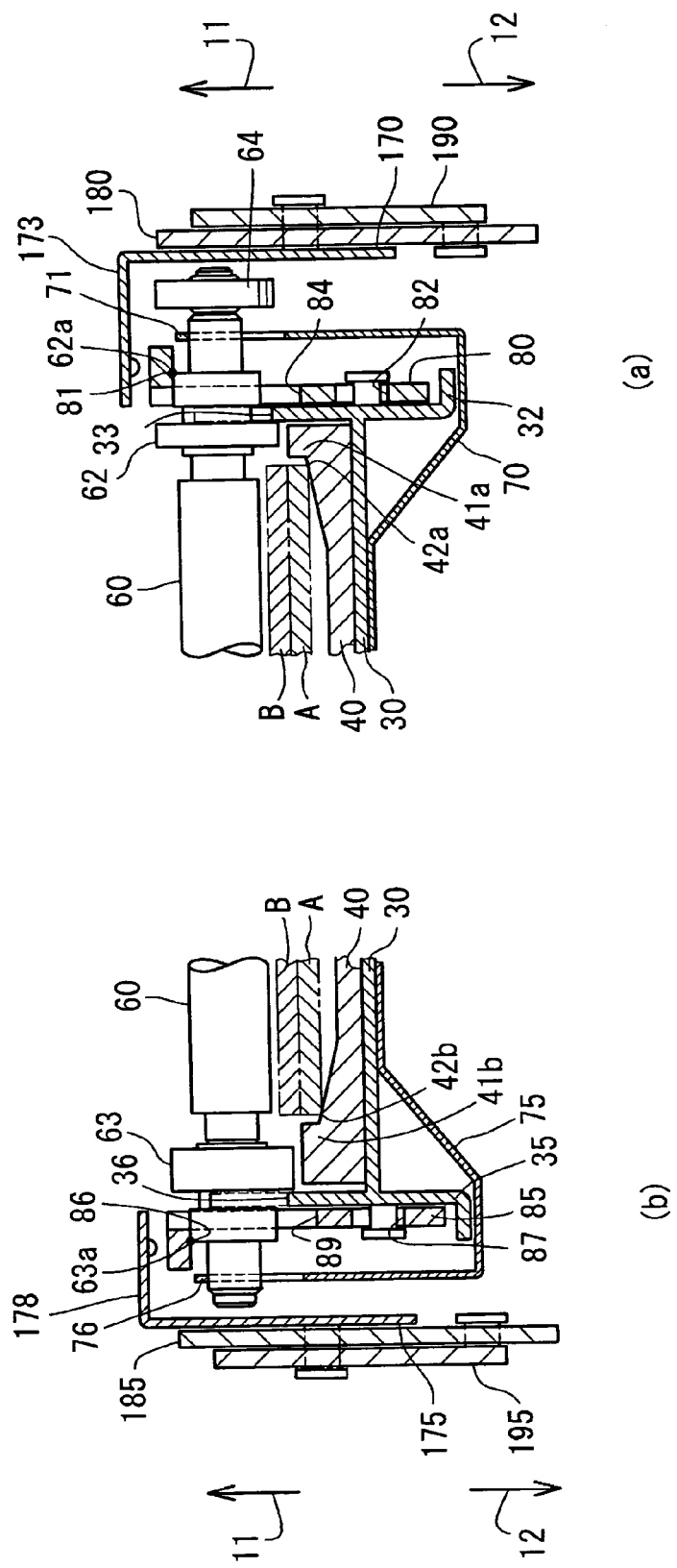
FIG. 35 is a fragmental plan view showing the first and second detecting means of the second embodiment of the optical disc driving apparatus according to the present invention.

The conveying means 106 has a driven gear 64 (see FIG. 26) formed with one longitudinal end of the roller member 61, and a driving gear 90 (see FIG. 26) formed with one longitudinal end of the rotation shaft of the driving motor 95, and meshed with the driven gear 64. The driven gear 64 is counterclockwise moved around the center axis thereof when the driving gear 90 is clockwise moved around the center axis thereof. On the other hand, the driven gear 64 is clockwise moved around the center axis thereof when the driving gear 90 is counterclockwise moved around the center axis thereof.

The controlling means 107 is operative to control the conveying means 106 to allow the driving motor 95 to stop producing the rotation torque under the condition that the judgment is made by the judging means 104 as the partially overlapped optical discs are passed through the loading slot 101a of the housing 101 based on results detected by the first and second detecting means 102 and 103.

The controlling means 107 is operative to control the conveying means 106 to have the conveying means 106 stop performing the conveyance of the partially overlapped optical discs in a loading direction 13 before having the conveying means 106 perform the conveyance of the partially overlapped optical discs in an ejection direction 14 opposite to the loading direction 13 under the condition that the judgment is made by the judging means 104 as the partially overlapped optical discs are passed through the loading slot 101a of the housing 101 based on results detected by the first and second detecting means 102 and 103.

The pivotal member 140 of the first detecting means 102 has an arm portion 140a and a lever portion 143 to be brought into contact with the outer peripheral surface of the optical disc to be moved into the housing 101 on the imaginary disc path, the lever portion 143 of the pivotal member 140 extending toward the imaginary disc path from one of longitudinal ends of the arm portion 140a of the pivotal member 140 in a cantilever fashion, the other of the longitudinal ends of the arm portion 140a of the pivotal member 140 having a through bore formed therein, the through bore of the arm portion 140a of the pivotal member 140 having a central line perpendicular to the imaginary disc path.

The first detecting means 102 includes an urging member 145 for resiliently urging the projection of the pivotal member 140 toward the imaginary center plane of the housing 101, and a shaft member 141 retained by the housing 101, and the shaft member 141 to be pivotably received by the through bore of the arm portion 140a of the pivotal member 140. The pivotal member 140 of the first detecting means 102 is operative to push the optical disc moved into the housing 101 toward a specific position on which the information contained in the optical disc is read out after the conveyance of the optical disc is performed by the conveying means 106.

The operation member 120 of the second detecting means 103 has a plate portion, and a projected portion 122 formed with the plate portion. The projected portion 122 of the operation member 120 of the second detecting means 103 is movable toward and away from the center plane of the housing 101 while being held in contact with the outer peripheral surface of the optical disc to be moved into and out of the housing 101 on the imaginary disc path. The projected portion 122 of the operation member 120 extends toward the imaginary disc path from one of longitudinal ends of the plate portion of the operation member 120 in a cantilever fashion. The second detecting means 103 includes a first urging member 121 for resiliently urging the projected portion 122 of the operation member 120 toward the imaginary center plane of the housing 101 while having the projected portion 122 of the operation member 120 held into contact with the outer peripheral surface of the optical disc to be moved into the housing 101 on the imaginary disc path, and a base member 113 retained by the housing 101. The base member 113 is adapted to slidably support the operation member 120.

The operation member 120 of the second detecting means 103 has first and second pins 120a and 120b formed therein, while the base member 113 of the second detecting means 103 has formed therein first and second slots 113a and 113b respectively having the first and second pins 120a and 120b of the operation member 120 received therein. The first and second slots 113a and 113b of the base member 113 of the second detecting means 103 respectively have longitudinal central lines parallel to each other, and perpendicular to the center plane of the housing 101.

The pivotal member 130 of the second detecting means 103 has a projected portion 133 to be held in engagement with one of longitudinal ends of the operation member 120, and a plate portion formed with a through bore having the shaft member 131 pivotably received therein, the through bore of the plate portion of the pivotal member 130 having a central line perpendicular to the imaginary disc path. The second detecting means 103 includes an second urging member 135 for resiliently urging the projected portion 133 of the pivotal member 130 toward the imaginary center plane of the housing 101 while having the projected portion 133 of the pivotal member 130 held in engagement with the plate portion of the operation member 120.

The judging means 104 is operative to judge whether or not the conveyance of the optical disc to be moved into the housing 101 is complete based on results detected by the second detecting means 103.

The optical disc driving apparatus 100 further comprises regulating means 108 for allowing the optical disc to be moved into and out of the housing 101 on the imaginary disc path while preventing the optical disc from being movable toward and away from the imaginary disc path.

The regulating means 108 includes a base member 30 retained by the housing 101, a first member 40 supported by the base member 30, and second members 50 and 55 each movable toward and away from the first member 40. The second members 50 has a lever portion having a first surface i.e. a first lower surface 51a to be brought into contact with a peripheral edge of the optical disc to be moved into and out of the housing 101, while the second member 55 has a lever portion having a first surface i.e. a first lower surface 56a to be brought into contact with a peripheral edge of the optical disc to be moved into and out of the housing 101.

The lever portion of the second member 50 has a second surface i.e. a second lower surface extending outwardly from longitudinally outer end of the first surface thereof 51a, while the lever portion of the second member 55 has a second surface i.e. a second lower surface extending outwardly from longitudinally outer end of the first surface thereof 56a.

The first member 40 of the regulating means 108 has longitudinal end portions and a central plate portion intervening between the longitudinal end portions. One of the longitudinal end portions of the first member 40 has a first surface i.e. a first upper surface 42a on which the optical disc to be moved into and out of the housing 101 is rested under the condition that the peripheral edge of the optical disc is brought into contact with the first surface of each of the longitudinal end portions of the first member 40. The other of the longitudinal end portions of the first member 40 has a first surface i.e. a first upper surface 42b on which the optical disc to be moved into and out of the housing 101 is rested under the condition that the peripheral edge of the optical disc is brought into contact with the first surface of each of the longitudinal end portions of the first member 40.

One of the longitudinal end portions of the first member 40 has a second surface i.e. a second upper surface 41a on which the lever portion of the second member 50 is rested under the condition that the second surfaces of the lever portions of the second members 50 and are respectively brought into contact with the second surfaces of the longitudinal end portions of the first member 40. The other of the longitudinal end portions of the first member 40 has a second surface i.e. a second upper surface 41b on which the lever portion of the second member 55 is rested under the condition that the second surfaces of the lever portions of the second members 55 and are respectively brought into contact with the second surfaces of the longitudinal end portions of the first member 40.

The base member 30 of the regulating means 108 has side plate portions and a central plate portion intervening between the side plate portions. One of the side plate portions of the base member 30 of the regulating means 108 has a pair of upright surfaces each parallel to the center plane of the housing 101, while the other of the side plate portions of the base member 30 of the regulating means 108 has a pair of upright surfaces each parallel to the center plane of the housing 101. The side plate portions of the base member 30 of the regulating means 108 each has first and second grooves (see FIG. 18) extending to one of the upright surfaces from the other of the upright surfaces. The first and second grooves of each of the side plate portions of the base member 30 of the regulating means 108 each has a center line perpendicular to the center plane of the housing 101.

The first groove of one of the side plate portions of the base member 30 of the regulating means 108 has one end of the roller member 61 of the conveying means 106 received therein, while the first groove of the other of the side plate portions of the base member 30 of the regulating means 108 has the other end of the roller member 61 of the conveying means 106 received therein. The second groove of one of the side plate portions of the base member 30 of the regulating means 108 has the lever portion of one of the second members 50 and 55 of the regulating means 108 received therein, while the second groove of the other of the side plate portions of the base member 30 of the regulating means 108 has the lever portion of the other of the second members 50 and 55 of the regulating means 108 received therein.

One of the side plate portions of the base member 30 of the regulating means 108 is integrally formed with first to sixth pins 31a to 31f each having a center line perpendicular to the center plane of the housing 101, while the other of the side plate portions of the base member 30 of the regulating means 108 is integrally formed with first to sixth pins (not shown) each having a center line perpendicular to the center plane of the housing 101. The base member 30 of the regulating means 30 have projected portions respectively formed with lower extreme ends of the side plate portions thereof, and extending outwardly from the lower extreme ends of the side plate portions thereof.

The optical disc driving apparatus 100 further comprises urging means 110 for resiliently urging each of the second members 50 and 55 of the regulating means 108 in the second direction 12, i.e., toward the imaginary disc path.

The central plate portion of the first member 40 of the regulating means 108 has an upper surface parallel to the imaginary disc path. The first upper surfaces 42a and 42b of the longitudinal end portions of the first member 40 of the regulating means 108 each is inclined with respect to the upper surface of the central plate portion of the first member 40 of the regulating means 108 at a predetermined inclination angle. The upper surface of the central plate portion and the first upper surfaces 42a and 42b of the longitudinal end portions of the first member 40 of the regulating means 108 form in combination an opening in the form of a trapezoidal shape in cross-section taken along the imaginary disc path.

The first lower surfaces 51a of the lever portions of the second members 50 each is inclined with respect to the imaginary disc path at a predetermined inclination angle, while the first lower surfaces 56a of the lever portions of the second members 55 each is inclined with respect to the imaginary disc path at a predetermined inclination angle.

The longitudinal end portions of the first member 40 of the regulating means 108 respectively have upright surfaces 43a and 43b. The upright surface 43a and 43b of the longitudinal end portions of the first member 40 respectively extend upwardly from extreme upper ends of the first upper surfaces 42a and 42b of the longitudinal end portions of the first member 40.

The first upper surface 42a of the longitudinal end portion of the first member 40, the upright surface 43a of the longitudinal end portion of the first member 40, and the first lower surface 51a of the lever portion of the second member 50 form in combination groove in the form of a trapezoidal shape in cross-section taken along the imaginary disc path. In similar fashion, the first upper surface 42b of the longitudinal end portion of the first member 40, the upright surface 43b of the longitudinal end portion of the first member 40, and the first lower surface 56a of the lever portion of the second member 55 form in combination groove in the form of a trapezoidal shape in cross-section taken along the imaginary disc path.

The first upper surfaces 42a and 42b of the longitudinal end portions of the first member 40 and the first lower surfaces 51a and 56a of the lever portions 51 and 56 of the second members 50 and 55 form in combination an imaginary passageway 10 in the form of a rectangle shape in cross-section taken along the imaginary disc path. The imaginary passageway 10 has the optical disc passed therethrough on the imaginary disc path.

The imaginary passageway 10 has an upper and lower imaginary surfaces each parallel to the imaginary disc path, and a pair of upright imaginary surfaces respectively equally spaced apart from the upright surfaces 43a and 43b of the longitudinal end portions of the first member 40. The imaginary passageway 10 has a pair of upper peripheral imaginary edges respectively held in contact with the first lower surfaces 51a and 56a of the lever portions 51 and 56 of the second members 50 and 55. The imaginary passageway 10 has a pair of lower peripheral imaginary edges respectively held in contact with the first upper surfaces 42a and 42b of the longitudinal end portions of the first member 40. The upright imaginary surfaces of the imaginary passageway 10 is in spaced relationship with each other at a distance equal to a diameter of the optical disc to be moved into and out of the housing 101. The upper and lower imaginary surfaces of the imaginary passageway 10 is in spaced relationship with each other at a distance larger than a thickness of the optical disc to be moved into and out of the housing 101, and smaller than twice of the thickness of the optical disc to be moved into and out of the housing 101.

The upright surfaces 43a and 43b of the longitudinal ends portions of the first member 40 of the regulating means 108 constitute in combination guiding means 109 for allowing the optical disc to be moved into and out of the housing 101 on the imaginary disc path while preventing the optical disc from being moved in third and fourth directions 15 and 16 each perpendicular to the imaginary center plane of the housing 101, and each parallel to the imaginary disc path.

The urging means 110 is adapted to assume two different operational states consisting of a first operational state to resiliently urging each of the second members 50 and 55 of the regulating means 108 in the second direction 12 with a first resilient force thereof under the condition that the conveyance of the optical disc is performed by the conveying means 106 in the loading direction 13, and a second operational state to resiliently urging each of the second members 50 and 55 of the regulating means 108 in the second direction 12 with a second resilient force thereof smaller than the first resilient force under the condition that the conveyance of the optical disc is performed by the conveying means 106 in the ejection direction 14 opposite to the loading direction 13.

The optical disc driving apparatus 100 further comprises setting means 111 for having the urging means 110 selectively assume the first and second operational states in response to results judged by the judging means 104.

The first upper surfaces 42a and 42b of the longitudinal end portions of the first member 40 are collectively adapted to bring the upper surface of the optical disc into contact with the surface of the roller member 61 of the conveying means 106 before failing to bring the upper surface of the optical disc into contact with each of the first lower surfaces 51a and 56a of the second members 50 and 55 of the regulating means 108 under the condition that the conveyance of the one optical disc is performed by the conveying means 106 in the loading direction 13.

The first upper surfaces 42a and 42b of the longitudinal end portions of the first member 40 are collectively adapted to bring the upper surface of the partially overlapped optical discs into contact with the surface of the roller member 61 of the conveying means 106 before bring the upper surface of the partially overlapped optical discs into contact with each of the first lower surfaces 51a and 56a of the second members 50 and 55 of the regulating means 108 under the condition that the conveyance of the partially overlapped optical discs is performed by the conveying means 106 in the loading direction 13.

The roller member 61 of the conveying means 106 is supported by the base member 30 of the regulating means 108 to be movable toward and away from the imaginary disc path. The regulating means 108 includes a pair of third members 80 and 85 collectively for preventing the roller member 61 of the conveying means 106 from being moved in the first direction 11, i.e., away from the imaginary disc path. Each of the third members 80 and 85 is each supported by the base member 30 of the regulating means 108 to be movable toward and away from the imaginary disc path. The urging means 110 is adapted to resiliently urge each of the third members 80 and 85 of the regulating means 108 in the second direction 12.

The roller member 61 of the conveying means 106 includes a pair of supporting members 62 and 63 for rotatably supporting the roller member 61. The supporting members 62 and 63 respectively have outer surfaces 62a and 63a. The third members 80 and 85 of the regulating means 108 respectively have projected portions respectively having lower surfaces 81 and 86 to be brought into contact with the outer surfaces 62a and 63a of the supporting members 62 and 63.

The first upper surfaces 42a and 42b of the longitudinal end portions of the first member 40 of the regulating means 108 are collectively adapted to fail to bring the outer surfaces 62a and 63a of the supporting members 62 and 63 of the conveying means 106 into contact with the lower surfaces 81 and 86 of the third members 80 and 85 of the regulating means 108 with the upper surface of the one optical disc brought into contact with the surface of the roller member 61 of the conveying means 106 under the condition that the conveyance of the one optical disc is performed by the conveying means 106 in the loading direction 13.

The first upper surfaces 42a and 42b of the longitudinal end portions of the first member 40 of the regulating means 108 are respectively adapted to bring the outer surfaces 62a and 63a of the supporting members 62 and 63 of the conveying means 106 into contact with the lower surfaces 81 and 86 of the third members 80 and 85 of the regulating means 108 with the upper surface of the partially overlapped optical discs brought into contact with the surface of the roller member 61 of the conveying means 106 under the condition that the conveyance of the partially overlapped optical discs is performed by the conveying means 106 in the loading direction 13.

The lower surface 81 of one of the third members 80 and 85 of the regulating means 108 and the outer surface 62a of one of the supporting members 62 and 63 of the conveying means 106 forms in combination a first gap 10c (see FIG. 22) between the lower surface 81 of one of the third members 80 and 85 of the regulating means 108 and the outer surface 62a of one of the supporting members 62 and 63 of the conveying means 106 under the condition that the surface of the roller member 61 of the conveying means 106 is brought into contact with the upper surface of the one optical disc to be moved into the housing 101, and the first upper surfaces 42a and 42b of the longitudinal end portions of the first member 40 of the regulating means 108 being brought into contact with the lower peripheral edge of the one optical disc to be moved into the housing 101.

The lower surface 86 of the other of the third members 80 and 85 of the regulating means 108 and the outer surface 63a of the other of the supporting member 62 and 63 of the conveying means 106 forms in combination a second gap (see FIG. 22) 10d between the lower surface 86 of the other of the third members 80 and 85 of the regulating means 108 and the outer surface 63a of the other of the supporting members 62 and 63 of the conveying means 106 under the condition that the surface of the roller member 61 of the conveying means 106 is brought into contact with the upper surface of the one optical disc to be moved into the housing 101, and the first upper surfaces 42a and 42b of the longitudinal end portions of the first member 40 of the regulating means 108 being brought into contact with the lower peripheral edge of the one optical disc to be moved into the housing 101.

The first gap 10c between the lower surface 81 of one of the third members 80 and 85 of the regulating means 108 and the outer surface 62a of one of the supporting members 62 and 63 of the conveying means 106 is smaller than the thickness of the one optical disc to be moved into and out of the housing 101, while the second gap 10d between the lower surface 86 of the other of the third members 80 and 85 of the regulating means 108 and the outer surface 63a of the other of the supporting members 62 and 63 of the conveying means 106 being smaller than the thickness of the one optical disc to be moved into and out of the housing 101.

Figure 21:
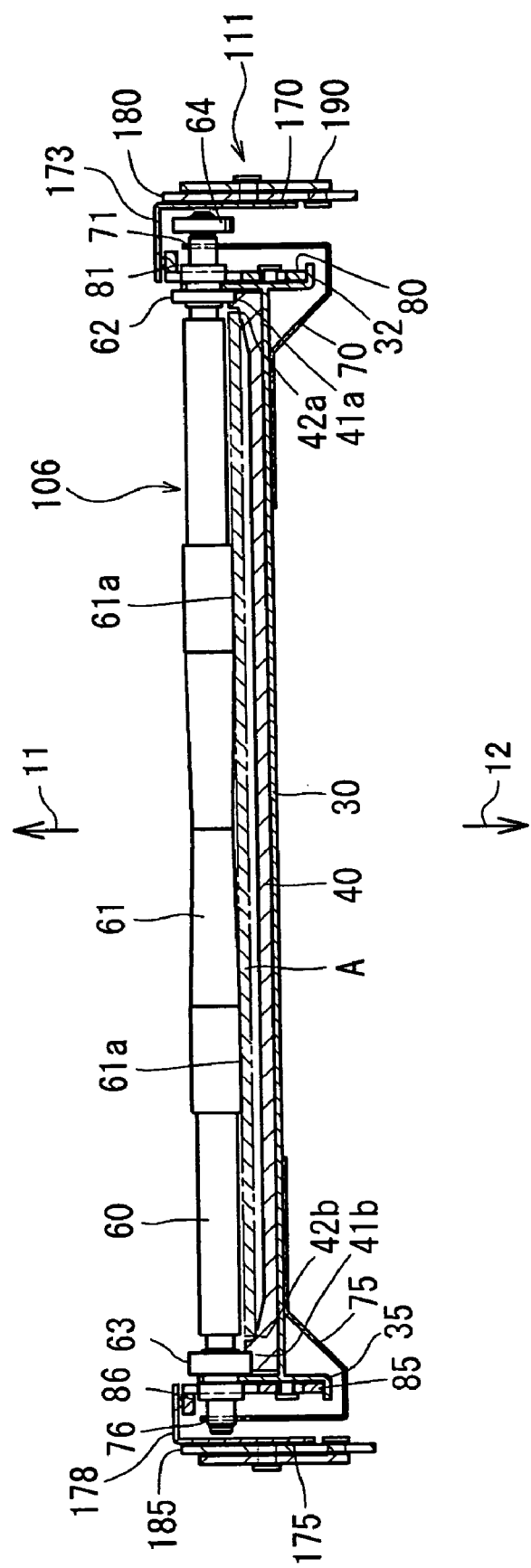
FIG. 21 is a fragmental front view showing the conveying means and the urging means of the first embodiment of the optical disc driving apparatus according to the present invention.

The surface 61a of the roller member 61 of the conveying means 106 and the upper first surfaces 42a and 42b of the longitudinal end portions of the first member 40 of regulating means 108 define in combination an imaginary slot (see FIGS. 21 and 22) in the form of a rectangle shape in cross-section taken along the imaginary disc path. The imaginary slot has a pair of imaginary upright surfaces and imaginary upper and lower surfaces. The imaginary upright surfaces of the imaginary slot each is in parallel relationship with the center plane of the housing 101. The imaginary upper and lower surfaces of the imaginary slot each is in parallel relationship with the disc path, while the imaginary upper surface of the imaginary slot is held in contact with the surface 61a of the roller member 61 of the conveying means 106.

The imaginary slot has a pair of lower edges respectively held in contact with the first upper surfaces of the longitudinal end portions of the first member 40 of the regulating means 108. The imaginary upright surfaces of the imaginary slot define in combination a first distance 10a between the imaginary upright surfaces of the imaginary slot, while the imaginary upper and lower surfaces of the imaginary slot define in combination a second distance 10b between the imaginary upper and lower surfaces of the imaginary slot. The second distance between the imaginary upper and lower surfaces of the imaginary slot is smaller than the thickness of the one optical disc to be moved into and out of the housing 101 under the condition that the first distance between the imaginary upright surfaces of the imaginary slot is equal to a diameter of the optical disc to be moved into and out of the housing 101.

The urging means 110 is adapted to assume two different operational states consisting of a first operational state to resiliently urging each of the third members 80 and 85 of the regulating means 108 in the second direction 12 with a first resilient force thereof under the condition that the conveyance of the optical disc is performed by the conveying means 106 in the loading direction 13, and a second operational state to resiliently urging each of the third members 80 and 85 of the regulating means 108 in the second direction 12 with a second resilient force thereof which is smaller than the first resilient force under the condition that the conveyance of the optical disc is performed by the conveying means 106 in the ejection direction 14 opposite to the loading direction 13. The optical disc driving apparatus 100 further comprises setting means 111 for having the urging means 110 selectively assume the first and second operational states in response to results judged by the judging means 104.

The urging means 110 is constituted by first and second urging members 170 and 175. The first urging member 170 is adapted to resiliently urge both one of the second members 50 and 55 of the regulating means 108 and one of the third members 80 and 85 of the regulating means 108 in the second direction 12, while the second urging member 175 is adapted to resiliently urge both the other of the second members 50 and 55 of the regulating means 108 and the other of the third members 80 and 85 of the regulating means 108 in the second direction 12.

The first urging member 170 of the urging means 110 has a plate portion, and first and second lever portions respectively having a first free end held in engagement with one of the second members 50 and 55 of the regulating means 108, and a second free end held in engagement with one of the third members 80 and 85 of the regulating means 108, the first and second lever portions forming part of the first urging member 170 respectively having first and second fix ends each integrally formed with the plate portion forming part of the first urging member 170. The second urging member 175 of the urging means 110 has a plate portion, and first and second lever portions respectively having a first free end held in engagement with the other of the second members 50 and 55 of the regulating means 108, and a second free end held in engagement with the other of the third members 80 and 85 of the regulating means 108, the first and second lever portions forming part of the second urging member 175 respectively having first and second fix ends each integrally formed with the plate portion forming part of the second urging member 175.

The setting means 111 includes first and second base members 180 and 185 each supported by the housing 101, and first and second cam members 190 and 195 respectively slidably supported by the first and second base members 180 and 185 each to be movable between first and second operational positions in association with the first and second operational states of the first and second urging members 170 and 175 of the urging means 110.

The controlling means 107 is adapted to control the first and second cam members 190 and 195 of the setting means 111 to have the first and second cam members 190 and 195 of the setting means 111 selectively assume the first and second operational positions based on results judged by the judging means 104. The controlling means 107 is adapted to control the first and second cam members 190 and 195 of the setting means 111 to have each of the first and second cam members 190 and 195 of the setting means 111 assume the first operational position when the conveyance of the optical disc is performed by the conveying means 106 in the loading direction 13.

The conveying means 106 is adapted to perform the conveyance of the optical disc to be moved in the loading direction 13 under the condition that the roller member 61 of the conveying means 106 is resiliently urged by the first and second urging members 170 and 175 with the first resilient force. The controlling means 107 is adapted to control the roller member 61 of the conveying means 106 to have the roller member 61 of the conveying means 106 stop performing the conveyance of the optical disc when the judgment is made by the judging means 104 as the conveyance of the optical disc to be moved into the housing 101 is complete within the specific time interval based on results judged by the judging means 104.

The controlling means 107 is adapted to control the first and second cam members 190 and 195 of the setting means 111 to have each of the first and second cam members 190 and 195 of the setting means 111 assume the second operational position before controlling the roller member 61 of the conveying means 106 to have the roller member 61 of the conveying means 106 perform the conveyance of the optical disc in the ejection direction 14.

Figure 17:
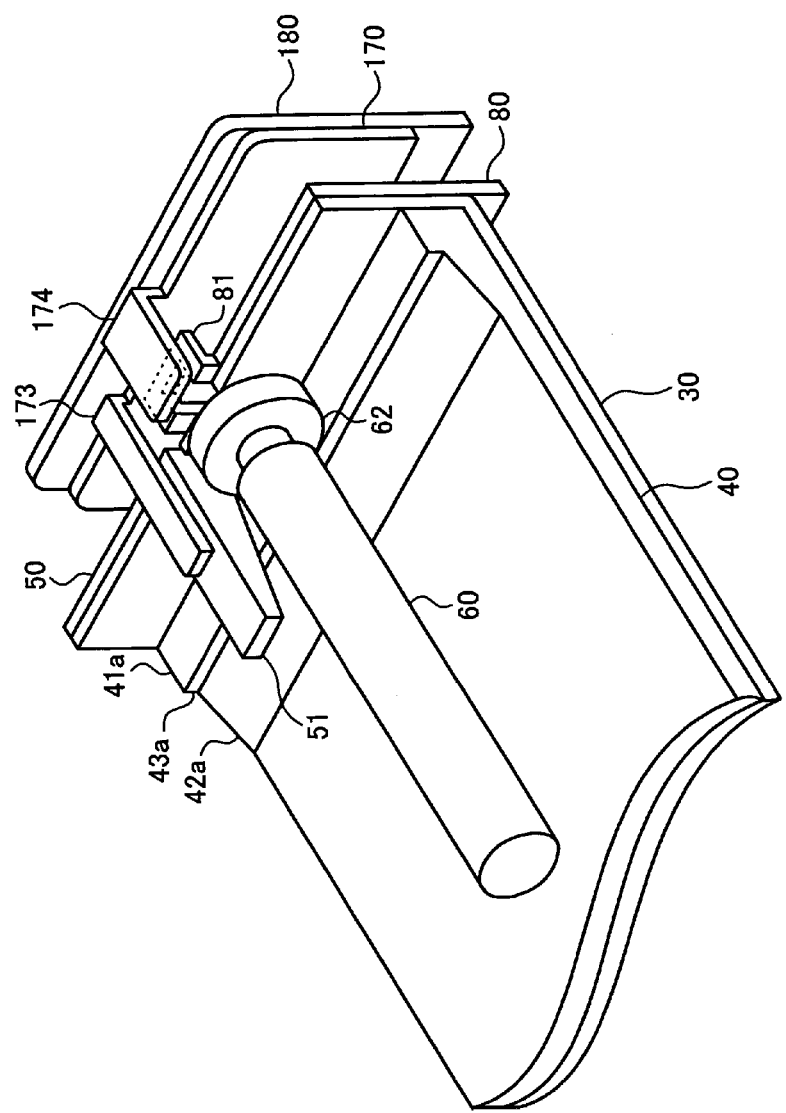
FIG. 17 is a fragmental plan view showing the conveying means and the regulating means of the first embodiment of the optical disc driving apparatus according to the present invention.
Figure 18:
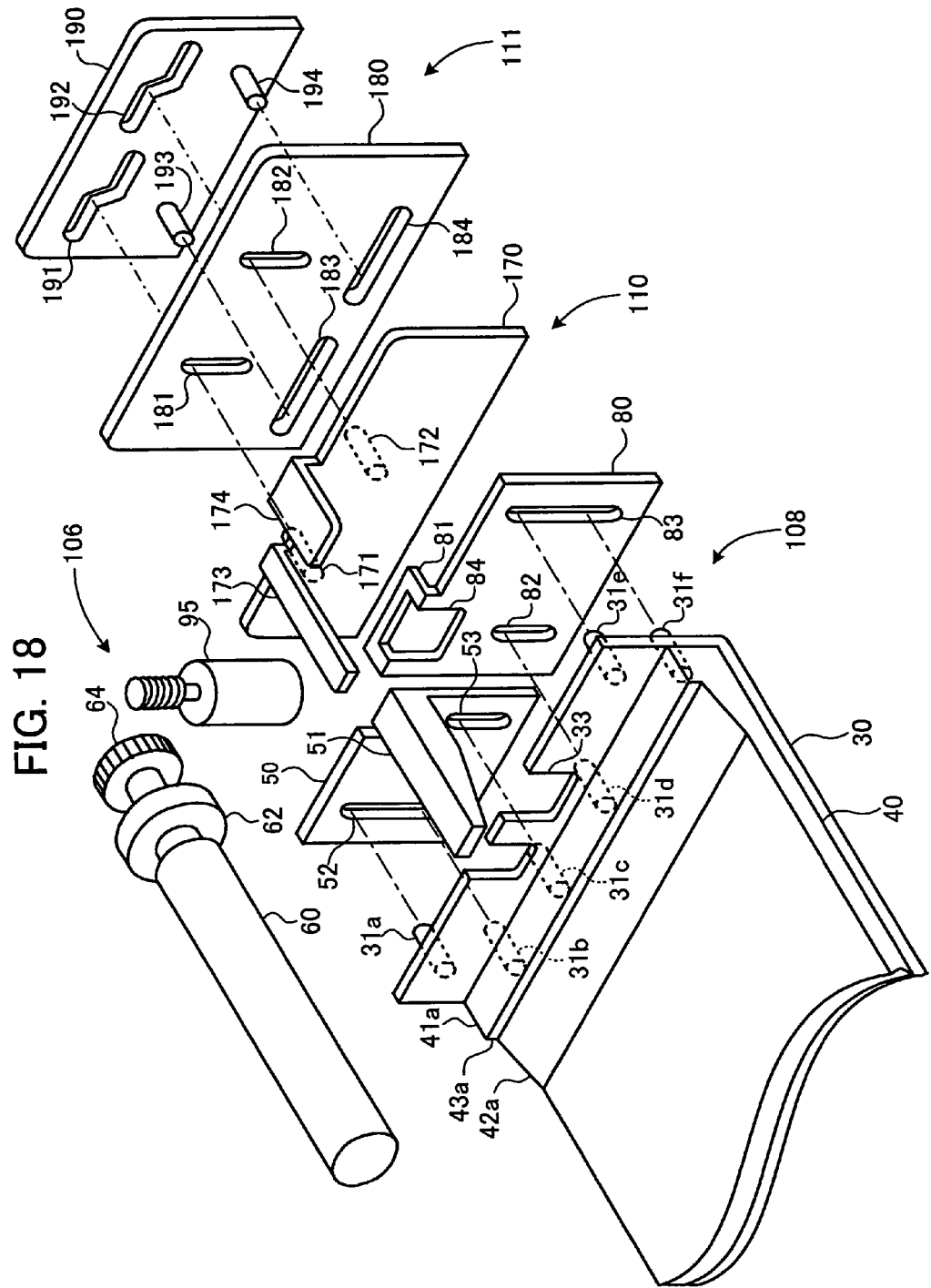
FIG. 18 is a front view showing the regulating means and the urging means of the first embodiment of the optical disc driving apparatus according to the present invention.
Figure 19:
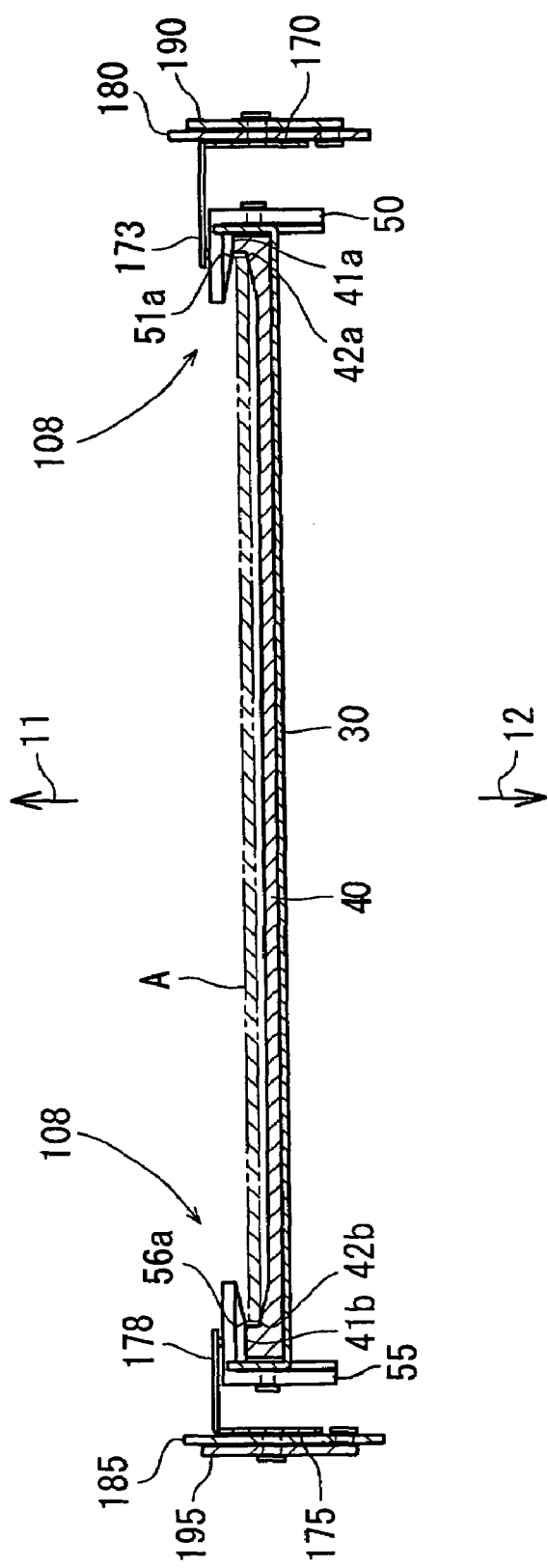
FIG. 19 is a fragmental front view showing the regulating means and the urging means of the first embodiment of the optical disc driving apparatus according to the present invention.
Figure 20:
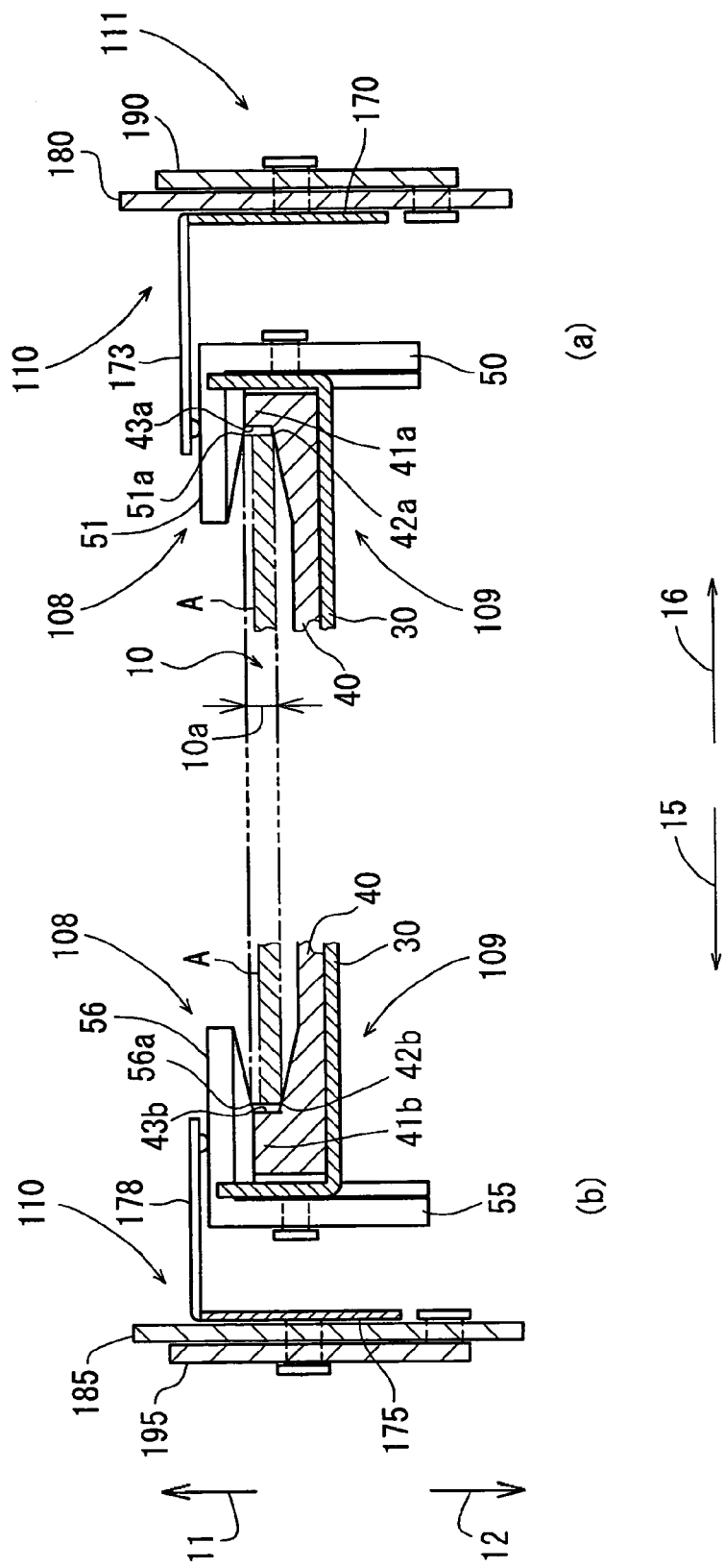
FIG. 20 is a front view showing the conveying means and the urging means of the first embodiment of the optical disc driving apparatus according to the present invention.

The first and second base members 180 and 185 of the setting means 111 (see. FIGS. 17 and 18) each extends toward a rear plate (not shown) of the housing 101 from the vicinity of the front plate 101b along the center plane of the housing 101. The first and second base members 180 and 185 of the setting means 111 each has a first extreme end close to the front plate 101b of the housing 101, a second extreme end distant from the front plate 101b of the housing 101, a lower extreme end close to the lower plate 101c of the housing 101, and an upper extreme end distant from the lower plate 101c of the housing 101. The first base member 180 has first and second flat surfaces each parallel to the center plane of the housing 101, while the second base member 185 has first and second flat surfaces each parallel to the center plane of the housing 101.

The first base member 180 of the setting means 111 has first and second cam slots 181 and 182 each extending toward the lower extreme end of the first base member 180 from the vicinity of the upper extreme end of the first base member 180, a third cam slot 183 extending toward the first extreme end of the first base member 180 from the vicinity of the second extreme end of the first base member 180, and a fourth cam slot 184 extending toward the second extreme end of the first base member 180 from the vicinity of the first extreme end of the first base member 180.

The first and second cam slots 181 and 182 of the first base member 180 respectively have a central line passing through the longitudinal ends thereof, while the third and fourth cam slots 183 and 184 of the first base member 180 respectively have a central line passing through the longitudinal ends thereof. The central lines of the first and second cam slots 181 and 182 of the first base member 180 each is perpendicular to the disc path, while the central line of the third and fourth cam slots 183 and 184 of the first base member 180 each parallel to each of the disc path and the center plane of the housing 101.

On the other hand, the second base member 185 of the setting means 111 has first and second cam slots 186 and 187 each extending toward the lower extreme end of the second base member 185 from the vicinity of the upper extreme end of the second base member 185, a third cam slot 188 extending toward the first extreme end of the second base member 185 from the vicinity of the second extreme end of the second base member 185, and a fourth cam slot 189 extending toward the second extreme end of the second base member 185 from the vicinity of the first extreme end of the second base member 185.

The first and second cam slots 186 and 187 of the second base member 185 respectively have a central line passing through the longitudinal ends thereof, while the third and fourth cam slots 188 and 189 of the second base member 185 respectively have a central line passing through the longitudinal ends thereof. The central lines of the first and second cam slots 186 and 187 of the second base member 185 each is perpendicular to the disc path, while the central line of the third and fourth cam slots 188 and 189 of the second base member 185 each parallel to each of the disc path and the center plane of the housing 101.

The first and second cam members 190 and 195 of the setting means 111 (see. FIGS. 17 and 18) each extends toward the rear plate (not shown) of the housing 101 from the vicinity of the front plate 101b along the center plane of the housing 101. The first and second cam members 190 and 195 each has a first extreme end close to the front plate 101b of the housing 101, a second extreme end distant from the front plate 101b of the housing 101, a lower extreme end close to the lower plate 101c of the housing 101, and an upper extreme end distant from the lower plate 101c of the housing 101. The first cam member 190 has a flat surface to be held in contact with the first flat surface of the first base member 180 of the setting means 111, while the second cam member 195 has a flat surface to be held in contact with the first flat surface of the second base member 185 of the setting means 111.

The first cam member 190 has first and second cam slots 191 and 192 each having an upper parallel portion, a lower parallel portion, and a slanted portion intervening between the upper parallel portion and the lower parallel portion. The upper parallel portion forming part of the first cam slot 191 of the first cam member 190 has first and second longitudinal ends, while the lower parallel portion forming part of the first cam slot 191 of the first cam member 190 has first and second longitudinal ends. The upper parallel portion forming part of the first cam slot 191 of the first cam member 190 has a central line passing through the first and second longitudinal ends thereof, while the lower parallel portion forming part of the first cam slot 191 of the first cam member 190 has a central line passing through the first and second longitudinal ends thereof. The central lines of the upper and lower parallel portions forming part of the first cam slot 191 of the first cam member 190 are in parallel relationship with each other.

The slanted portion forming part of the first cam slot 191 of the first cam member 190 has a first longitudinal end formed with the lower parallel portion of the first cam slot 191 of the first cam member 190, and a second longitudinal end formed with the upper parallel portion forming part of the first cam slot 191 of the first cam member 190. The first longitudinal end of the slanted portion forming part of the first cam slot 191 of the first cam member 190 is close to the disc path, while the second longitudinal end of the slanted portion forming part of the first cam slot 191 of the first cam member 190 is distant from the disc path. The slanted portion forming part of the first cam slot 191 of the first cam member 190 has a central line passing through the first and second longitudinal ends thereof. The central line of the slanted portion forming part of the first cam slot 191 of the first cam member 190 is inclined with respect to each of the central lines of the first and second parallel portions forming part of the first cam slot 191 of the first cam member 190.

Similarly, the upper parallel portion forming part of the second cam slot 192 of the first cam member 190 has first and second longitudinal ends, while the lower parallel portion forming part of the second cam slot 192 of the first cam member 190 has first and second longitudinal ends. The upper parallel portion forming part of the second cam slot 192 of the first cam member 190 has a central line passing through the first and second longitudinal ends thereof, while the lower parallel portion forming part of the second cam slot 192 of the first cam member 190 has a central line passing through the first and second longitudinal ends thereof. The central lines of the upper and lower parallel portions forming part of the second cam slot 192 of the first cam member 190 are in parallel relationship with each other.

The slanted portion forming part of the second cam slot 192 of the first cam member 190 has a first longitudinal end formed with the lower parallel portion forming part of the second cam slot 192 of the first cam member 190, and a second longitudinal end formed with the upper parallel portion forming part of the second cam slot 192 of the first cam member 190. The first longitudinal end of the slanted portion forming part of the second cam slot 192 of the first cam member 190 is close to the disc path, while the second longitudinal end of the slanted portion forming part of the second cam slot 192 of the first cam member 190 is distant from the disc path. The slanted portion forming part of the second cam slot 192 of the first cam member 190 has a central line passing through the first and second longitudinal ends thereof. The central line of the slanted portion forming part of the second cam slot 192 of the first cam member 190 is inclined with respect to each of the central lines of the first and second parallel portions of the second cam slot 192 of the first cam member 190.

On the other hand, the second cam member 195 has first and second cam slots 196 and 197 each having an upper parallel portion, a lower parallel portion, and a slanted portion intervening between the upper parallel portion and the lower parallel portion. The upper parallel portion forming part of the first cam slot 196 of the second cam member 195 has first and second longitudinal ends, while the lower parallel portion forming part of the first cam slot 196 of the second cam member 195 has first and second longitudinal ends. The upper parallel portion forming part of the first cam slot 196 of the second cam member 195 has a central line passing through the first and second longitudinal ends thereof, while the lower parallel portion forming part of the first cam slot 196 of the second cam member 195 has a central line passing through the first and second longitudinal ends thereof. The central lines of the upper and lower parallel portions forming part of the first cam slot 196 of the second cam member 195 are in parallel relationship with each other.

The slanted portion forming part of the first cam slot 196 of the second cam member 195 has a first longitudinal end formed with the lower parallel portion of the first cam slot 196 of the second cam member 195, and a second longitudinal end formed with the upper parallel portion forming part of the first cam slot 196 of the second cam member 195. The first longitudinal end of the slanted portion forming part of the first cam slot 196 of the second cam member 195 is close to the disc path, while the second longitudinal end of the slanted portion forming part of the first cam slot 196 of the second cam member 195 is distant from the disc path. The slanted portion forming part of the first cam slot 196 of the second cam member 195 has a central line passing through the first and second longitudinal ends thereof. The central line of the slanted portion forming part of the first cam slot 196 of the second cam member 195 is inclined with respect to each of the central lines of the first and second parallel portions forming part of the first cam slot 196 of the second cam member 195.

Similarly, the upper parallel portion forming part of the second cam slot 197 of the second cam member 195 has first and second longitudinal ends, while the lower parallel portion of the second cam slot 197 of the second cam member 195 has first and second longitudinal ends. The upper parallel portion forming part of the second cam slot 197 of the second cam member 195 has a central line passing through the first and second longitudinal ends thereof, while the lower parallel portion forming part of the second cam slot 197 of the second cam member 195 has a central line passing through the first and second longitudinal ends thereof. The central lines of the upper and lower parallel portions forming part of the second cam slot 197 of the second cam member 195 are in parallel relationship with each other.

The slanted portion forming part of the second cam slot 197 of the second cam member 195 has a first longitudinal end formed with the lower parallel portion forming part of the second cam slot 197 of the second cam member 195, and a second longitudinal end formed with the upper parallel portion forming part of the second cam slot 197 of the second cam member 195. The first longitudinal end of the slanted portion forming part of the second cam slot 197 of the second cam member 195 is close to the disc path, while the second longitudinal end of the slanted portion forming part of the second cam slot 197 of the second cam member 195 is distant from the disc path. The slanted portion forming part of the second cam slot 197 of the second cam member 195 has a central line passing through the first and second longitudinal ends thereof. The central line of the slanted portion forming part of the second cam slot 197 of the second cam member 195 is inclined with respect to each of the central lines of the first and second parallel portions forming part of the second cam slot 197 of the second cam member 195.

The first cam member 190 of the setting means 111 is integrally formed with first and second pins 193 and 194 each extending toward the center plane of the housing 101, while the second cam member 195 of the setting means 111 is integrally formed with first and second pins 198 and 199 each extending toward the center plane of the housing 101. The first and second pins 193 and 194 of the first cam member 190 of the setting means 111 respectively have central lines parallel to each other, while the first and second pins 198 and 199 of the second cam member 195 of the setting means 111 respectively have central lines parallel to each other. The first and second pins 193 and 194 of the first cam member 190 of the setting means 111 are respectively slidably received by the third and fourth slots 183 and 184 of the first base member 180, while the first and second pins 198 and 199 of the second cam member 195 of the setting means 111 are respectively slidably received by the third and fourth slots 188 and 189 of the second base member 185.

The first and second urging members 170 and 175 of the urging means 110 are shown in FIG. 18 as each having a plate portion and first and second lever portions. The plate portion forming part of each of the first and second urging members 170 and 175 extends toward the rear plate (not shown) of the housing 101 from the vicinity of the front plate 101b along the center plane of the housing 101. The plate portion forming part of the first urging member 170 has a flat surface to be held in contact with the second flat surface of the first base member 180 of the setting means 111, while the plate portion forming part of the second urging member 175 has a flat surface to be held in contact with the second flat surface of the second base member 185 of the setting means 111.

The plate portion of each of the first and second urging members 170 and 175 has an upper extreme end. The first and second lever portions 173 and 174 forming part of the first urging member 170 each has a free end and a fixed end integrally formed with the upper extreme end of the plate portion forming part of the first urging member 170, while the first and second lever portions 178 and 179 forming part of the second urging member 175 each has a free end and a fixed end integrally formed with the upper extreme end of the plate portion forming part of the second urging member 175. The first and second lever portions 173 and 174 each forming part of the first urging member 170 extends toward the center plane of the housing 101 from the extreme end of the plate portion forming part of the first urging member 170 in a cantilever fashion, while the first and second lever portions 178 and 179 each forming part of the second urging member 175 extends toward the center plane of the housing 101 from the extreme end of the plate portion forming part of the second urging member 175 in a cantilever fashion.

The operation of the first embodiment of the optical disc driving apparatus 100 according to the present invention will then be described hereinafter.

The following description will be directed to the case that one optical disc is moved in the loading direction while being held in contact with the surface of the roller member of the conveying means of the optical disc driving apparatus according to the present invention (see FIGS. 7 to 9, and 19 to 22).

The lights respectively projected by the light sources 160b to 162b of the first to third optical sensors 160 to 162 of the third detecting means 105 are respectively received by the light receivers 160a to 162a in association with the light sources 160b to 162b of the first to third optical sensors 160 to 162 of the third detecting means 105, i.e., the first signals "Lo" indicative of the first operational state of the light receivers 160a to 162a of the first to third optical sensors 160 to 162 of the third detecting means 105 are respectively produced by the first to third optical sensors 160 to 162 of the third detecting means 105 before the optical disc "A" is moved into the housing 101.

The light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102 before the optical disc "A" is moved into the housing 101.

On the other hand, the light projected by the light source of the optical sensor 150 of the second detecting means 103 is intercepted by the projected portion 134 of the pivotal member 130 of the second detecting means 103 without being received by the light receiver in association with the light source of the optical sensor 150 of the second detecting means 103, i.e., the second signal "Hi" indicative of the second operational state of the light receiver of the optical sensor 150 of the second detecting means 103 is produced by the optical sensor 150 of the second detecting means 103 at the first point "T1" before the optical disc "A" is moved into the housing 101.

The judgment is firstly made by the judging means 104 on whether or not the optical disc "A" is partially passed through the loading slot 101a of the housing 101 based on results produced by the optical sensors 150 and 151 of the first and second detecting means 102 and 103 and results produced by the first to third optical sensors 160 to 162 of the third detecting means 105 in the step S101. When the answer in the step S101 is in the affirmative "YES", i.e., the optical disc "A" is partially passed through the loading slot 101a of the housing 101, the step S101 proceeds to the step S102. When, on the other hand, the answer in the step S101 is in the negative "NO", i.e., the optical disc "A" is not partially passed through the loading slot 101a of the housing 101, the step S101 does not proceed to the step S102.

Here, the first and second cam members 190 and 195 of the setting means 111 are controlled by the controlling means 107 to respectively assume the first operational position before the conveyance of the optical disc "A" to be moved in the loading direction 13 is performed by the conveying means 106. The second member 50 and the third member 80 of the regulating means 108 are resiliently urged by the urging member 170 of the urging means 110 toward the second direction 12, i.e., toward the imaginary disc path with the first resilient force thereof, while the second member 55 and the third member 85 of the regulating means 108 are resiliently urged by the urging member 175 of the urging means 110 toward the second direction 12 with the first resilient force thereof.

Figure 7:
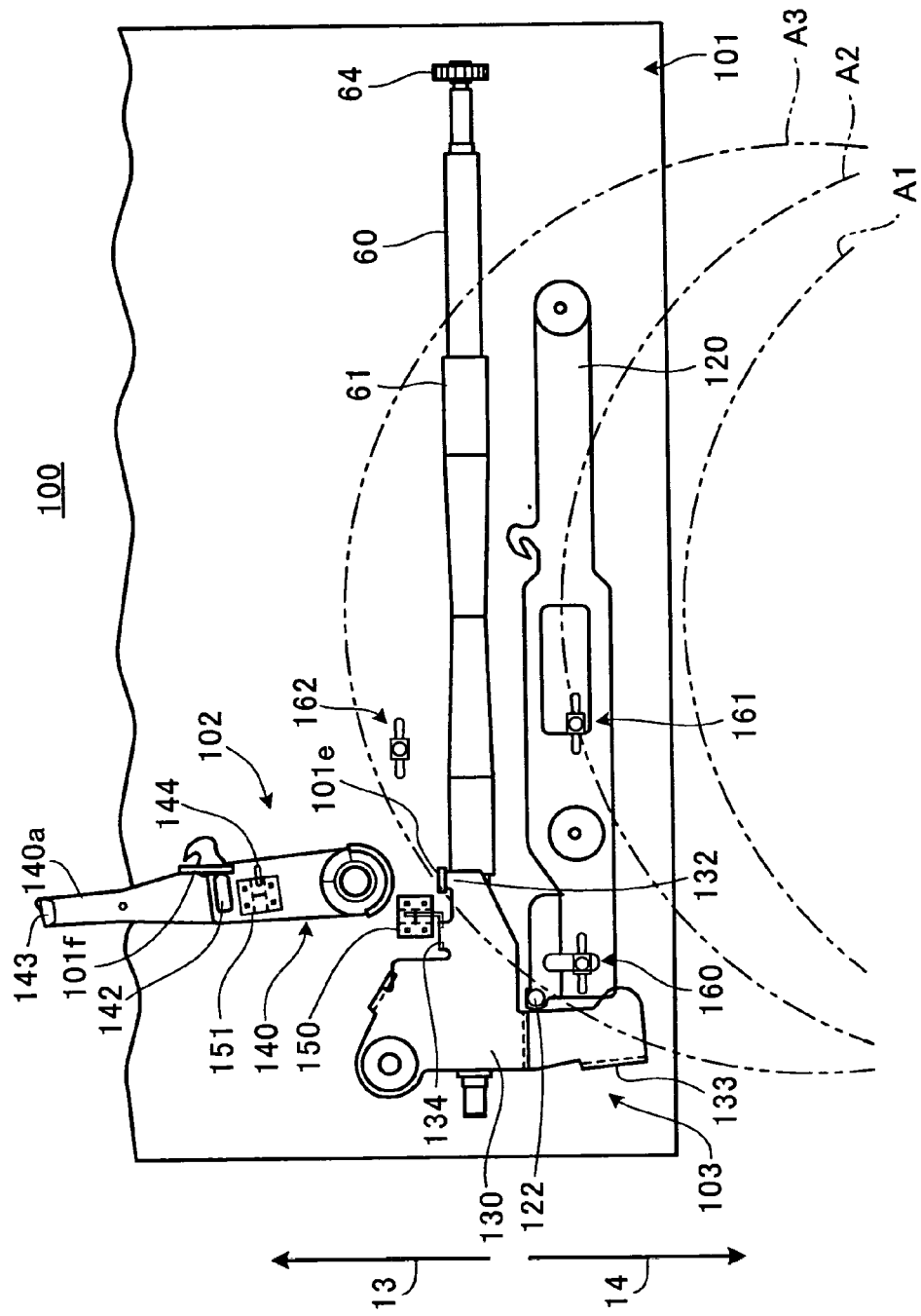
FIG. 7 a fragmental plan view showing pivotal members of the first and second detecting means of the optical disc driving apparatus according to first embodiment of the present invention pivotally moved around their pivotal axis while being held in contact with one optical disc moved in the loading direction.

The optical disc "A" is then partially passed through the loading slot 101a of the housing 101, i.e., the optical disc "A" is moved to a second position "A2" from a first position "A1" (see FIG. 7).

The light projected by the light source 161b of the second optical sensor 161 of the third detecting means 105 is intercepted by the outer peripheral portion of the optical disc "A" partially passed through the loading slot 101a of the housing 101 without being received by the light receiver 161a of the second optical sensor 161 of the third detecting means 105, i.e., the second signal "Hi" indicative of the second operational state of the light receiver 161a of the second optical sensor 161 of the third detecting means 105 are respectively produced by the second optical sensor 161 of the third detecting means 105 when the optical disc "A" is moved to the second position "A2" from the first position "A1".

On the other hand, the lights respectively projected by the light sources 160b and 162b of the first and third optical sensors 160 and 162 are respectively received by the light receivers 160a and 162a of the first and third optical sensors 160 and 162 without being intercepted by the outer peripheral portion of the optical disc "A" partially passed through the loading slot 101a of the housing 101, i.e., the first signals "Lo" indicative of the first operational state of the light receivers 160a and 162a of the first and third optical sensors 160 and 162 of the third detecting means 105 are respectively produced by the first and third optical sensors 160 and 162 of the third detecting means 105 when the optical disc "A" is moved to the second position "A2" from the first position "A1".

The light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102 when the optical disc "A" is moved to the second position "A2" from the first position "A1".

On the other hand, the light projected by the light source of the optical sensor 150 of the second detecting means 103 is intercepted by the projected portion 134 of the pivotal member 130 of the second detecting means 103 without being received by the light receiver in association with the light source of the optical sensor 150 of the second detecting means 103, i.e., the second signal "Hi" indicative of the second operational state of the light receiver of the optical sensor 150 of the second detecting means 103 is produced by the optical sensor 150 of the second detecting means 103 when the optical disc "A" is moved to the second position "A2" from the first position "A1".

The judgment is then made by the judging means 104 whether or not the optical disc "A" is partially passed through the loading slot 101a of the housing 101, i.e., the optical disc "A" is moved to the second position "A2" based on result produced by the optical sensors 150 and 151 of the first and second detecting means 102 and 103 and results produced by the first to third optical sensors 160 to 162 of the third detecting means 105 at a first point "T1" (see FIG. 9) in the step S102. When the answer in the step S102 is in the affirmative "YES", i.e., the optical disc "A" is moved to the second position "A2", the step S102 proceeds to the step S103. When, on the other hand, the answer in the step S102 is in the negative "NO", i.e., the optical disc "A" is moved to the second position "A2", the step S102 does not proceed to the step S103.

The controlling means 107 is then operated to control the conveying means 106 to have the driving motor 95 of the conveying means 106 produce the rotation torque in response to results judged by the judging means 104 in the step S103. The roller member 61 of the conveying means 106 is operated to be moved around the central axis of the rotation shaft 60 in response to the rotation torque received from the driving motor 95 through the driven gear 64 under the condition that the roller member 61 of the conveying means 106 is resiliently urged by the first and second urging members 70 and 75 of the conveying means 106. The optical disc "A" partially passed through the loading slot 101a of the housing 101 is then moved into the housing 101 along the disc path in response to the rotation torque produced by the driving motor 95 of the conveying means 106 while being held in contact with the surface of the roller member 61 of the conveying means 106.

The optical disc "A" is then moved to a third position "A3" from the second position "A2" (see FIG. 7).

The lights projected by the light sources 160b to 162b of the first to third optical sensors 160 to 162 are intercepted by the outer peripheral portion of the optical disc "A" moved to the third position "A3" from the second position "A2" along the disc path without being received by the light receivers 160a to 162a of the first to third optical sensors 160 to 162, i.e., the second signals "Hi" indicative of the second operational state of the light receivers 160a to 162a of the first to third optical sensors 160 to 162 of the third detecting means 105 are respectively produced by the first to third optical sensors 160 to 162 of the third detecting means 105 when the optical disc "A" is moved to the third position "A3" from the second position "A2".

The light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102 when the optical disc "A" is moved to the third position "A3" from the second position "A2".

On the other hand, the light projected by the light source of the optical sensor 150 of the second detecting means 103 is intercepted by the projected portion 134 of the pivotal member 130 of the second detecting means 103 without being received by the light receiver in association with the light source of the optical sensor 150 of the second detecting means 103, i.e., the second signal "Hi" indicative of the second operational state of the light receiver of the optical sensor 150 of the second detecting means 103 is produced by the optical sensor 151 of the second detecting means 103 when the optical disc "A" is moved to the third position "A3" from the second position "A2".

The judgment is made by the judging means 104 as the optical disc "A" is partially passed through the loading slot 101a of the housing 101, i.e., the optical disc "A" is moved to the third position "A3" from the second position "A2" based on result produced by the optical sensors 150 and 151 of the first and second detecting means 102 and 103 and results produced by the first to third optical sensors 160 to 162 of the third detecting means 105.

Figure 8:
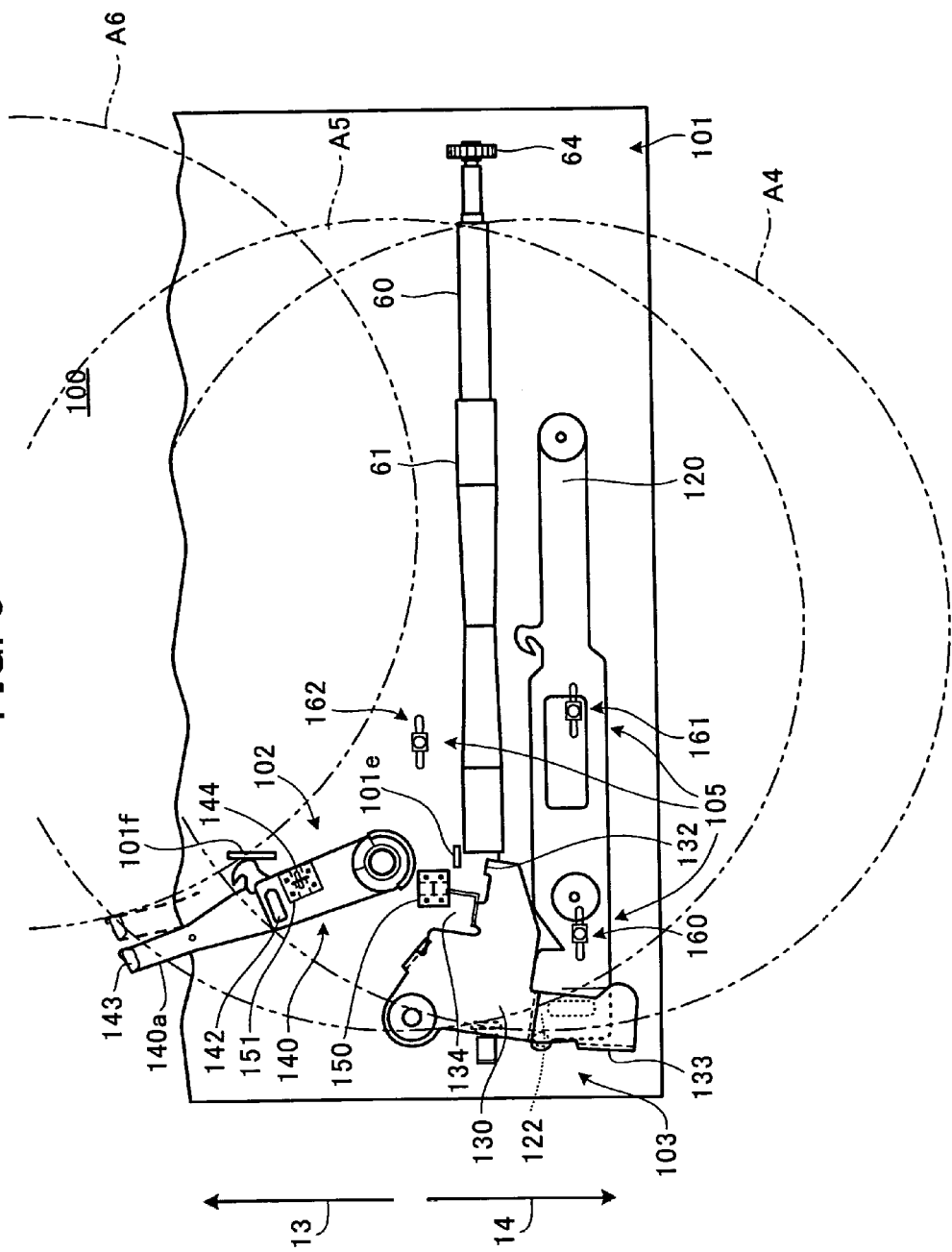
FIG. 8 is a fragmental plan view showing pivotal members of the first and second detecting means of the optical disc driving apparatus according to first embodiment of the present invention pivotally moved around their pivotal axis while being held in contact with one optical disc moved in the loading direction.

The optical disc "A" is then moved to a fourth position "A4" from the third position "A3" (see FIG. 8).

The lights projected by the light sources 160b to 162b of the first to third optical sensors 160 to 162 are intercepted by the optical disc "A" moved to the fourth position "A4" from the third position "A3" without being received by the light receivers 160a to 162a of the first to third optical sensors 160 to 162, i.e., the second signals "Hi" indicative of the second operational state of the light receivers 160a to 162a of the first to third optical sensors 160 to 162 of the third detecting means 105 are respectively produced by the first to third optical sensors 160 to 162 of the third detecting means 105 when the optical disc "A" is moved to the fourth position "A4" from the third position "A3".

The pivotal member 130 of the second detecting means 103 is pivotably moved toward one of the angular positions thereof from the other of the angular positions thereof while being held in contact with one of the longitudinal ends of the operation member 120, i.e., the pivotal member 130 of the second detecting means 103 is moved clockwise around the center axis of the pivotal shaft 131 of the second detecting means 103 when the pin member 122 of the second detecting means 103 is moved in the third direction 15 while being held in contact with the outer peripheral surface of the optical disc "A" moved to the fourth position "A4" from the third position "A3".

The light projected by the light source of the optical sensor 150 of the second detecting means 103 is received by the light receiver in association with the light source of the optical sensor 150 of the second detecting means 103 without being intercepted by the projected portion 134 of the pivotal member 130 of the second detecting means 103, i.e., the first signal "Lo" indicative of the first operational state of the light receiver of the optical sensor 150 of the second detecting means 103 is produced by the optical sensor 150 of the second detecting means 103 when the pivotal member 130 of the second detecting means 103 is moved clockwise around the center axis of the shaft member 131 of the second detecting means 103.

On the other hand, the light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102 when the optical disc "A" is moved toward the fourth position "A4" from the third position "A3".

Figure 9:
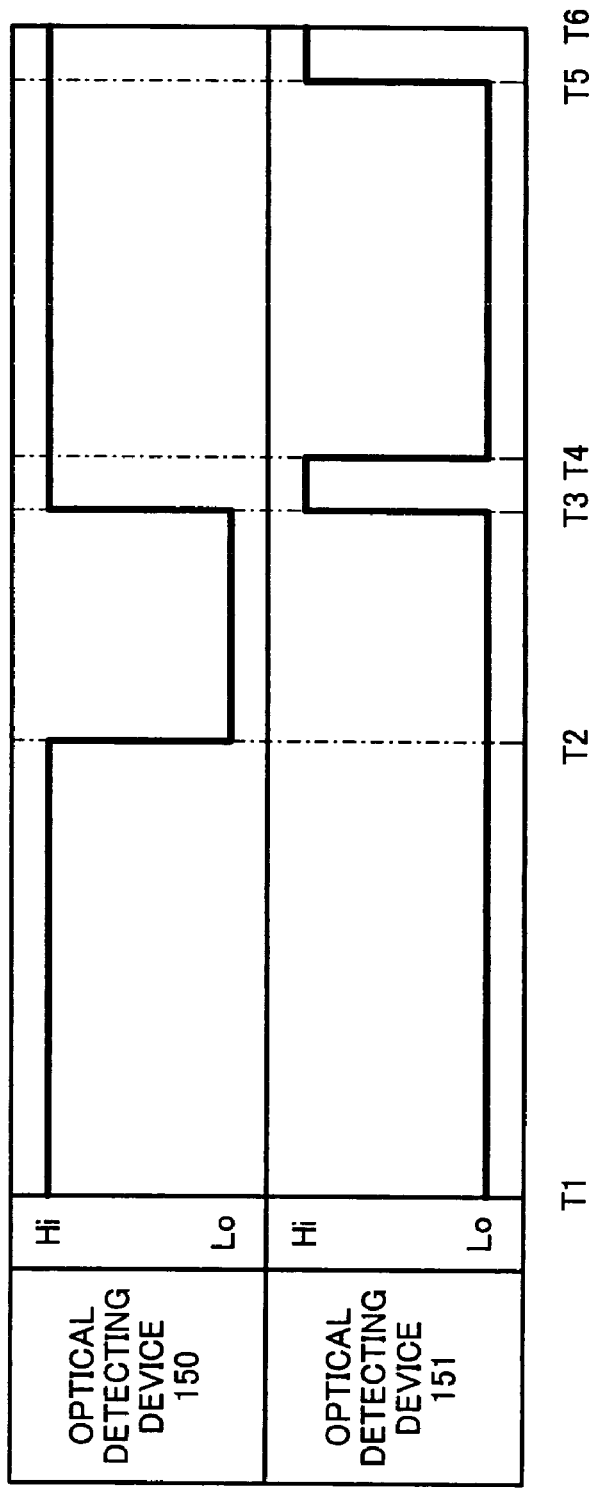
FIG. 9 is a timing chart showing output signals respectively produced by the optical sensors of the first and second detecting means of the first embodiment of the optical disc driving apparatus according to the present invention under the condition that the one optical disc is moved in the loading direction.

The judgment is made by the judging means 104 as the optical disc "A" is partially passed through the loading slot 101a of the housing 101, i.e., the optical disc "A" is moved to the fourth position "A4" from the third position "A3" based on result produced by the optical sensors 150 and 151 of the first and second detecting means 102 and 103 and results produced by the first to third optical sensors 160 to 162 of the third detecting means 105 at a second point "T2" (see FIG. 9).

The optical disc "A" is then moved toward the fifth position "A5" from the fourth position "A4" (see FIG. 8).

The pivotal member 130 of the second detecting means 103 is pivotably moved toward the other of the angular positions thereof from one of the angular positions thereof while being held in contact with one of the longitudinal ends of the operation member 120, i.e., the pivotal member 130 of the second detecting means 103 is moved counterclockwise around the center axis of the pivotal shaft 131 of the second detecting means 103 when the pin member 122 of the second detecting means 103 is moved in the fourth direction 16 while being held in contact with the outer peripheral surface of the optical disc "A" moved toward the fifth position "A5" from the fourth position "A4".

The light projected by the light source of the optical sensor 150 of the second detecting means 103 is intercepted by the projected portion 134 of the pivotal member 130 of the second detecting means 103 without being received by the light receiver in association with the light source of the optical sensor 150 of the second detecting means 103, i.e., the second signal "Hi" indicative of the second operational state of the light receiver of the optical sensor 150 of the second detecting means 103 is produced by the optical sensor 150 of the second detecting means 103 when the pivotal member 130 of the second detecting means 103 is moved counterclockwise around the center axis of the shaft member 131 of the second detecting means 103.

On the other hand, the light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102 when the optical disc "A" is moved toward the fifth position "AS" from the fourth position "A4".

When the optical disc "A" is further moved toward the fifth position "AS" from the fourth position "A4", the pivotal member 140 of the second detecting means 102 is pivotably moved toward one of the angular positions thereof from the other of the angular positions thereof, i.e., the pivotal member 140 of the second detecting means 102 is moved counterclockwise around the center axis of the shaft member 141 of the first detecting means 102 while being held in contact with the outer peripheral surface of the optical disc "A" further moved toward the fifth position "A5" from the fourth position "A4".

The light projected by the light source of the optical sensor 151 of the first detecting means 102 is intercepted by the projected portion 144 of the pivotal member 140 of the first detecting means 102 without being received by the light receiver in association with the light source of the optical sensor 151 of the first detecting means 102, i.e., the second signal "Hi" indicative of the second operational state of the light receiver of the optical sensor 151 of the first detecting means 102 is produced by the optical sensor 151 of the first detecting means 102 when the lever portion 143 of the pivotal member 140 of the second detecting means 102 started to move counterclockwise around the center axis of the shaft member 141 of the first detecting means 102.

The judgment is made by the judging means 104 whether or not the optical disc "A" is moved to the fifth position "A5" from the fourth position "A4" based on result produced by the optical sensors 150 and 151 of the first and second detecting means 102 and 103 and results produced by the first to third optical sensors 160 to 162 of the third detecting means 105 at a third point "T3" (see FIG. 9).

When the optical disc "A" is moved to the fifth position "A5", the light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102.

The judgment is made by the judging means 104 whether or not the optical disc "A" is moved to the fifth position "A5" from the fourth position "A4" based on result produced by the optical sensors 150 and 151 of the first and second detecting means 102 and 103 and results produced by the first to third optical sensors 160 to 162 of the third detecting means 105 at a fourth point "T4" (see FIG. 9).

The optical disc "A" is then moved toward the sixth position "A6" from the fifth position "A5" (see FIG. 8).

The light projected by the light source of the optical sensor 150 of the second detecting means 103 is intercepted by the projected portion 134 of the pivotal member 130 of the second detecting means 103 without being received by the light receiver in association with the light source of the optical sensor 150 of the second detecting means 103, i.e., the second signal "Hi" indicative of the second operational state of the light receiver of the optical sensor 150 of the second detecting means 103 is produced by the optical sensor 150 of the second detecting means 103 when the optical disc "A" is moved toward the sixth position "A6" from the fifth position "A5".

On the other hand, the pivotal member 140 of the second detecting means 102 is pivotably moved toward the other of the angular positions thereof from one of the angular positions thereof, i.e., the pivotal member 140 of the second detecting means 102 is moved clockwise around the center axis of the shaft member 141 of the first detecting means 102 while being held in contact with the outer peripheral surface of the optical disc "A" moved toward the sixth position "A6" from the fifth position "A5".

The light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102 when the lever portion 143 of the pivotal member 140 of the second detecting means 102 started to move clockwise around the center axis of the shaft member 141 of the first detecting means 102.

The light projected by the light source of the optical sensor 151 of the first detecting means 102 is intercepted by the projected portion 144 of the pivotal member 140 of the first detecting means 102 without being received by the light receiver in association with the light source of the optical sensor 151 of the first detecting means 102, i.e., the first signal "Lo" indicative of the first operational state of the light receiver of the optical sensor 151 of the first detecting means 102 is produced by the optical sensor 151 of the first detecting means 102 when the lever portion 143 of the pivotal member 140 of the second detecting means 102 is further moved clockwise around the center axis of the shaft member 141 of the first detecting means 102.

The judgment is made by the judging means 104 as the optical disc "A" is moved to the sixth position "A6" from the fifth position "A5" based on result produced by the optical sensors 150 and 151 of the first and second detecting means 102 and 103 and results produced by the first to third optical sensors 160 to 162 of the third detecting means 105 at a fifth point "T5" (see FIG. 9).

When optical disc "A" is moved to the sixth position "A6" from the fifth position "A5", the light projected by the light source of the optical sensor 151 of the first detecting means 102 is intercepted by the projected portion 144 of the pivotal member 140 of the first detecting means 102 without being received by the light receiver of the optical sensor 151 of the first detecting means 102, i.e., the second signal "Hi" indicative of the second operational state of the light receiver of the optical sensor 151 of the first detecting means 102 is produced by the optical sensor 151 of the first detecting means 102.

When the lever portion 143 of the pivotal member 140 of the second detecting means 102 is made by the projected portion 101f of the housing 101 to fail to move clockwise around the center axis of the shaft member 141 of the first detecting means 102, the light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102.

The judgment is made by the judging means 104 on whether or not the optical disc "A" is moved toward the specific position from the sixth position "A6" based on result produced by the optical sensors 150 and 151 of the first and second detecting means 102 and 103 and results produced by the first to third optical sensors 160 to 162 of the third detecting means 105 at a sixth point "T6" (see FIG. 9).

Here, the optical disc "A" is pushed toward the specific position (not shown) on which the information contained in the optical disc "A" is read out under the condition that the optical disc "A" fails to be held in contact with the surface 61a of the roller member 61 of the conveying means 106.

The following description will be directed to the case that the optical disc is moved out of the housing while being held in contact with the surface of the roller member of the conveying means of the optical disc driving apparatus according to the present invention.

The lights respectively projected by the light sources 160b to 162b of the first to third optical sensors 160 to 162 of the third detecting means 105 are respectively received by the light receivers 160a to 162a in association with the light sources 160b to 162b of the first to third optical sensors 160 to 162 of the third detecting means 105, i.e., the first signals "Lo" indicative of the first operational state of the light receivers 160a to 162a of the first to third optical sensors 160 to 162 of the third detecting means 105 are respectively produced by the first to third optical sensors 160 to 162 of the third detecting means 105 before the optical disc "A" is moved in the ejection direction 14.

The controlling means 107 is firstly operated to control the conveying means 106 to have the driving motor 95 of the conveying means 106 produce the rotation torque. The roller member 61 of the conveying means 106 is operated to move around the central axis of the rotation shaft 60 in response to the rotation torque received from the driving motor 95 through the driven gear 64.

Here, the optical disc "A" is moved out the housing 101 along the disc path in response to the rotation torque produced by the driving motor 95 of the conveying means 106 while being held in contact with the surface of the roller member 61 of the conveying means 106.

While the optical disc "A" is moved in the ejection direction, the light projected by the light source 162b of the third optical sensor 162 is intercepted by the outer peripheral portion of the optical disc "A" moved in the ejection direction without being received by the light receiver 162a of the third optical sensor 162 of the third detecting means 105, i.e., the second signal "Hi" indicative of the second operational state of the light receiver 162a of the third optical sensor 162 of the third detecting means 105 is produced by the third optical sensor 162 of the third detecting means 105.

Figure 10:
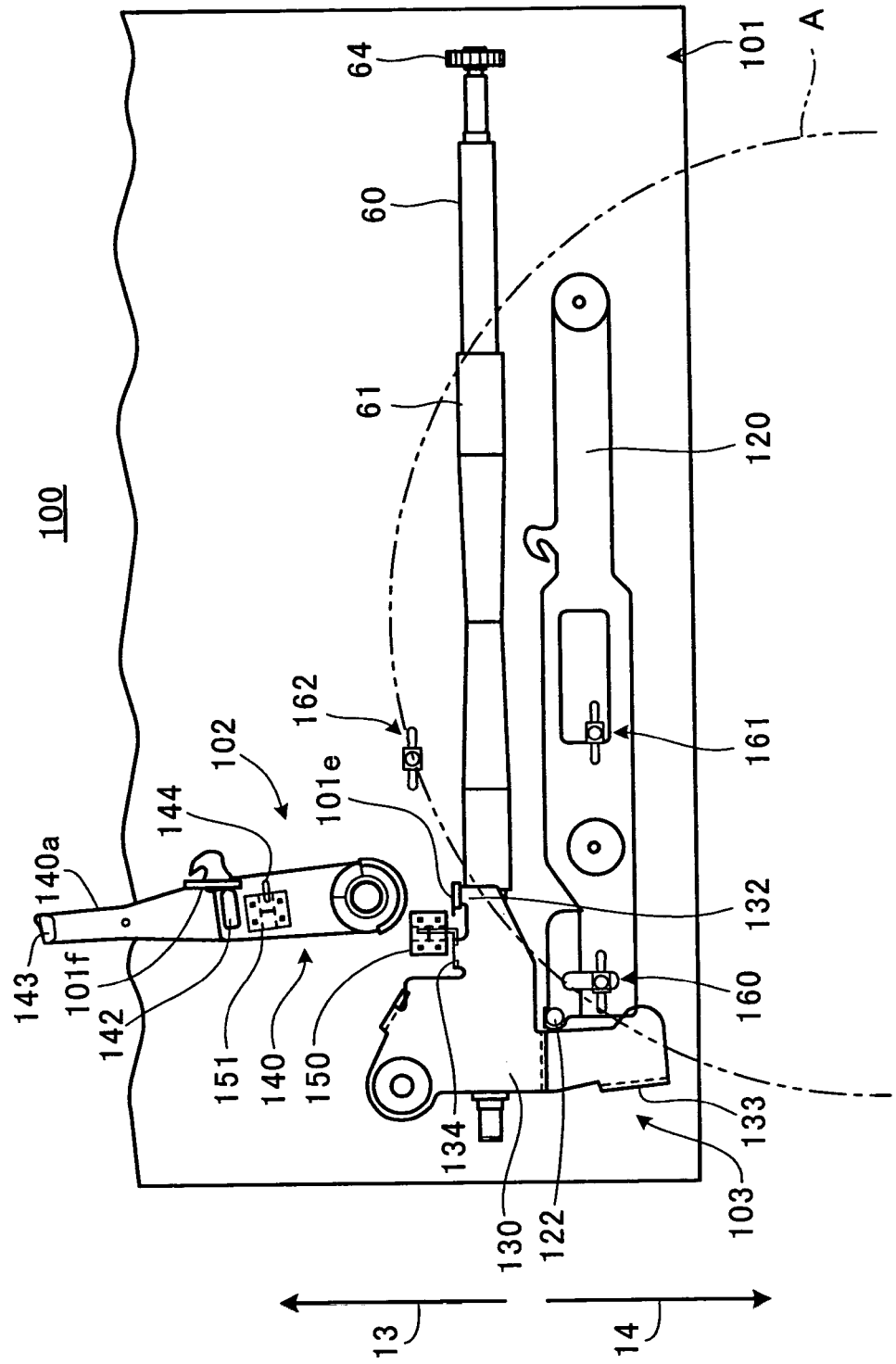
FIG. 10 is a fragmental plan view showing the first and second detecting means of the first embodiment of the optical disc driving apparatus according to the present invention.
Figure 11:
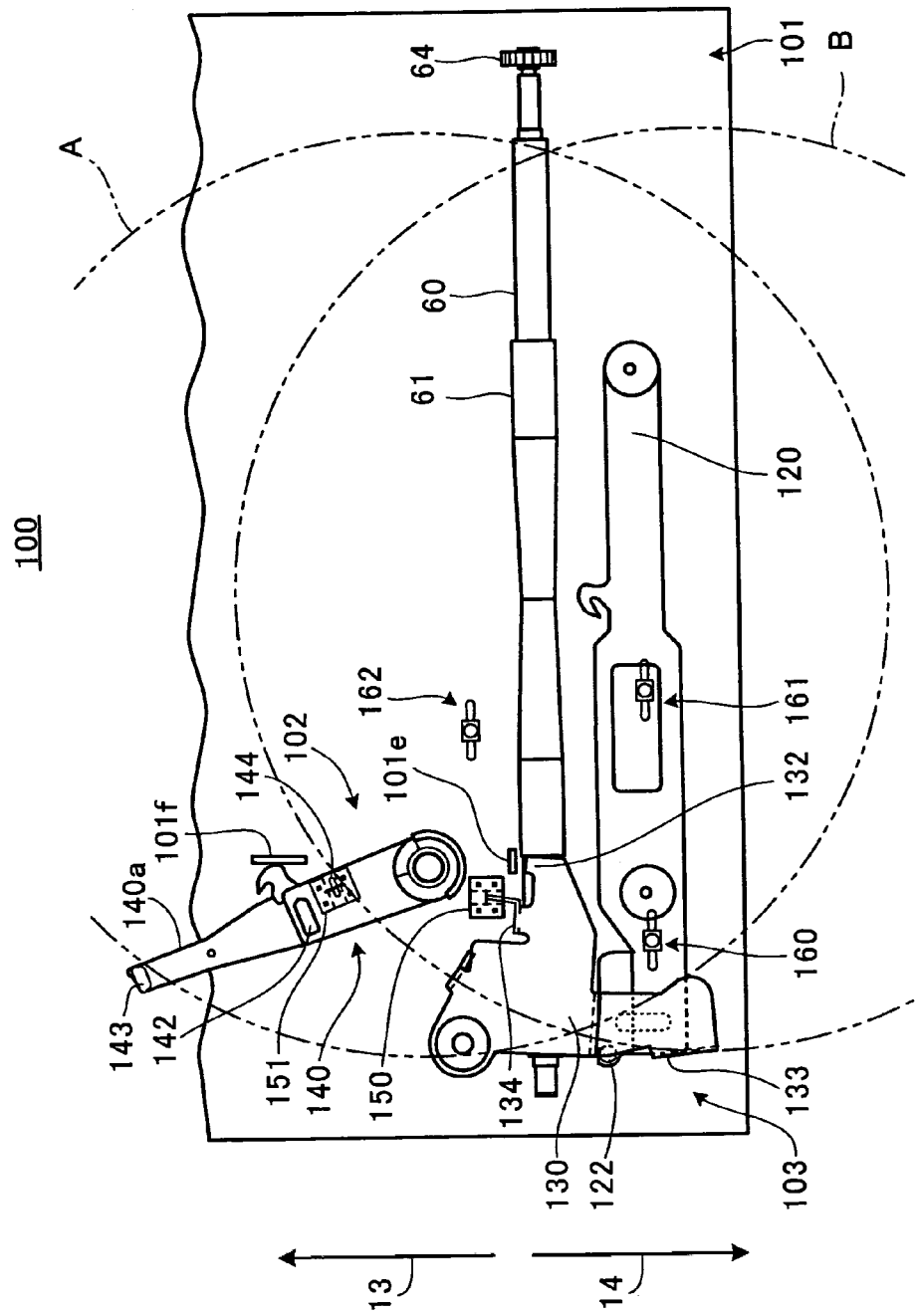
FIG. 11 is a fragmental plan view showing the first and second detecting means of the first embodiment of the optical disc driving apparatus according to the present invention.

When the optical disc "A" is moved to an ejected position "E1" (see FIG. 10), the light projected by the light source 162b of the third optical sensor 162 is received by the light receiver 162a of the third optical sensor 162 of the third detecting means 105 without being intercepted by the outer peripheral portion of the optical disc "A" moved in the ejection direction, i.e., the first signal "Lo" indicative of the first operational state of the light receiver 162a of the third optical sensor 162 of the third detecting means 105 is produced by the third optical sensor 162 of the third detecting means 105.

The judgment is then made by the judging means 104 as the optical disc "A" is moved out of the housing 101, i.e., the optical disc "A" is moved to the ejected position "E1" based on results produced by the optical sensors 150 and 151 of the first and second detecting means 102 and 103 and results produced by the first to third optical sensors 160 to 162 of the third detecting means 105.

The controlling means 107 is then operated to control the conveying means 106 to have the driving motor 95 of the conveying means 106 stop producing the rotation torque.

As a result of the fact that the optical disc "A" is moved to the ejected position "E1" while being held in contact with the surface 61a of the roller member 61 of the conveying means 106, the optical disc "A" is retained by the roller member 61 of the conveying means 106 without being completely moved out of the housing 101.

When, on the other hand, the optical disc "A" is moved by an operator in the loading direction 13 from the ejected position "E1", the light projected by the light source 162b of the third optical sensor 162 is intercepted by the outer peripheral portion of the optical disc "A" moved in the ejection direction without being received by the light receiver 162a of the third optical sensor 162 of the third detecting means 105, i.e., the second signal "Hi" indicative of the second operational state of the light receiver 162a of the third optical sensor 162 of the third detecting means 105 is produced by the third optical sensor 162 of the third detecting means 105.

The judgment is then made by the judging means 104 as the optical disc "A" is moved in the loading direction 13 from the ejected position "E1" based on results produced by the optical sensors 150 and 151 of the first and second detecting means 102 and 103 and results produced by the first to third optical sensors 160 to 162 of the third detecting means 105. The conveyance of the optical disc "A" to be moved in the loading direction 13 is then performed by the conveying means 106.

The following description will be directed to the case that almost overlapped two optical discs are moved into the housing 101 while being held in contact with the surface of the roller member of the conveying means of the optical disc driving apparatus according to the present invention (see FIGS. 29 to 35).

When, for example, almost overlapped optical discs "A and B" are partially passed through the loading slot 101a of the housing 101, the almost overlapped optical discs "A and B" are resiliently urged toward the second direction 12, i.e., toward the imaginary disc path by the roller member 61 of the conveying mean 106. The almost overlapped optical discs "A and B" then fails to be further moved in the loading direction 13 while being resiliently urged toward the second direction 12 by the second members 50 and 55 of the regulating means 108. The judgment is then made by the judging means 104 as the conveyance of the optical disc is not complete within the specific time interval based on results produced by the optical sensors 150 and 151 of the first and second detecting means 102 and 103 and results produced by the first to third optical sensors 160 to 162 of the third detecting means 105.

Figure 12:
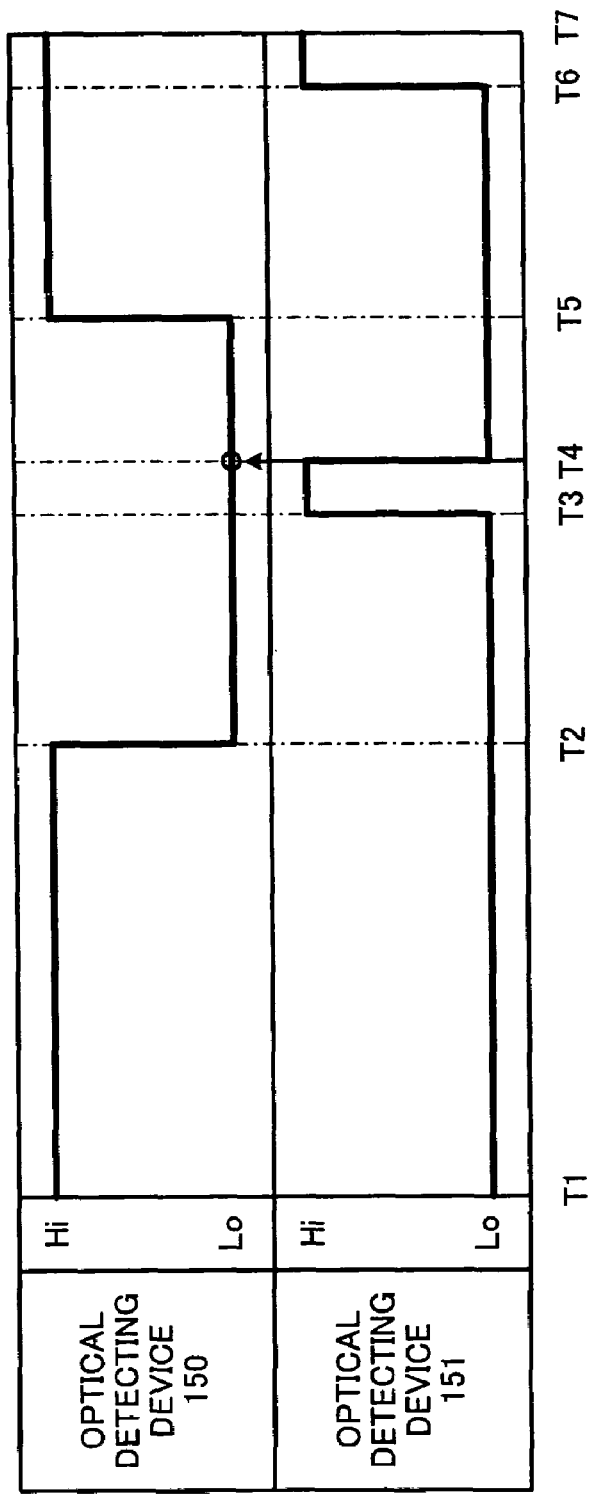
FIG. 12 is a timing chart showing output signals respectively produced by the optical sensors of the first and second detecting means of the first embodiment of the optical disc driving apparatus according to the present invention under the condition that the one optical disc is moved in the loading direction.
Figure 13:
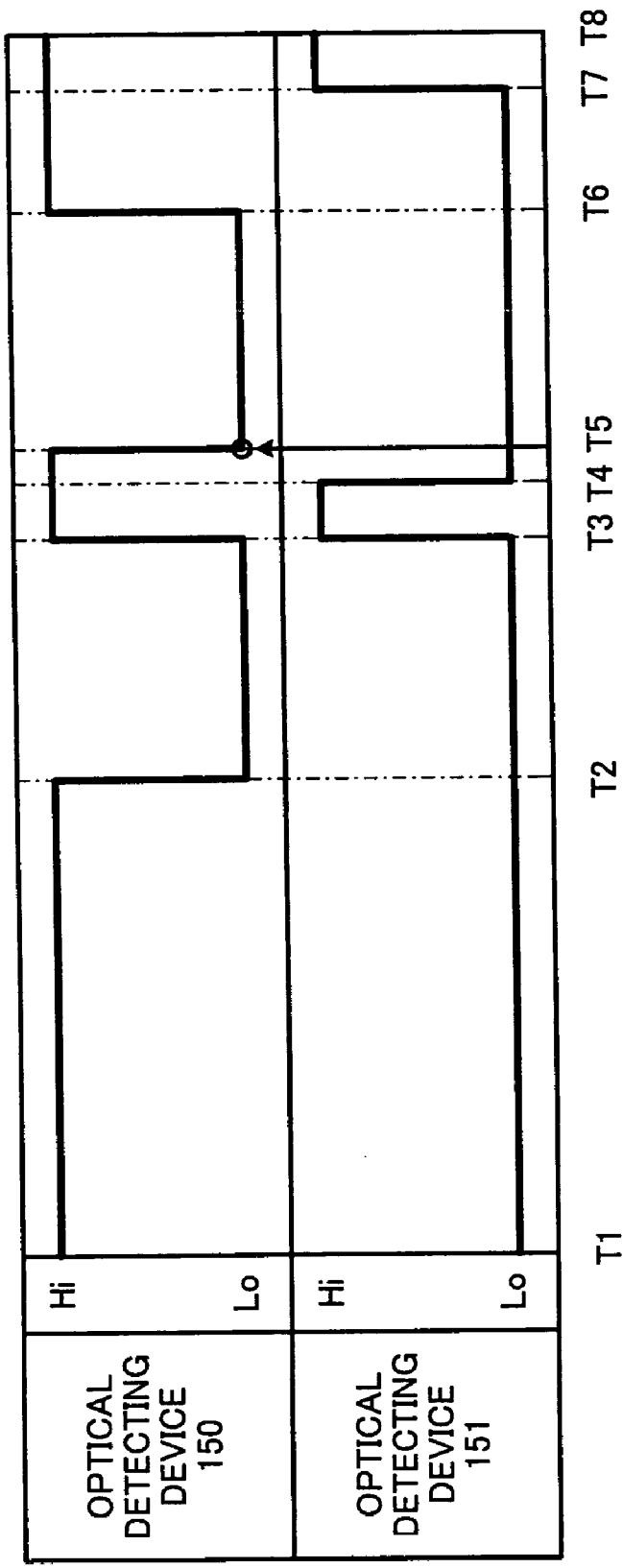
FIG. 13 is a timing chart showing output signals respectively produced by the optical sensors of the first and second detecting means of the first embodiment of the optical disc driving apparatus according to the present invention under the condition that the one optical disc is moved in the loading direction.
Figure 14:
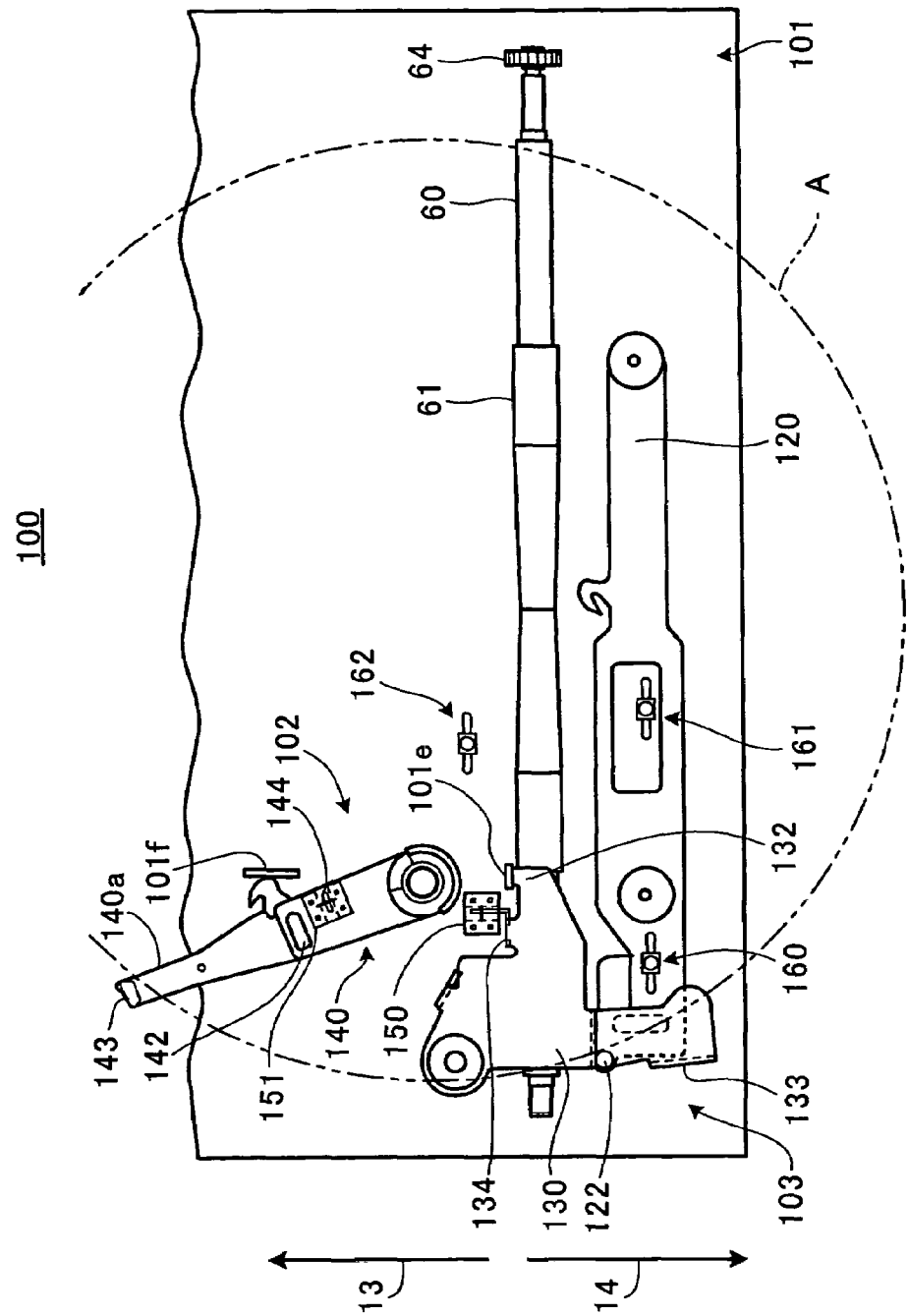
FIG. 14 is a fragmental plan view showing the first and second detecting means of the first embodiment of the optical disc driving apparatus according to the present invention.
Figure 15:
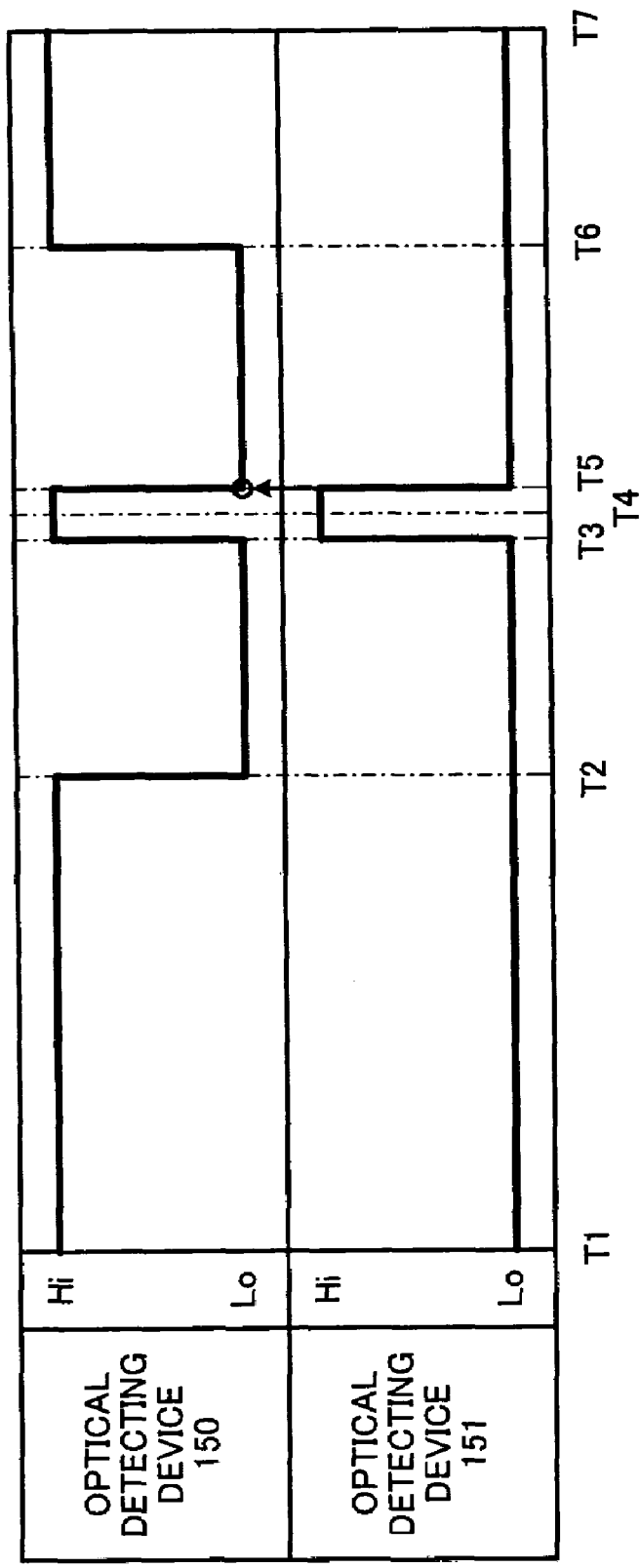
FIG. 15 is a timing chart showing output signals respectively produced by the optical sensors of the first and second detecting means of the first embodiment of the optical disc driving apparatus according to the present invention under the condition that the one optical disc is moved in the loading direction.
Figure 16:
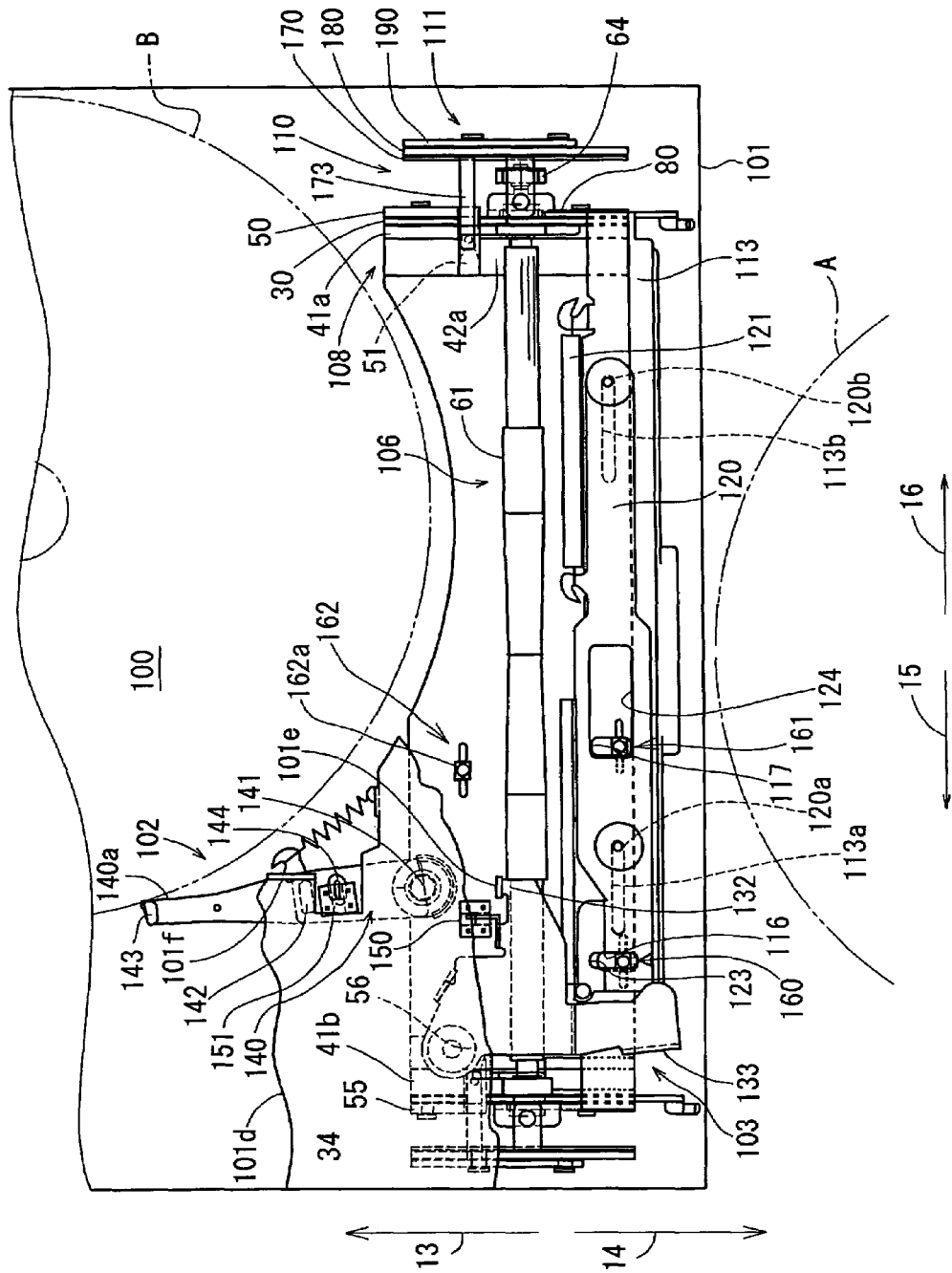
FIG. 16 is a fragmental plan view showing the first and second detecting means of the first embodiment of the optical disc driving apparatus according to the present invention.

The following description will be directed to the case that partially overlapped optical discs are moved into the housing 101 while being held in contact with the surface of the roller member of the conveying means of the optical disc driving apparatus according to the present invention (see FIG. 12).

When one of the partially overlapped optical discs "A and B" is moved to a fourth position "A4" from the third position "A3" (see FIG. 8), the pivotal member 130 of the second detecting means 103 is pivotably moved toward one of the angular positions thereof from the other of the angular positions thereof while being held in contact with one of the longitudinal ends of the operation member 120, i.e., the pivotal member 130 of the second detecting means 103 is moved clockwise around the center axis of the pivotal shaft 131 of the second detecting means 103.

The light projected by the light source of the optical sensor 150 of the second detecting means 103 is received by the light receiver in association with the light source of the optical sensor 150 of the second detecting means 103 without being intercepted by the projected portion 134 of the pivotal member 130 of the second detecting means 103, i.e., the first signal "Lo" indicative of the first operational state of the light receiver of the optical sensor 150 of the second detecting means 103 is produced by the optical sensor 150 of the second detecting means 103 when the pivotal member 130 of the second detecting means 103 is moved clockwise around the center axis of the shaft member 131 of the second detecting means 103.

On the other hand, the light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102 when one of the partially overlapped optical discs "A and B" is moved toward the fourth position "A4" from the third position "A3".

When one of the partially overlapped optical discs "A and B" is moved to the fifth position "A5" from the fourth position "A4" (see FIG. 8), the light projected by the light source of the optical sensor 150 of the second detecting means 103 is intercepted by the projected portion 134 of the pivotal member 130 of the second detecting means 103 without being received by the light receiver in association with the light source of the optical sensor 150 of the second detecting means 103, i.e., the second signal "Hi" indicative of the second operational state of the light receiver of the optical sensor 150 of the second detecting means 103 is produced by the optical sensor 150 of the second detecting means 103.

On the other hand, the pivotal member 140 of the second detecting means 102 is pivotably moved toward the other of the angular positions thereof from one of the angular positions thereof, i.e., the pivotal member 140 of the second detecting means 102 is moved clockwise around the center axis of the shaft member 141 of the first detecting means 102 while being held in contact with the outer peripheral surface of the partially overlapped optical discs "A and B" still further moved toward the fifth position "A5" from the fourth position "A4".

The light projected by the light source of the optical sensor 151 of the first detecting means 102 is received by the light receiver in association with the light source of the optical sensor 151 of the first detecting means 102 without being intercepted by the projected portion 144 of the pivotal member 140 of the first detecting means 102, i.e., the first signal "Lo" indicative of the first operational state of the light receiver of the optical sensor 151 of the first detecting means 102 is produced by the optical sensor 151 of the first detecting means 102 when the lever portion 143 of the pivotal member 140 of the second detecting means 102 started to move clockwise around the center axis of the shaft member 141 of the first detecting means 102.

The partially overlapped optical discs "A and B" is further moved toward the fifth position "A5" from the fourth position "A4" (see FIG. 8).

The light projected by the light source of the optical sensor 150 of the second detecting means 103 is intercepted by the projected portion 134 of the pivotal member 130 of the second detecting means 103 without being received by the light receiver in association with the light source of the optical sensor 150 of the second detecting means 103, i.e., the second signal "Hi" indicative of the second operational state of the light receiver of the optical sensor 150 of the second detecting means 103 is produced by the optical sensor 150 of the second detecting means 103 when the partially overlapped optical discs "A and B" is still further moved toward the fifth position "A5" from the fourth position "A4".

On the other hand, the light projected by the light source of the optical sensor 151 of the first detecting means 102 is intercepted by the projected portion 144 of the pivotal member 140 of the first detecting means 102 without being received by the light receiver in association with the light source of the optical sensor 151 of the first detecting means 102, i.e., the first signal "Lo" indicative of the first operational state of the light receiver of the optical sensor 151 of the first detecting means 102 is produced by the optical sensor 151 of the first detecting means 102 when the lever portion 143 of the pivotal member 140 of the second detecting means 102 is further moved clockwise around the center axis of the shaft member 141 of the first detecting means 102.

The judgment is made by the judging means 104 as the partially overlapped optical discs "A and B" is partially passed through the loading slot 101a of the housing 101, i.e., the partially overlapped optical discs "A and B" is moved toward the fifth position "A5" from the fourth position "A4" based on result produced by the optical sensors 150 and 151 of the first and second detecting means 102 and 103 and results produced by the first to third optical sensors 160 to 162 of the third detecting means 105 at a fifth point "T5" (see FIG. 9).

From the above detail description, it will be understood that the optical disc driving apparatus can prevent partially or entirely overlapped optical discs from being moved into the housing.

The controlling means 107 is operative to control the conveying means 106 to have the conveying means 106 stop performing the conveyance of the optical disc in the loading direction 13 before performing the conveyance of the optical disc in the ejection direction 14 under the condition that the judgment is made by the judging means 104 as the partially overlapped optical discs are abnormally passed through the loading slot 101a of the housing 101 based on results detected by the first and second detecting means 102 and 103, however, the controlling means 107 may be operative to control the conveying means 106 to have the conveying means 106 stop performing the conveyance of the optical disc in the loading direction 13 before having the conveying means 106 perform the conveyance of the optical disc in the ejection direction 14 under the condition that the judgment is made by the judging means 104 as the partially overlapped optical discs are passed through the loading slot 101a of the housing 101 based on results detected by the first and second detecting means 102 and 103.

The optical disc driving apparatus 100 may be installed in an electric apparatus (see FIG. 43) for reproducing information contained in an optical disc having an outer peripheral surface. The electronic apparatus 1 comprises a casing 1a and an optical disc driving apparatus 100 accommodated by the casing 1a.

Figure 44:
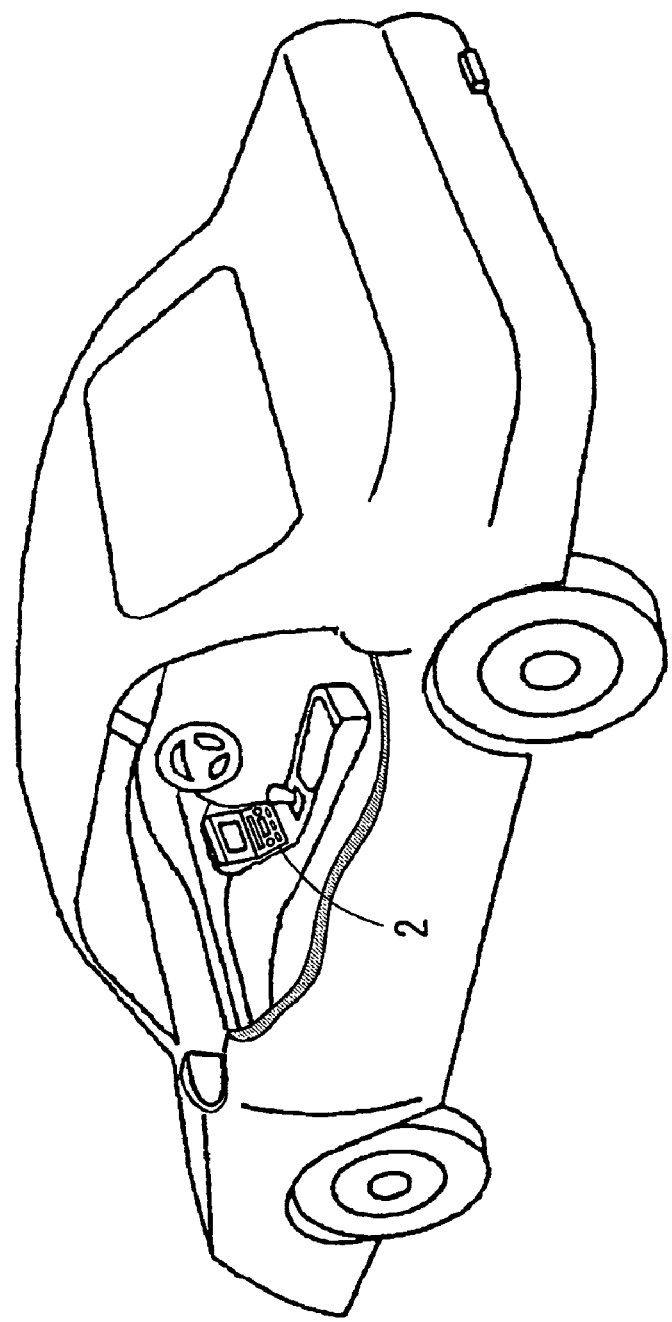
FIG. 44 is a perspective view showing an automotive vehicle installing an vehicular electronic apparatus comprising the optical disc driving apparatus according the present invention.
Figure 45:
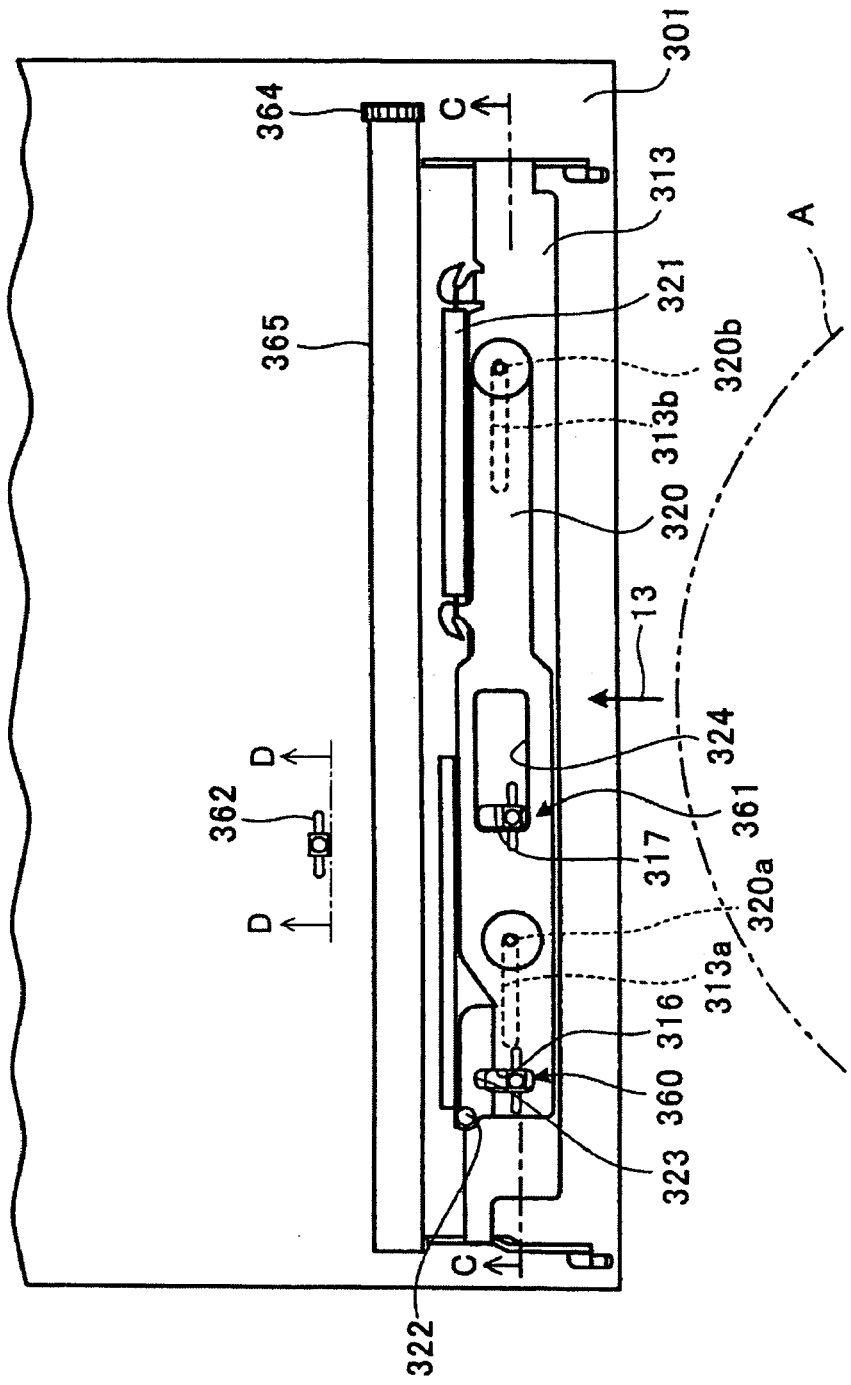
FIG. 45 is a fragmental plan view showing the detecting means of the conventional optical disc driving apparatus.
Figure 46:
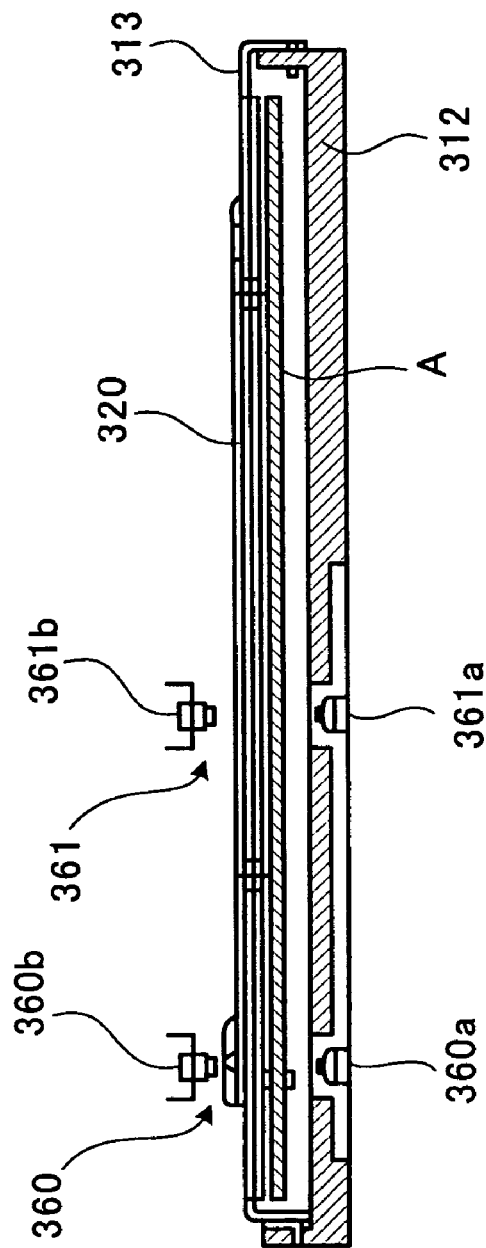
FIG. 46 is a front view showing the detecting means of the conventional optical disc driving apparatus.
Figure 47:
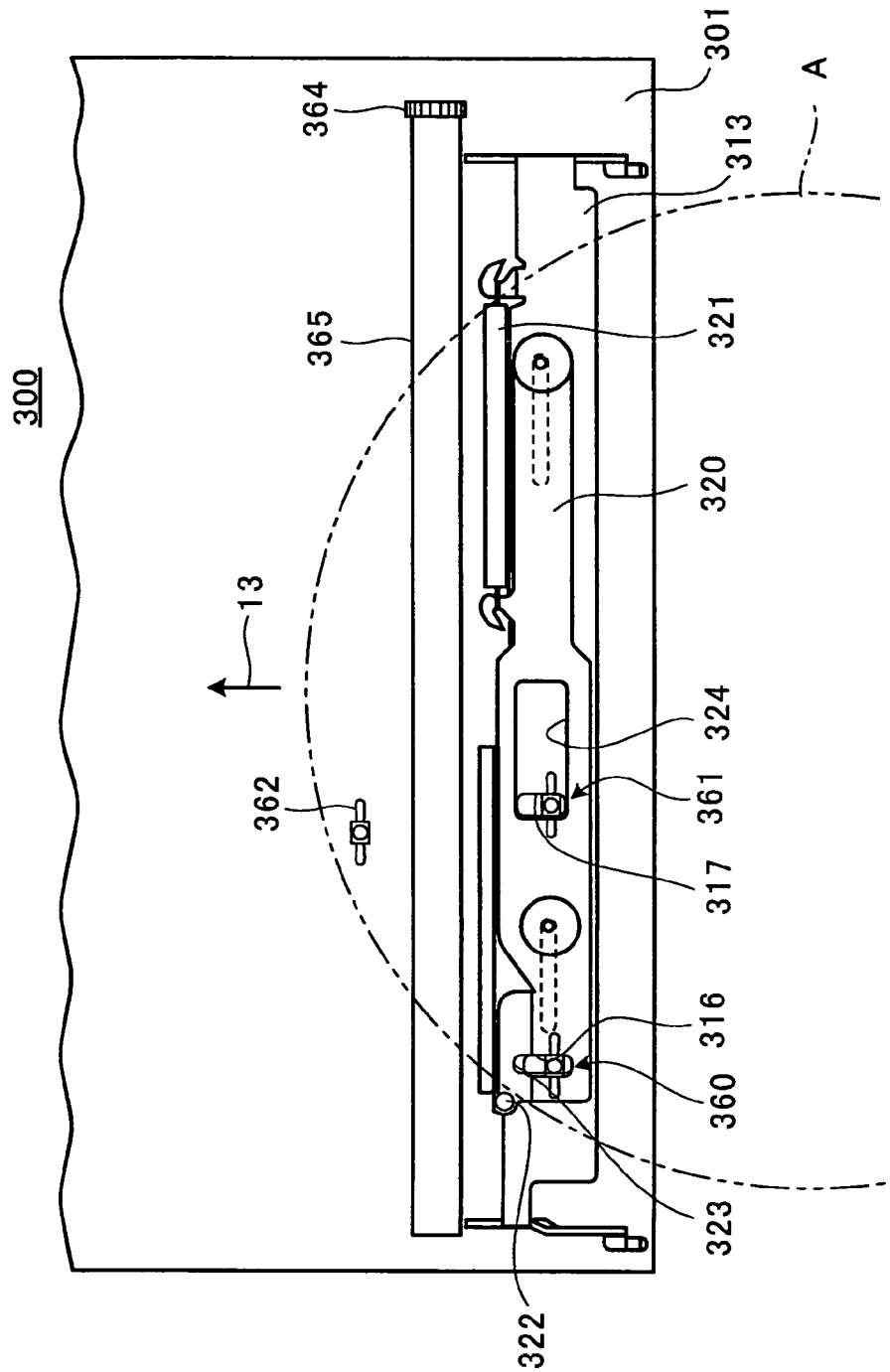
FIG. 47 is a fragmental plan view showing the detecting means of the conventional optical disc driving apparatus.
Figure 48:
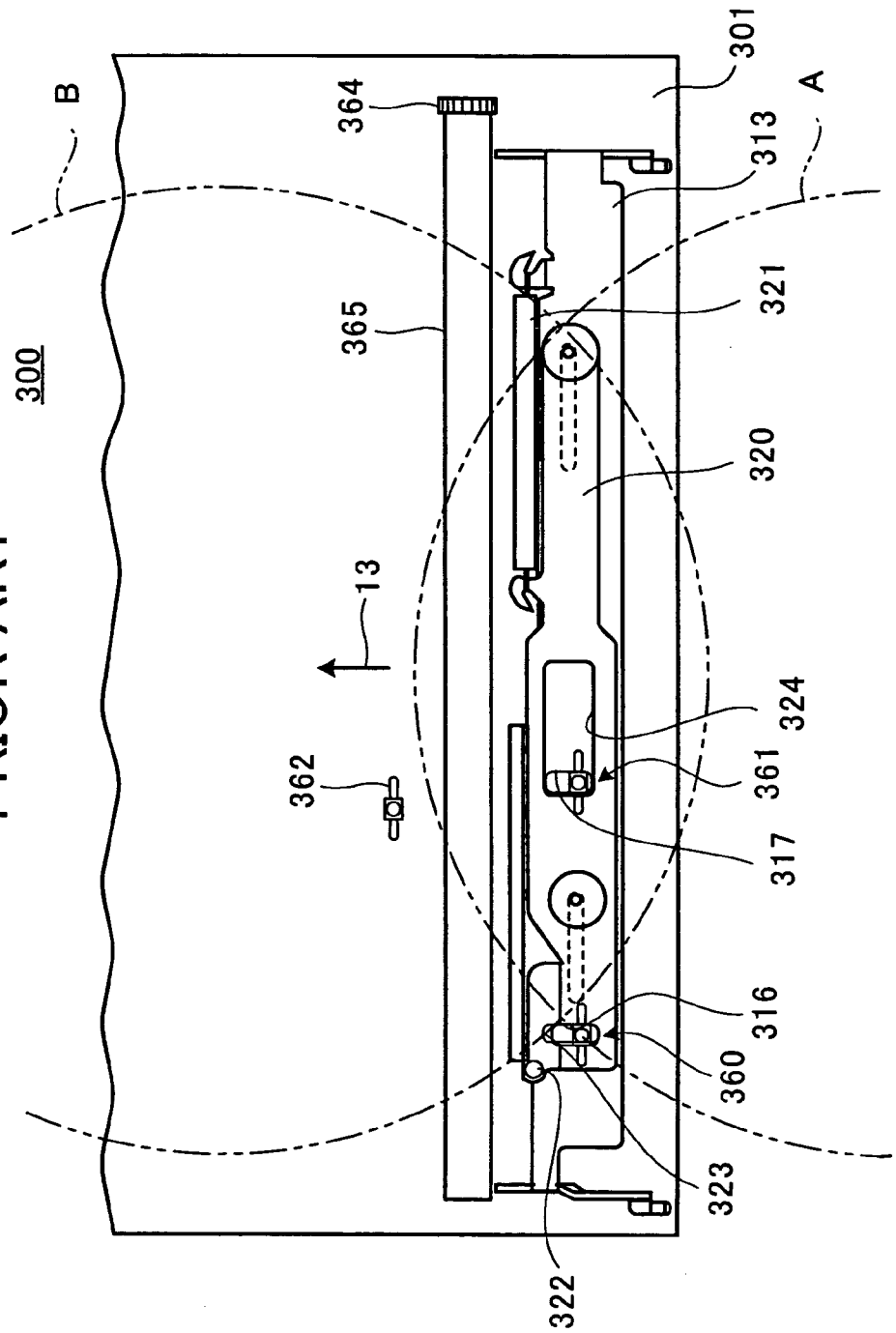
FIG. 48 is a fragmental plan view showing the detecting means of the conventional optical disc driving apparatus.
Figure 49:
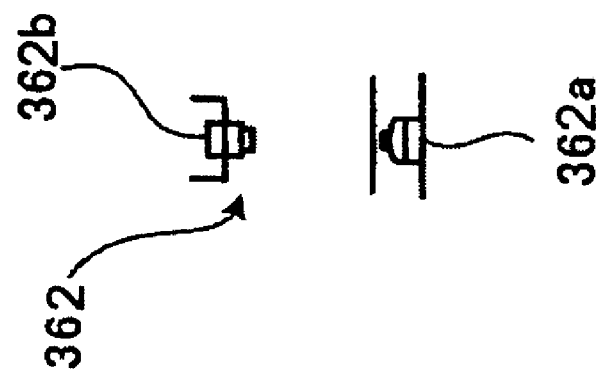
FIG. 49 is a fragmental cross sectional view along the line D—D of FIG. 45.

The optical disc driving apparatus 100 may be installed in an vehicular electronic apparatus (see FIG. 44) for reproducing information contained in an optical disc having an outer peripheral surface. The vehicular electronic apparatus 2 comprises a casing and an optical disc driving apparatus 100 accommodated by the casing.

Although the previously mentioned first embodiment has been described with the regulating means 108 of the optical disc driving apparatus 100 including a pair of second members 50 and 55 each movable toward and away from the first member 40, the regulating means of the optical disc driving apparatus may include a second member movable toward and away from the first member to achieve the advantage of the optical disc driving apparatus according to the present invention.

While there has been described in the forgoing first embodiment about the fact that the regulating means 108 of the optical disc driving apparatus 100 including a pair of third members 80 and 85 each movable toward and away from the first member 40, the regulating means of the optical disc driving apparatus may include a third member movable toward and away from the first member to achieve the advantage of the optical disc driving apparatus according to the present invention.

Figure 43:
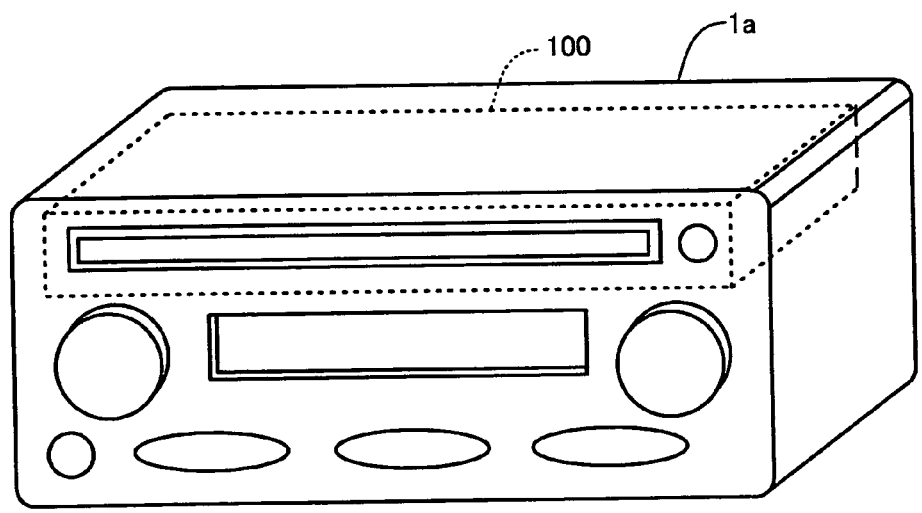
FIG. 43 is a perspective view showing an electronic apparatus comprising the optical disc driving apparatus according the present invention.

Referring then to FIG. 43 of the drawings, there is shown a fragmental perspective view showing the second and third members of the regulating means and the vicinities of the optical disc driving apparatus according to a modified embodiment similar to the first embodiment of the present invention. The constitutional elements of the modified embodiment of the optical disc driving apparatus according to the present invention as shown in FIG. 43 is entirely the same as those of the first embodiment of the optical disc driving apparatus according to the present invention as shown in FIGS. 1 to 4 except for the constitutional elements appearing in the following description. Therefore, only the constitutional elements of the modified embodiment of the optical disc driving apparatus different from those of the first embodiment of the optical disc driving apparatus will be described in detail hereinafter. The constitutional elements of the modified embodiment of the optical disc driving apparatus entirely the same as those of the first embodiment of the optical disc driving apparatus will not be described but bear the same reference numerals and legends as those of the first embodiment of the optical disc driving apparatus in FIGS. 1 to 4 to avoid tedious repetition.

The following description will be directed to the constitutional elements of the modified embodiment of the optical disc driving apparatus different from those of the first embodiment of the optical disc driving apparatus.

The regulating means includes a base member retained by the housing, a first member supported by the base member, and at least one second member movable toward and away from the first member, the second member having a first surface to be brought into contact with one of peripheral edges of the optical disc to be moved into and out of the housing, and a second surface extending outwardly from longitudinally outer end of the first surface thereof. The first member of the regulating means has longitudinal end portions each having a first surface on which the optical disc to be moved into and out of the housing is rested under the condition that one of the peripheral edges of the optical disc is brought into contact with the first surface of each of the longitudinal end portions of the first member. The longitudinal end portions of the first member each having second surface on which the second member is rested under the condition that the second surface of the lever portion of the second member is brought into contact with one of the second surfaces of the longitudinal end portions of the first member.

The optical disc driving apparatus further comprises urging means for resiliently urging the second member of the regulating means toward the imaginary disc path.

The first surface of each of the longitudinal end portions of the first member of the regulating means is inclined with respect to the imaginary disc path at a predetermined first inclination angle, while the first surface of the second member is inclined with respect to the imaginary disc path at a predetermined second inclination angle.

The first surface of each of the longitudinal end portions of the first member and the first surface of the second member form in combination an imaginary passageway in the form of a rectangle shape in cross-section taken along the imaginary disc path. The imaginary passageway has the optical disc passed therethrough on the imaginary disc path. The imaginary passageway has first and second imaginary surfaces each parallel to the imaginary disc path, and third and fourth imaginary surfaces each parallel to the center plane of the housing. The first surface of the second member is held in contact with one of the longitudinal extreme ends of one of the first and second imaginary surfaces of the imaginary passageway. The first surfaces of the longitudinal end portions of the first member are respectively held in contact with the longitudinal extreme ends of the other of the first and second imaginary surfaces of the imaginary passageway. The third and fourth imaginary surfaces of the imaginary passageway are in spaced relationship with each other at a first distance equal to a diameter of the optical disc to be moved into and out of the housing. The first and second imaginary surfaces of the imaginary passageway is in spaced relationship with each other at a second distance larger in length than a thickness of the optical disc to be moved into and out of the housing, and smaller in length than twice of the thickness of the optical disc to be moved into and out of the housing.

The third and fourth surfaces of the longitudinal ends portions of the first member of the regulating means constitute in combination guiding means for allowing the optical disc to be moved into and out of the housing on the imaginary disc path while preventing the optical disc from being moved in third and fourth directions each perpendicular to the imaginary center plane of the housing, and each parallel to the imaginary disc path.

The urging means is adapted to assume two different operational states consisting of a first operational state to resiliently urging the second member of the regulating means toward the imaginary disc path with a first resilient force thereof under the condition that the conveyance of the optical disc to be moved in the loading direction is performed by the conveying means, and a second operational state to resiliently urging the second member of the regulating means toward the imaginary disc path with a second resilient force thereof which is smaller than the first resilient force under the condition that the conveyance of the optical disc to be moved in the ejection direction opposite to the loading direction is performed by the conveying means. The optical disc driving apparatus further comprises setting means for having the urging means selectively assume the first and second operational states in response to results judged by the judging means.

The second member of the regulating means is in spaced relationship with the loading slot of the housing. The roller member of the conveying means is disposed between the second member of the regulating means and the loading slot of the housing.

The roller member of the conveying means is supported by the base member of the regulating means to be movable toward and away from the imaginary disc path. The regulating means includes at least one third member for preventing the roller member of the conveying means from being movable toward and away the imaginary disc path. The third member is supported by the base member of the regulating means to be movable toward and away from the imaginary disc path. The urging means is adapted to resiliently urge the third member of the regulating means toward the imaginary disc path.

The roller member of the conveying means includes supporting members for rotatably supporting the roller member, the supporting members respectively having outer surfaces. The third member of the regulating means respectively have projected portion having a surface to be brought into contact with the outer surface of the supporting members. The first surfaces of the longitudinal end portions of the first member of the regulating means are adapted to fail to bring the outer surfaces of the supporting members of the conveying means into contact with the surface of the third member of the regulating means with the surface of the one optical disc brought into contact with the surface of the roller member of the conveying means under the condition that the conveyance of the one optical disc to be moved in the loading direction is performed by the conveying means. The first surfaces of the longitudinal end portions of the first member of the regulating means are adapted to bring the outer surfaces of the supporting members of the conveying means into contact with the surface of the third member of the regulating means with the surface of the partially overlapped optical discs brought into contact with the surface of the roller member of the conveying means under the condition that the conveyance of the partially overlapped optical discs to be moved in the loading direction is performed by the conveying means.

The surface of the third member of the regulating means and the outer surface of one of the supporting members of the conveying means form in combination a first gap between the surface of the third member of the regulating means and the outer surface of one of the supporting members of the conveying means under the condition that the surface of the roller member of the conveying means is brought into contact with the surface of the one optical disc to be moved into the housing. The first surfaces of the longitudinal end portions of the first member of the regulating means are brought into contact with the peripheral edge of the one optical disc to be moved into the housing. The first gap between the surface of the third member of the regulating means and the outer surface of one of the supporting members of the conveying means is smaller than the thickness of the one optical disc to be moved into and out of the housing.

The second member of the regulating means is disposed in spaced relationship with the loading slot of the housing. The roller member of the conveying means is disposed between the second member of the regulating means and the loading slot of the housing. The first surface of the lever portion of the second member of the regulating means and the first and upright surfaces of one of the longitudinal end portions of the first member of the regulating means form in combination a groove having the outer peripheral portion of the one optical disc passed therethrough. The optical disc is released from the roller member of the conveying means without being held in contact with the surface of the roller member of the conveying means after the peripheral portion of the optical disc is passed through the groove under the condition that the conveyance of the optical disc to be moved in the loading direction is performed by the conveying means.

The urging means is adapted to assume two different operational states consisting of a first operational state to resiliently urging the third member of the regulating means toward the imaginary disc path with a first resilient force thereof under the condition that the conveyance of the optical disc to be moved in the loading direction is performed by the conveying means, and a second operational state to resiliently urging the third member of the regulating means toward the imaginary disc path with a second resilient force thereof which is smaller than the first resilient force under the condition that the conveyance of the optical disc to be moved in the ejection direction opposite to the loading direction is performed by the conveying means. The optical disc driving apparatus further comprises setting means for having the urging means selectively assume the first and second operational states in response to results judged by the judging means.

The urging means is constituted by at least one urging member, the urging member being adapted to resiliently urge both the second member of the regulating means and the third member of the regulating means toward the imaginary disc path.

The urging member of the urging means has a plate portion, and first and second lever portions respectively having a first free end held in engagement with the second member of the regulating means, and a second free end held in engagement with the third member of the regulating means, the first and second lever portions forming part of the urging member respectively having first and second fix ends each integrally formed with the plate portion forming part of the urging member.

The setting means includes at least one base member supported by the housing, and at least one cam member slidably supported by the base member to be movable between first and second operational positions in association with the first and second operational states of the urging member of the urging means.

The controlling means is adapted to control the cam member of the setting means to have the cam members of the setting means selectively assume the first and second operational positions based on results judged by the judging means.

The controlling means is adapted to control the cam member of the setting means to have the cam member of the setting means assume the first operational position when the conveyance of the optical disc to be moved in the loading direction is performed by the conveying means. The conveying means is adapted to perform the conveyance of the optical disc to be moved in the loading direction. The controlling means is adapted to control the roller member of the conveying means to have the roller member of the conveying means stop performing the conveyance of the optical disc when the judgment is made by the judging means as the conveyance of the optical disc to be moved into the housing is complete within the specific time interval by the conveying means based on results judged by the judging means.

The controlling means is adapted to control the cam member of the setting means to have the cam member of the setting means assume the second operational position before controlling the roller member of the conveying means to have the roller member of the conveying means perform the conveyance of the optical disc to be moved in the ejection direction.

From the above detail description, it will be understood that the optical disc driving apparatus can prevent partially or entirely overlapped optical discs from being moved into the housing.

Although there has been described in the above about the first embodiment of the optical disc driving apparatus according to the present invention, this embodiment may be replaced by the second embodiment of the optical disc driving apparatus according to the present invention in order to attain the objects of the present invention. The second embodiment of the optical disc driving apparatus will then be described hereinafter.

Figure 2:
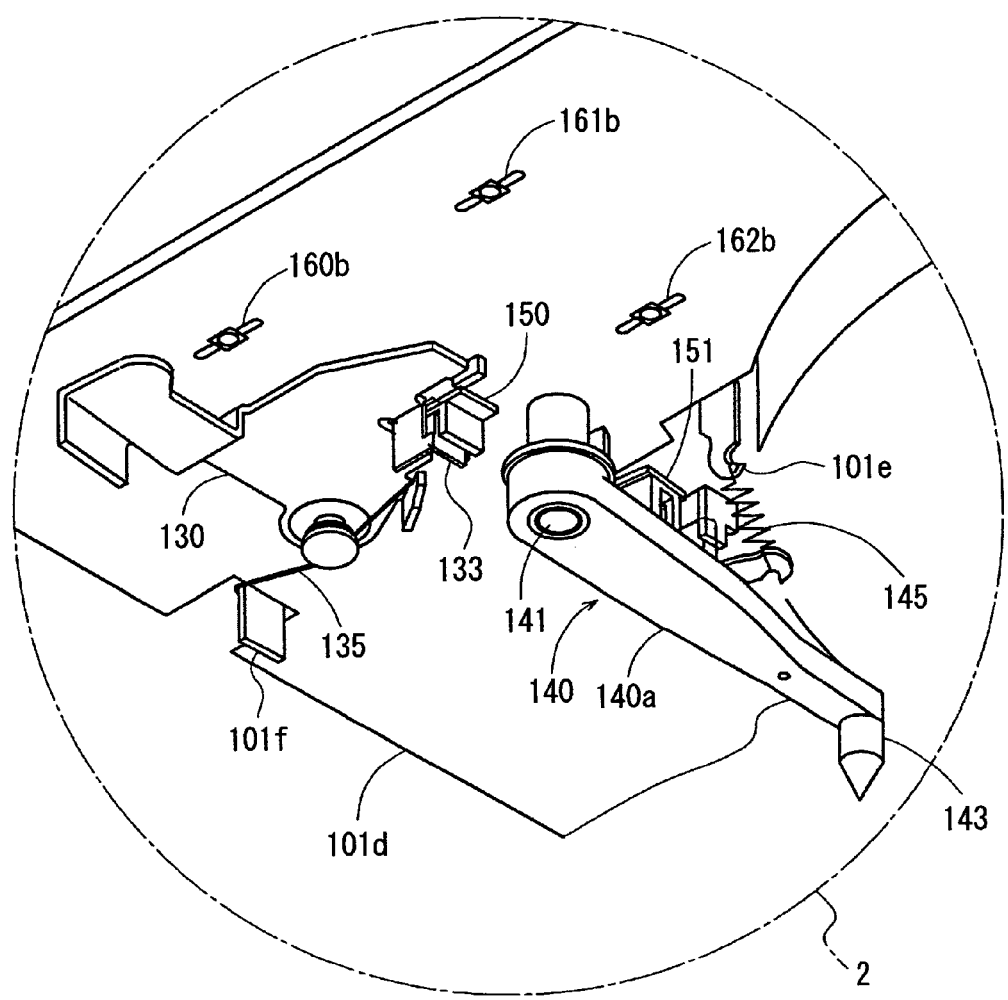
FIG. 2 is an enlarged fragmental perspective view showing the first and second detecting means of the optical disc driving apparatus according to the first embodiment of the present invention and surrounded by a circle shown in FIG. 1.
Figure 3:
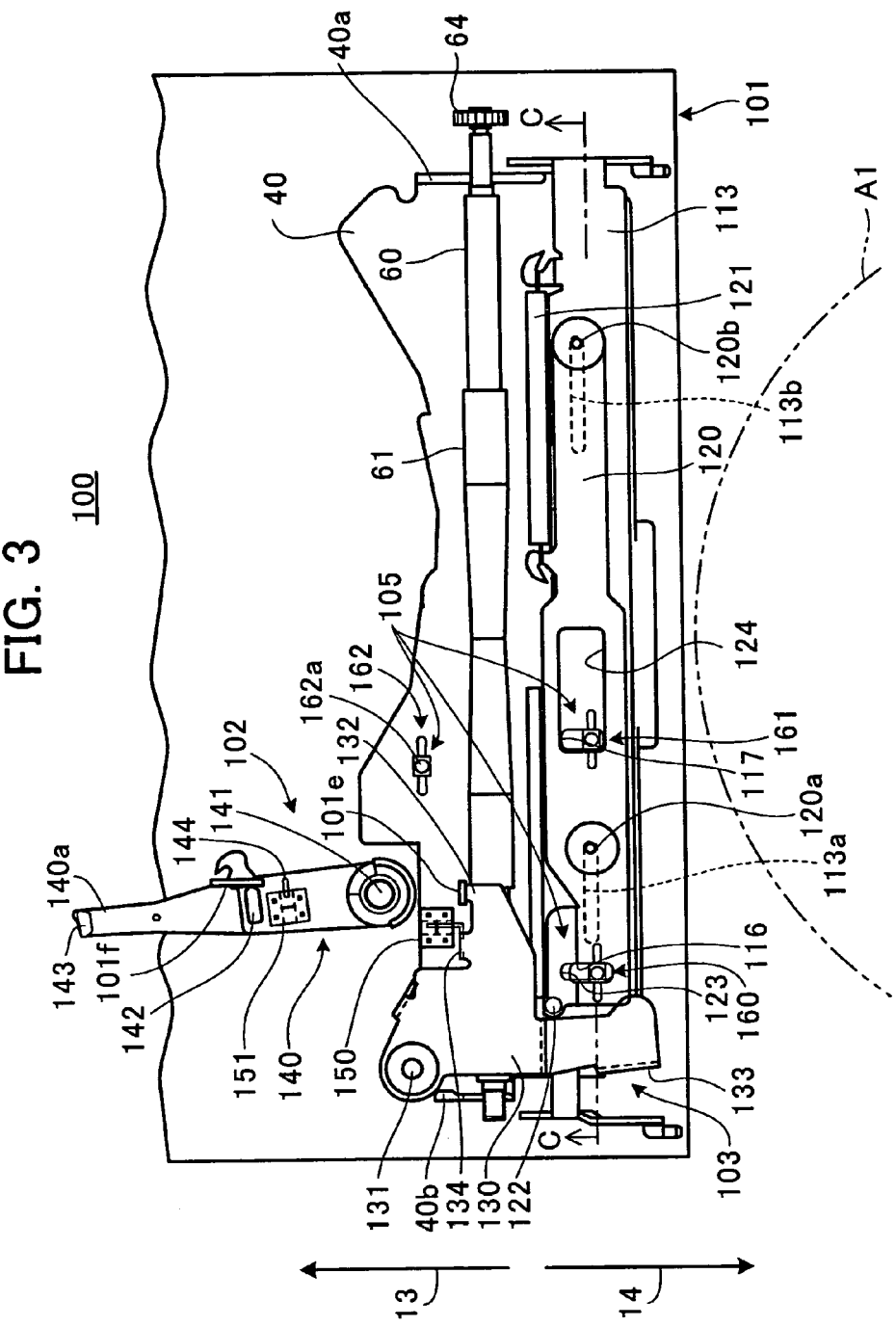
FIG. 3 is a fragmental plan view showing the first and second detecting means and their vicinity forming part of the optical disc driving apparatus according to first embodiment of the present invention.
Figure 4:
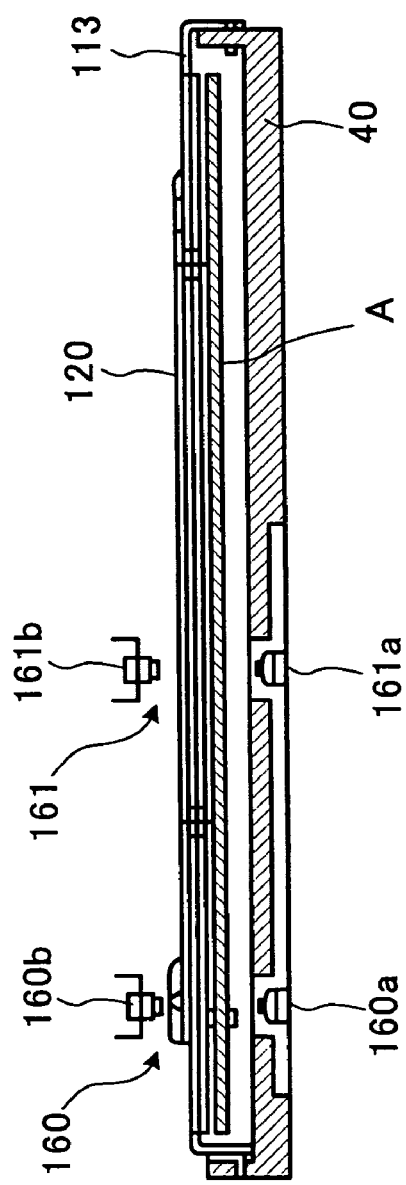
FIG. 4 is a cross sectional view taken along the disc path by a line "C to C" shown in FIG. 3, and showing light sources of the first and second optical sensors light receivers respectively in association with the light sources of the first and second optical sensors of the first and second optical sensor of the third detecting means of the optical disc driving apparatus according to the first embodiment of the present invention.
Figure 5:
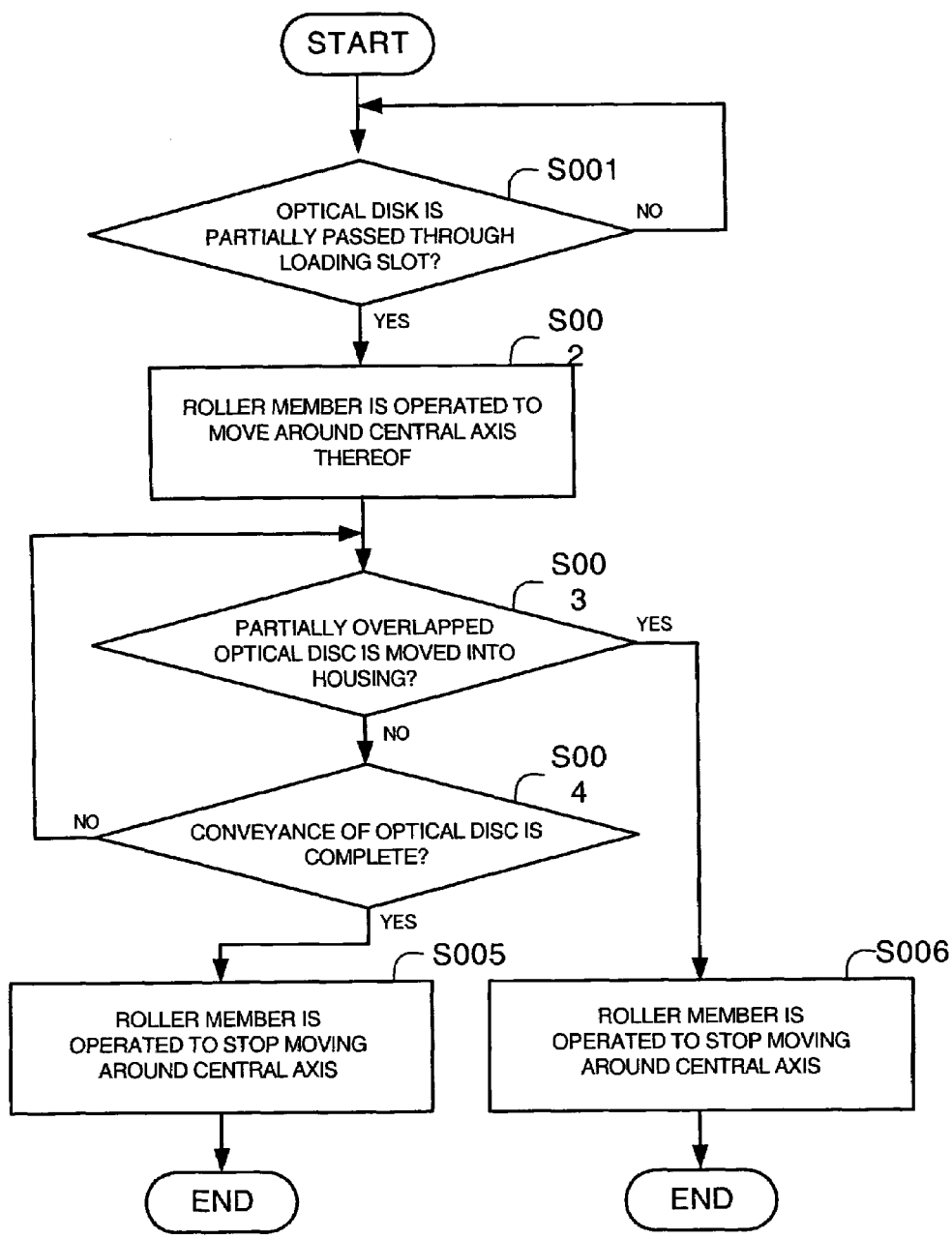
FIG. 5 is a flowchart of the optical disc driving apparatus according to the first embodiment of the present invention.
Figure 36:
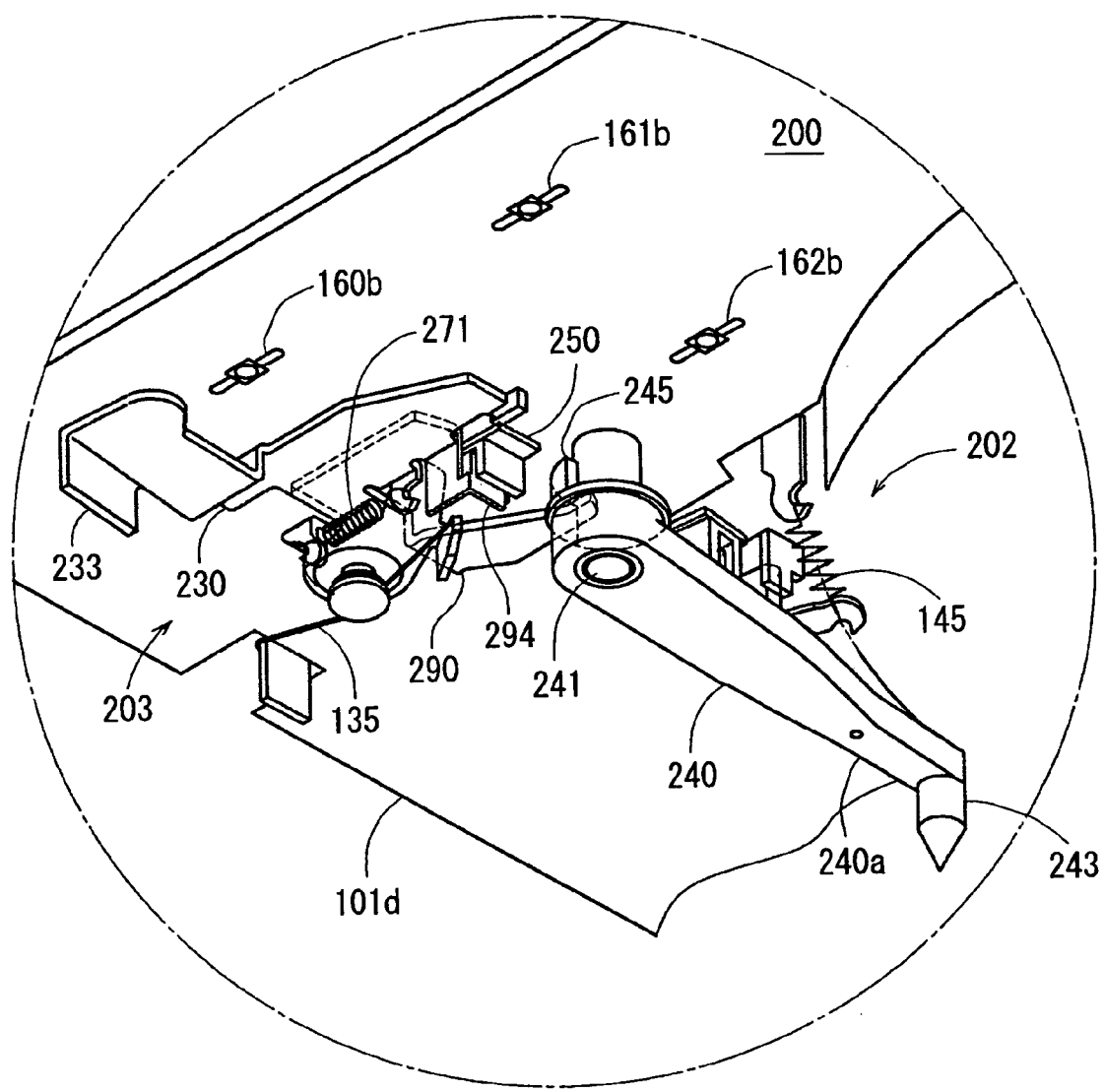
FIG. 36 is a fragmental perspective view showing the first and second detecting means of the second embodiment of the optical disc driving apparatus according to the present invention.
Figure 37:
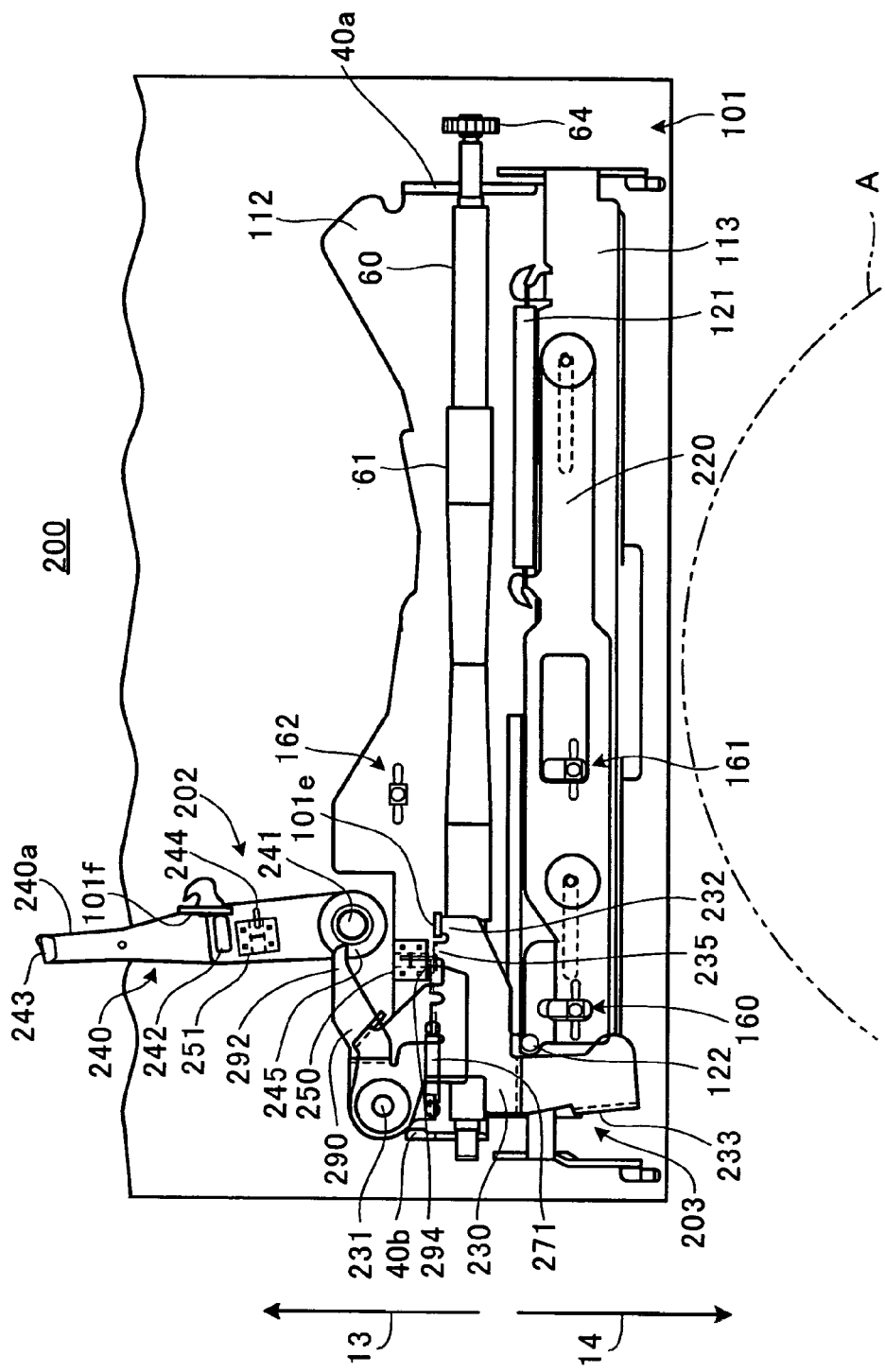
FIG. 37 is a fragmental plan view showing the first and second detecting means of the second embodiment of the optical disc driving apparatus according to the present invention.

Referring now to FIGS. 36 and 37 of the drawings, there is shown an enlarged fragmental perspective view and an fragmental plan view showing first and second detecting means of the optical disc driving apparatus according to the second embodiment of the present invention. The constitutional elements and the steps of the second embodiment of the optical disc driving apparatus according to the present invention as shown in FIGS. 36 and 37 is entirely the same as those of the first embodiment of the optical disc driving apparatus according to the present invention as shown in FIGS. 1 to 3 except for the constitutional elements and the steps appearing in the following description. Therefore, only the constitutional elements and the steps of the second embodiment of the optical disc driving apparatus different from those of the first embodiment of the optical disc driving apparatus will be described in detail hereinafter. The constitutional elements and the steps of the second embodiment of the optical disc driving apparatus entirely the same as those of the first embodiment of the optical disc driving apparatus will not be described but bear the same reference numerals and legends as those of the first embodiment of the optical disc driving apparatus in FIGS. 1 to 3 to avoid tedious repetition.

The following description will now be directed to the constitutional elements and the steps of the second embodiment of the optical disc driving apparatus different from those of the first embodiment of the optical disc driving apparatus.

The second embodiment of the optical disc driving apparatus 200 according to the present invention is shown in FIGS. 36 and 37 as comprising first detecting means 202 for performing a detection of the outer peripheral surface of the optical disc to be moved into the housing 101, second detecting means 203 for performing a detection of the outer peripheral surface of the optical disc to be moved into the housing 101 after the detection of the outer peripheral surface of the optical disc is performed by the first detecting means 202, and judging means 204 for judging whether one optical disc or partially overlapped optical discs are passed through the loading slot 101a of the housing 101 based on results detected by the first and second detecting means 202 and 203.

The first detecting means 202 includes a pivotal member 240 pivotably movable around a pivotal axis thereof while being held in contact with the outer peripheral surface of the optical disc to be moved into the housing 101, and a detecting device 251 for performing a detection of the pivotal member 240. The second detecting means 203 includes an operation member 220 accommodated in the housing 101 in spaced relationship with the pivotal member 240 of the first detecting means 202 to be movable between operational positions thereof while being held in contact with the outer peripheral surface of the optical disc to be moved into the housing 101, a first pivotal member 230 to be pivotably movable around a pivotal axis thereof while being held in contact with the operation member 220, a second pivotal member 290 pivotably movable around the pivotal axis of the first pivotal member 230 after the pivotal member 240 of the first detecting means 202 is brought into contact with the outer peripheral surface of the optical disc to be moved into the housing 101, an urging member 271 for resiliently urging the second pivotal member 290 to be brought into contact with the first pivotal member 230, and a detecting device 250 for performing a detection of the second pivotal member 290.

The detecting device 250 of the second detecting means 203 is constituted by an optical sensor including a light source for projecting a light on a light path thereof, and a light receiver disposed on the light path of the light source, and the light receiver being adapted to receive the projected light from the light source. The second pivotal member 290 of the second detecting means 203 has a projected portion 294 for having the optical sensor perform the detection of the second pivotal member 290 by intervening between the light source and the light receiver of the optical sensor, the second pivotal member 290 of the second detecting means 203 being operative to assume two different operational states consisting of a first operational state to have the light receiver of the optical sensor receive the projected light from the light source of the optical sensor, the optical sensor being operative to produce a first signal indicative of the first operational state of the second pivotal member 290 of the second detecting means 203 when the projected light is received from the light source by the light receiver without being intercepted by the project portion 294 of the second pivotal member 290, and a second operational state to have the light receiver of the optical sensor fail to receive the projected light from the light source of the optical sensor, the optical sensor being operative to produce a second signal indicative of the second operational state of the second pivotal member 290 of the second detecting means 203 when the projected light is intercepted by the project portion 294 of the second pivotal member 290 without being received by the light receiver.

The pivotal member 240 of the first detecting means 202 has an arm portion 240*a*, a lever portion 243 to be brought into contact with the outer peripheral surface of the optical disc to be moved into the housing 101 on the imaginary disc path, and a projected portion 245 to be engageable with the second pivotal member 290 of the second detecting means 203, the lever portion 243 of the pivotal member 240 extending toward the imaginary disc path from one of longitudinal ends of the arm portion 240*a* of the pivotal member 240 in a cantilever fashion, the projected portion 245 of the pivotal member 240 extending toward the imaginary disc path from the other of the longitudinal ends of the arm portion 240*a* of the pivotal member 240, the other of the longitudinal ends of the arm portion 240*a* of the pivotal member 240 having a through bore formed therein, the through bore of the arm portion 240*a* of the pivotal member 240 having a central line perpendicular to the imaginary disc path. The first detecting means 202 includes an urging member 145 for resiliently urging the projected portion 245 of the pivotal member 240 toward the imaginary center plane of the housing 101, and a shaft member 241 to be pivotably received by the through bore of the arm portion 240*a* of the pivotal member 240, the shaft member 241 being retained by the housing 101.

The pivotal member 240 is adapted to assume two different operational states consisting of a first operational state to have the projected portion 245 thereof held in engagement with the second pivotal member 290 of the second detecting means 203 without the lever portion 243 thereof brought in contact with the outer peripheral surface of the optical disc to be moved into the housing 101 when the second signal is produced by the detecting device 250 of the second detecting means 203, and a second operational state to have the projected portion 245 thereof held in disengagement with the second pivotal member 290 of the second detecting means 203 with the lever portion 243 thereof brought in contact with the outer peripheral surface of the optical disc to be moved into the housing 101 when the first signal is produced by the detecting device 250 of the second detecting means 203.

The controlling means 107 is operative to control the conveying means 106 to have the driving motor 95 of the conveying means 106 stop producing the rotation torque under the condition that the judgment is made by the judging means 104 as the optical disc partially passed through the loading slot 101*a* of the housing 101 is ejected from the loading slot 101*a* of the housing 101 based on results detected by the first and second detecting means 102 and 103.

The optical disc driving apparatus 100 may be installed in an electronic apparatus (see FIG. 43) for reproducing information contained in an optical disc having an outer peripheral surface. The electronic apparatus 1 comprises a casing 1*a* and an optical disc driving apparatus 100 accommodated by the casing 1*a*.

The optical disc driving apparatus 100 may be installed in an vehicular electronic apparatus (see FIG. 44) for reproducing information contained in an optical disc having an outer peripheral surface. The vehicular electronic apparatus 2 comprises a casing and an optical disc driving apparatus 100 accommodated by the casing.

The following description will be then directed to the case that one optical disc is moved in the loading direction while being held in contact with the surface of the roller member of the conveying means of the optical disc driving apparatus according to the present invention.

The lights respectively projected by the light sources 160*b* to 162*b* of the first to third optical sensors 160 to 162 of the third detecting means 105 are respectively received by the light receivers 160*a* to 162*a* in association with the light sources 160*b* to 162*b* of the first to third optical sensors 160 to 162 of the third detecting means 105, i.e., the first signals "Lo" indicative of the first operational state of the light receivers 160*a* to 162*a* of the first to third optical sensors 160 to 162 of the third detecting means 105 are respectively produced by the first to third optical sensors 160 to 162 of the third detecting means 105 before the optical disc "A" is moved into the housing 101.

The light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202 before the optical disc "A" is moved into the housing 101.

On the other hand, the light projected by the light source of the optical sensor 250 of the second detecting means 203 is intercepted by the projected portion 294 of the pivotal member 290 of the second detecting means 203 without being received by the light receiver in association with the light source of the optical sensor 250 of the second detecting means 203, i.e., the second signal "Hi" indicative of the second operational state of the light receiver of the optical sensor 250 of the second detecting means 203 is produced by the optical sensor 250 of the second detecting means 203 at the first point "TI" before the optical disc "A" is moved into the housing 101.

The judgment is firstly made by the judging means 104 on whether or not the optical disc "A" is partially passed through the loading slot 101*a* of the housing 101 based on results produced by the optical sensors 250 and 251 of the first and second detecting means 202 and 203 and results produced by the first to third optical sensors 160 to 162 of the third detecting means 105 in the step S101. When the answer in the step S101 is in the affirmative "YES", i.e., the optical disc "A" is partially passed through the loading slot 101*a* of the housing 101, the step S101 proceeds to the step S202. When, on the other hand, the answer in the step S101 is in the negative "NO", i.e., the optical disc "A" is not partially passed through the loading slot 101*a* of the housing 101, the step S101 does not proceed to the step S202.

Here, the first and second cam members 190 and 195 of the setting means 111 are controlled by the controlling means 107 to respectively assume the first operational position before the conveyance of the optical disc "A" to be moved in the loading direction 13 is performed by the conveying means 106.

Figure 38:
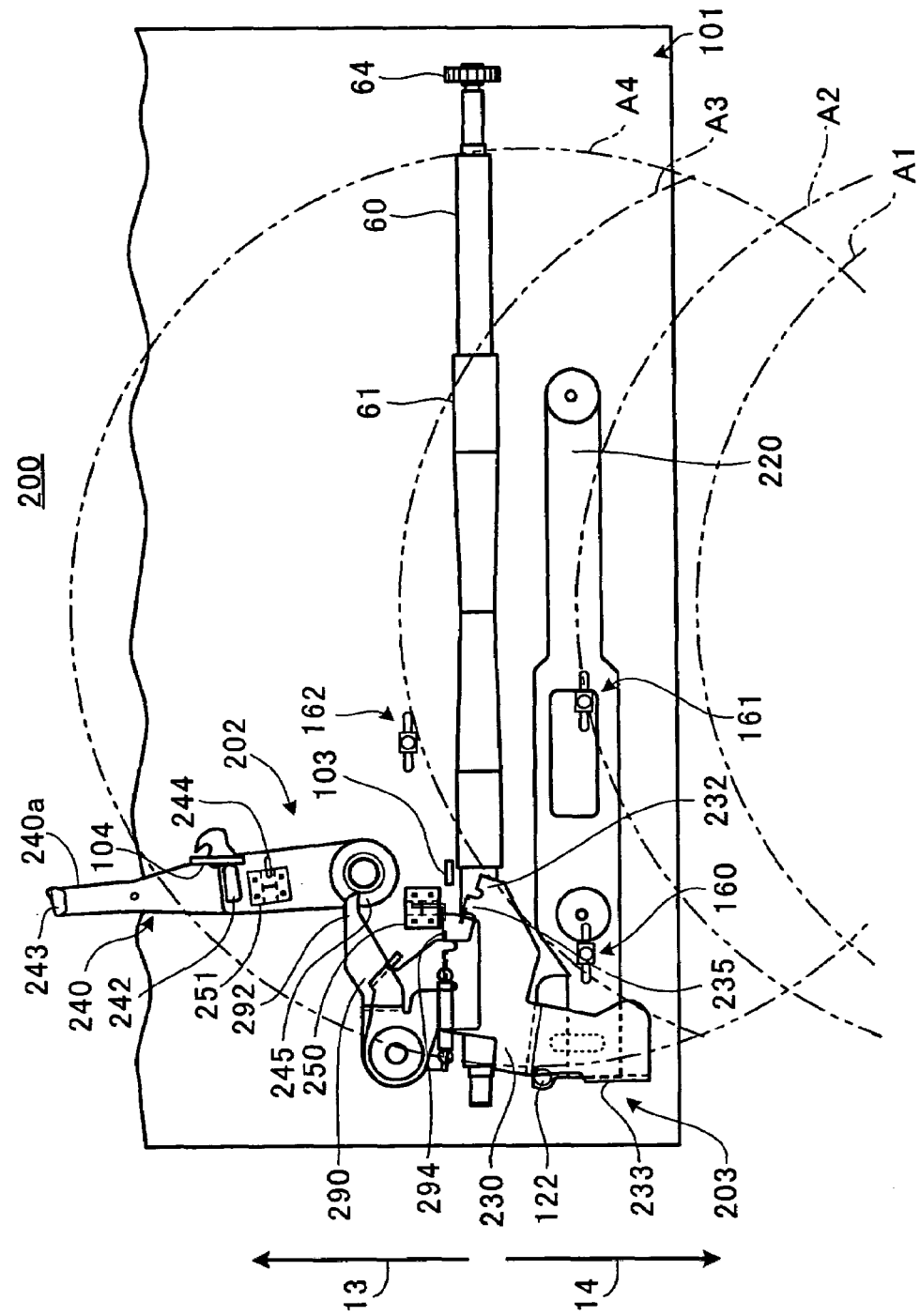
FIG. 38 is a fragmental plan view showing the first and second detecting means of the second embodiment of the optical disc driving apparatus according to the present invention.

The optical disc "A" is then partially passed through the loading slot 101a of the housing 101, i.e., the optical disc "A" is moved to a second position "A2" from a first position "A1" (see FIG. 38).

The light projected by the light source 161b of the second optical sensor 161 of the third detecting means 105 is intercepted by the outer peripheral portion of the optical disc "A" partially passed through the loading slot 101a of the housing 101 without being received by the light receiver 161a of the second optical sensor 161 of the third detecting means 105, i.e., the second signal "Hi" indicative of the second operational state of the light receiver 161a of the second optical sensor 161 of the third detecting means 105 are respectively produced by the second optical sensor 161 of the third detecting means 105 when the optical disc "A" is moved to the second position "A2" from the first position "A1".

On the other hand, the lights respectively projected by the light sources 160b and 162b of the first and third optical sensors 160 and 162 are respectively received by the light receivers 160a and 162a of the first and third optical sensors 160 and 162 without being intercepted by the outer peripheral portion of the optical disc "A" partially passed through the loading slot 101a of the housing 101, i.e., the first signals "Lo" indicative of the first operational state of the light receivers 160a and 162a of the first and third optical sensors 160 and 162 of the third detecting means 105 are respectively produced by the first and third optical sensors 160 and 162 of the third detecting means 105 when the optical disc "A" is moved to the second position "A2" from the first position "A1".

The light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202 when the optical disc "A" is moved to the second position "A2" from the first position "A1".

On the other hand, the light projected by the light source of the optical sensor 250 of the second detecting means 203 is intercepted by the projected portion 294 of the pivotal member 290 of the second detecting means 203 without being received by the light receiver in association with the light source of the optical sensor 250 of the second detecting means 203, i.e., the second signal "Hi" indicative of the second operational state of the light receiver of the optical sensor 250 of the second detecting means 203 is produced by the optical sensor 250 of the second detecting means 203 when the optical disc "A" is moved to the second position "A2" from the first position "A1". The judgment is made by the judging means 104 as the optical disc "A" is partially passed through the loading slot 101a of the housing 101, i.e., the optical disc "A" is moved to the second position "A2" based on result produced by the optical sensors 250 and 251 of the first and second detecting means 202 and 203 and results produced by the first to third optical sensors 160 to 162 of the third detecting means 105 at a first point "T1" (see FIG. 39).

The controlling means 107 is then operated to control the conveying means 106 to have the driving motor 95 of the conveying means 106 produce the rotation torque in response to results judged by the judging means 104 in the step S202. The roller member 61 of the conveying means 106 is operated to move around the central axis of the rotation shaft 60 in response to the rotation torque received from the driving motor 95 through the driven gear 64 under the condition that the roller member 61 of the conveying means 106 is resiliently urged by the first and second urging members 170 and 175 with the first resilient force.

Here, the optical disc "A" partially passed through the loading slot 101a of the housing 101 is moved into the housing 101 along the disc path in response to the rotation torque produced by the driving motor 95 of the conveying means 106 while being held in contact with the surface of the roller member 61 of the conveying means 106.

The optical disc "A" is then moved into the housing 101, i.e., the optical disc "A" is moved to a third position "A3" from the second position "A2" (see FIG. 38).

The lights projected by the light sources 160b to 162b of the first to third optical sensors 160 to 162 are intercepted by the outer peripheral portion of the optical disc "A" moved to the third position "A3" from the second position "A2" along the disc path without being received by the light receivers 160a to 162a of the first to third optical sensors 160 to 162, i.e., the second signals "Hi" indicative of the second operational state of the light receivers 160a to 162a of the first to third optical sensors 160 to 162 of the third detecting means 105 are respectively produced by the first to third optical sensors 160 to 162 of the third detecting means 105 when the optical disc "A" is moved to the third position "A3" from the second position "A2".

The light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202 when the optical disc "A" is moved to the third position "A3" from the second position "A2".

On the other hand, the light projected by the light source of the optical sensor 250 of the second detecting means 203 is intercepted by the projected portion 294 of the pivotal member 290 of the second detecting means 203 without being received by the light receiver in association with the light source of the optical sensor 250 of the second detecting means 203, i.e., the second signal "Hi" indicative of the second operational state of the light receiver of the optical sensor 250 of the second detecting means 203 is produced by the optical sensor 251 of the second detecting means 203 when the optical disc "A" is moved to the third position "A3" from the second position "A2".

The judgment is made by the judging means 104 as the optical disc "A" is partially passed through the loading slot 101a of the housing 101, i.e., the optical disc "A" is moved to the third position "A3" from the second position "A2" based on result produced by the optical sensors 250 and 251 of the first and second detecting means 202 and 203 and results produced by the first to third optical sensors 160 to 162 of the third detecting means 105.

The optical disc "A" is then moved into the housing 101, i.e., the optical disc "A" is moved to a fourth position "A4" from the third position "A3" (see FIG. 38).

The lights projected by the light sources 160b to 162b of the first to third optical sensors 160 to 162 are intercepted by the outer peripheral portion of the optical disc "A" moved to the fourth position "A4" from the third position "A3" without being received by the light receivers 160a to 162a of the first to third optical sensors 160 to 162, i.e., the second signals "Hi" indicative of the second operational state of the light receivers 160a to 162a of the first to third optical sensors 160 to 162 of the third detecting means 105 are respectively produced by the first to third optical sensors 160 to 162 of the third detecting means 105 when the optical disc "A" is moved to the fourth position "A4" from the third position "A3".

The first pivotal member 230 of the second detecting means 203 is pivotably moved toward one of the angular positions thereof from the other of the angular positions thereof while being held in contact with one of the longitudinal ends of the operation member 120, i.e., the first pivotal member 230 of the second detecting means 203 is moved clockwise around the center axis of the pivotal shaft 231 of the second detecting means 203 when the pin member 122 of the second detecting means 203 is moved in the third direction 15 while being held in contact with the outer peripheral surface of the optical disc "A" moved to the fourth position "A4" from the third position "A3". The second pivotal member 290 of the second detecting means 203 is held in contact with the pivotal member 240 of the first detecting means 202 without being pivotably moved toward one of the angular positions thereof from the other of the angular positions thereof while being held in contact with the second pivotal member 290 of the second detecting means 203.

The light projected by the light source of the optical sensor 250 of the second detecting means 203 is intercepted by the projected portion 294 of the pivotal member 290 of the second detecting means 203 without being received by the light receiver in association with the light source of the optical sensor 250 of the second detecting means 203, i.e., the second signal "Hi" indicative of the second operational state of the light receiver of the optical sensor 250 of the second detecting means 203 is produced by the optical sensor 250 of the second detecting means 203 when the first pivotal member 230 of the second detecting means 203 is moved clockwise around the center axis of the shaft member 231 of the second detecting means 203.

On the other hand, the light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202 when the optical disc "A" is moved to the fourth position "A4" from the third position "A3".

Figure 39:
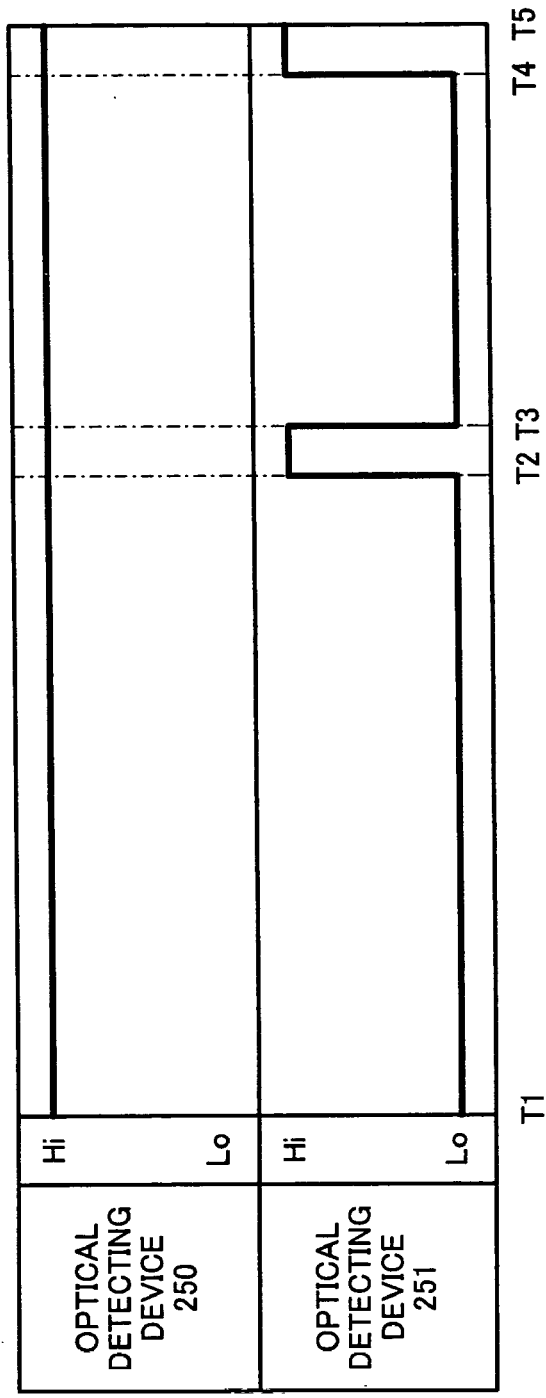
FIG. 39 is a timing chart showing output signals respectively produced by the optical sensors of the first and second detecting means of the second embodiment of the optical disc driving apparatus according to the present invention under the condition that the one optical disc is moved in the loading direction.
Figure 40:
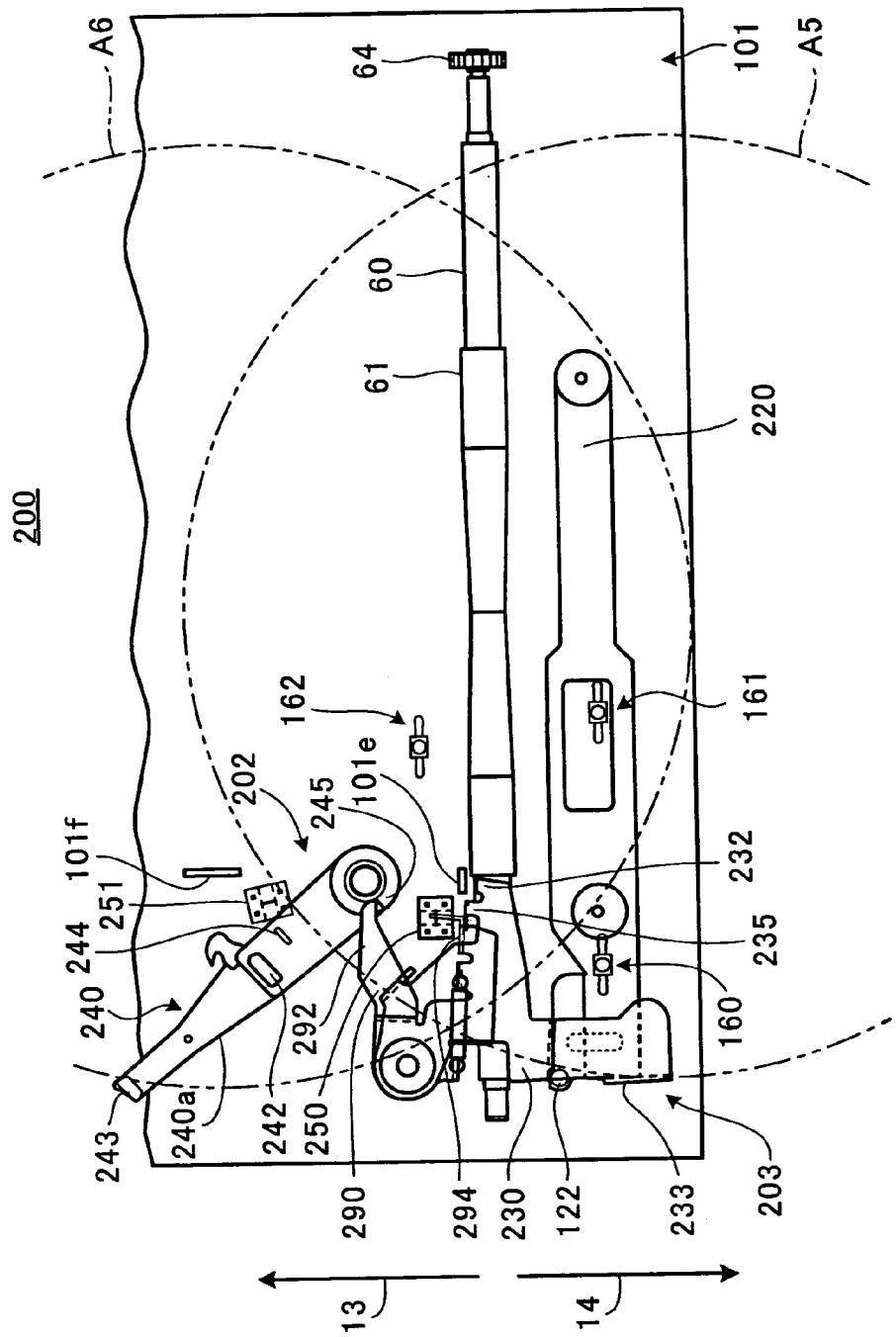
FIG. 40 is a fragmental plan view showing the first and second detecting means of the second embodiment of the optical disc driving apparatus according to the present invention.

The judgment is made by the judging means 104 as the optical disc "A" is partially passed through the loading slot 101a of the housing 101, i.e., the optical disc "A" is moved to the fourth position "A4" from the third position "A3" based on result produced by the optical sensors 250 and 251 of the first and second detecting means 202 and 203 and results produced by the first to third optical sensors 160 to 162 of the third detecting means 105 at a second point "T2" (see FIG. 39).

The optical disc "A" is then moved toward the fifth position "A5" from the fourth position "A4" (see FIG. 8).

The first pivotal member 230 of the second detecting means 203 is pivotably moved toward the other of the angular positions thereof from one of the angular positions thereof while being held in contact with one of the longitudinal ends of the operation member 120, i.e., the first pivotal member 230 of the second detecting means 203 is moved counterclockwise around the center axis of the pivotal shaft 231 of the second detecting means 203 when the pin member 122 of the second detecting means 203 is moved in the fourth direction 16 while being held in contact with the outer peripheral surface of the optical disc "A" moved toward the fifth position "A5" from the fourth position "A4".

The light projected by the light source of the optical sensor 250 of the second detecting means 203 is intercepted by the projected portion 294 of the pivotal member 290 of the second detecting means 203 without being received by the light receiver in association with the light source of the optical sensor 250 of the second detecting means 203, i.e., the second signal "Hi" indicative of the second operational state of the light receiver of the optical sensor 250 of the second detecting means 203 is produced by the optical sensor 250 of the second detecting means 203 when the first pivotal member 230 of the second detecting means 203 is moved counterclockwise around the center axis of the shaft member 231 of the second detecting means 203.

On the other hand, the light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202 when the optical disc "A" is moved toward the fifth position "A5" from the fourth position "A4".

When the optical disc "A" is further moved toward the fifth position "A5" from the fourth position "A4", the pivotal member 240 of the second detecting means 202 is pivotably moved toward one of the angular positions thereof from the other of the angular positions thereof, i.e., the pivotal member 240 of the second detecting means 202 is moved counterclockwise around the center axis of the shaft member 241 of the first detecting means 202 while being held in contact with the outer peripheral surface of the optical disc "A" further moved toward the fifth position "A5" from the fourth position "A4".

The light projected by the light source of the optical sensor 251 of the first detecting means 202 is intercepted by the projected portion 244 of the pivotal member 240 of the first detecting means 202 without being received by the light receiver in association with the light source of the optical sensor 251 of the first detecting means 202, i.e., the second signal "Hi" indicative of the second operational state of the light receiver of the optical sensor 251 of the first detecting means 202 is produced by the optical sensor 251 of the first detecting means 202 when the lever portion 243 of the pivotal member 240 of the second detecting means 202 started to move counterclockwise around the center axis of the shaft member 241 of the first detecting means 202.

The judgment is made by the judging means 104 whether or not the optical disc "A" is moved to the fifth position "A5" from the fourth position "A4" based on result produced by the optical sensors 250 and 251 of the first and second detecting means 202 and 203 and results produced by the first to third optical sensors 160 to 162 of the third detecting means 105 at a third point "T3" (see FIG. 9).

When the optical disc "A" is moved to the fifth position "A5", the light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202.

The judgment is made by the judging means 104 whether or not the optical disc "A" is moved to the fifth position "A5" from the fourth position "A4" based on result produced by the optical sensors 250 and 251 of the first and second detecting means 202 and 203 and results produced by the first to third optical sensors 160 to 162 of the third detecting means 105 at a fourth point "T4" (see FIG. 9).

The optical disc "A" is then moved toward the sixth position "A6" from the fifth position "A5" (see FIG. 8).

The light projected by the light source of the optical sensor 250 of the second detecting means 203 is intercepted by the projected portion 294 of the pivotal member 290 of the second detecting means 203 without being received by the light receiver in association with the light source of the optical sensor 250 of the second detecting means 203, i.e., the second signal "Hi" indicative of the second operational state of the light receiver of the optical sensor 250 of the second detecting means 203 is produced by the optical sensor 250 of the second detecting means 203 when the optical disc "A" is moved toward the sixth position "A6" from the fifth position "A5".

On the other hand, the pivotal member 240 of the second detecting means 202 is pivotably moved toward the other of the angular positions thereof from one of the angular positions thereof, i.e., the pivotal member 240 of the second detecting means 202 is moved clockwise around the center axis of the shaft member 241 of the first detecting means 202 while being held in contact with the outer peripheral surface of the optical disc "A" moved toward the sixth position "A6" from the fifth position "A5".

The light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202 when the lever portion 243 of the pivotal member 240 of the second detecting means 202 started to move clockwise around the center axis of the shaft member 241 of the first detecting means 202.

The light projected by the light source of the optical sensor 251 of the first detecting means 202 is intercepted by the projected portion 244 of the pivotal member 240 of the first detecting means 202 without being received by the light receiver in association with the light source of the optical sensor 251 of the first detecting means 202, i.e., the first signal "Lo" indicative of the first operational state of the light receiver of the optical sensor 251 of the first detecting means 202 is produced by the optical sensor 251 of the first detecting means 202 when the lever portion 243 of the pivotal member 240 of the second detecting means 202 is further moved clockwise around the center axis of the shaft member 241 of the first detecting means 202.

The judgment is made by the judging means 104 as the optical disc "A" is moved to the sixth position "A6" from the fifth position "A5" based on result produced by the optical sensors 250 and 251 of the first and second detecting means 202 and 203 and results produced by the first to third optical sensors 160 to 162 of the third detecting means 105 at a fifth point "T5" (see FIG. 9).

When optical disc "A" is moved to the sixth position "A6" from the fifth position "A5", the light projected by the light source of the optical sensor 251 of the first detecting means 202 is intercepted by the projected portion 244 of the pivotal member 240 of the first detecting means 202 without being received by the light receiver of the optical sensor 251 of the first detecting means 202, i.e., the second signal "Hi" indicative of the second operational state of the light receiver of the optical sensor 251 of the first detecting means 202 is produced by the optical sensor 251 of the first detecting means 202.

When the lever portion 243 of the pivotal member 240 of the second detecting means 202 is made by the projected portion 101f of the housing 101 to fail to move clockwise around the center axis of the shaft member 241 of the first detecting means 202, the light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202.

The judgment is made by the judging means 104 on whether or not the optical disc "A" is moved toward the specific position from the sixth position "A6" based on result produced by the optical sensors 250 and 251 of the first and second detecting means 202 and 203 and results produced by the first to third optical sensors 160 to 162 of the third detecting means 105 at a sixth point "T6" (see FIG. 9).

Here, the optical disc "A" is pushed toward the specific position (not shown) on which the information contained in the optical disc "A" is read out under the condition that the optical disc "A" fails to be held in contact with the surface 61a of the roller member 61 of the conveying means 106.

The following description will be directed to the case that one optical disc is moved in the ejection direction while being held in contact with the surface of the roller member of the conveying means of the optical disc driving apparatus according to the present invention.

The lights respectively projected by the light sources 160b to 162b of the first to third optical sensors 160 to 162 of the third detecting means 105 are respectively received by the light receivers 160a to 162a in association with the light sources 160b to 162b of the first to third optical sensors 160 to 162 of the third detecting means 105, i.e., the first signals "Lo" indicative of the first operational state of the light receivers 160a to 162a of the first to third optical sensors 160 to 162 of the third detecting means 105 are respectively produced by the first to third optical sensors 160 to 162 of the third detecting means 105 before the optical disc "A" is moved in the ejection direction 14.

The controlling means 107 is firstly operated to control the conveying means 106 to have the driving motor 95 of the conveying means 106 produce the rotation torque. The roller member 61 of the conveying means 106 is operated to move around the central axis of the rotation shaft 60 in response to the rotation torque received from the driving motor 95 through the driven gear 64.

Here, the optical disc "A" is moved out the housing 101 along the disc path in response to the rotation torque produced by the driving motor 95 of the conveying means 106 while being held in contact with the surface of the roller member 61 of the conveying means 106.

While the optical disc "A" is moved in the ejection direction, the light projected by the light source 162b of the third optical sensor 162 is intercepted by the outer peripheral portion of the optical disc "A" moved in the ejection direction without being received by the light receiver 162a of the third optical sensor 162 of the third detecting means 105, i.e., the second signal "Hi" indicative of the second operational state of the light receiver 162a of the third optical sensor 162 of the third detecting means 105 is produced by the third optical sensor 162 of the third detecting means 105.

When the optical disc "A" is moved to an ejected position "E1" (see FIG. 38), the light projected by the light source 162b of the third optical sensor 162 is received by the light receiver 162a of the third optical sensor 162 of the third detecting means 105 without being intercepted by the outer peripheral portion of the optical disc "A" moved in the ejection direction, i.e., the first signal "Lo" indicative of the first operational state of the light receiver 162a of the third optical sensor 162 of the third detecting means 105 is produced by the third optical sensor 162 of the third detecting means 105.

The judgment is then made by the judging means 104 as the optical disc "A" is moved out of the housing 101, i.e., the optical disc "A" is moved to the ejected position "E1" based on results produced by the optical sensors 250 and 251 of the first and second detecting means 202 and 203 and results produced by the first to third optical sensors 160 to 162 of the third detecting means 105.

The controlling means 107 is then operated to control the conveying means 106 to have the driving motor 95 of the conveying means 106 stop producing the rotation torque.

As a result of the fact that the optical disc "A" is moved to the ejected position "E1" while being held in contact with the surface 61a of the roller member 61 of the conveying means 106, the optical disc "A" is retained by the roller member 61 of the conveying means 106 without being completely moved out of the housing 101.

When, on the other hand, the optical disc "A" is moved by an operator in the loading direction 13 from the ejected position "E1", the light projected by the light source 162b of the third optical sensor 162 is intercepted by the outer peripheral portion of the optical disc "A" moved in the ejection direction without being received by the light receiver 162a of the third optical sensor 162 of the third detecting means 105, i.e., the second signal "Hi" indicative of the second operational state of the light receiver 162a of the third optical sensor 162 of the third detecting means 105 is produced by the third optical sensor 162 of the third detecting means 105.

The judgment is then made by the judging means 104 as the optical disc "A" is moved in the loading direction 13 from the ejected position "E1" based on results produced by the optical sensors 250 and 251 of the first and second detecting means 202 and 203 and results produced by the first to third optical sensors 160 to 162 of the third detecting means 105. The conveyance of the optical disc "A" to be moved in the loading direction 13 is then performed by the conveying means 106.

Figure 41:
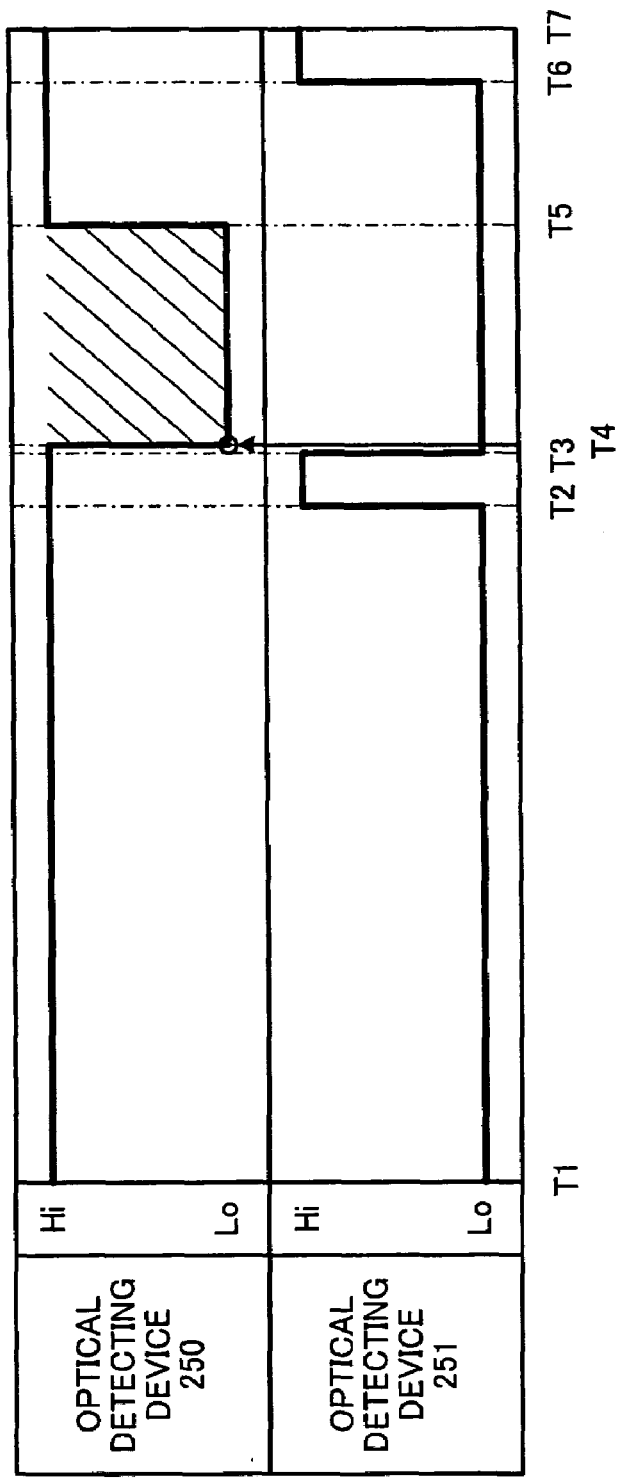
FIG. 41 is a timing chart showing output signals respectively produced by the optical sensors of the first and second detecting means of the second embodiment of the optical disc driving apparatus according to the present invention under the condition that the one optical disc partially moved into the housing is moved in the ejection direction.
Figure 42:
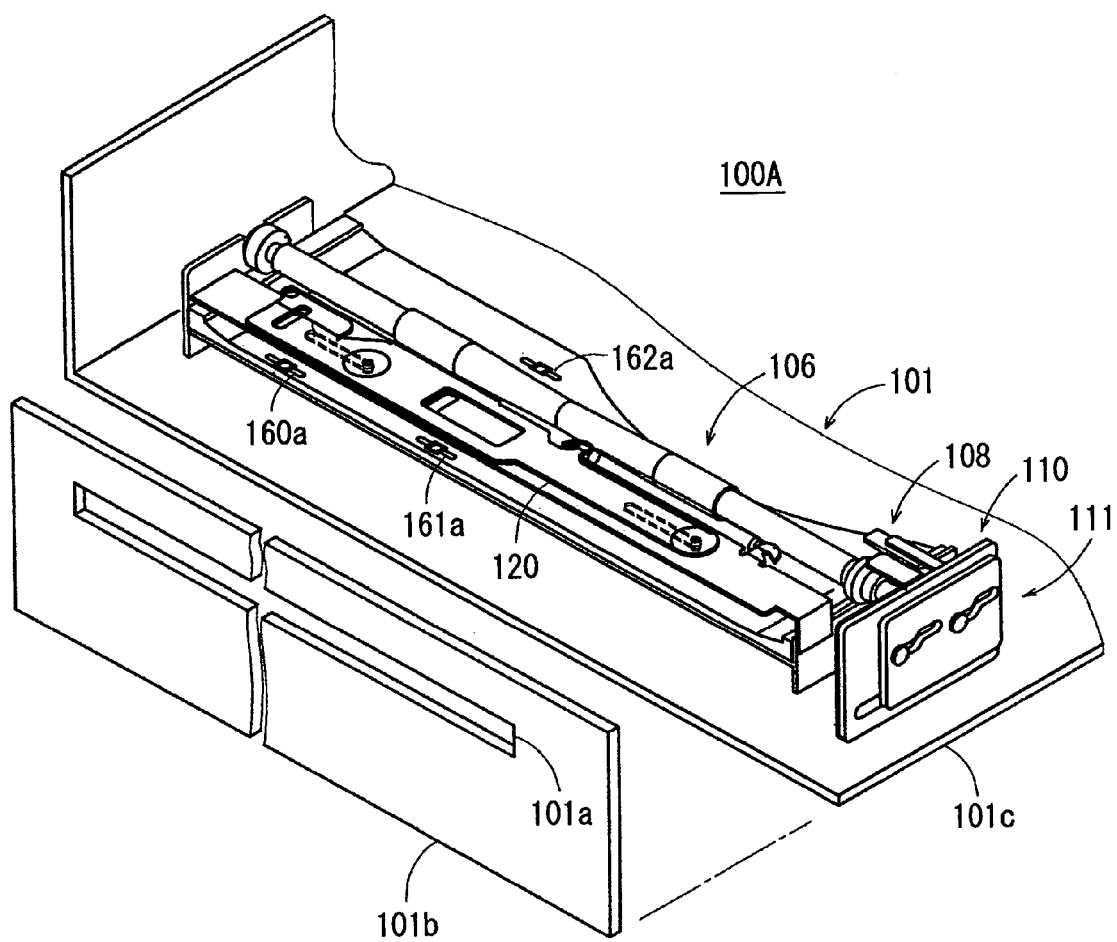
FIG. 42 is a fragmental perspective view showing the second and third members of the regulating means and the vicinities of the optical disc driving apparatus according to a modified embodiment similar to the first embodiment of the present invention.

The following description will be directed to the case that one optical disc is partially passed through the loading slot of the housing is forcibly moved out of the housing (see FIG. 41).

When, for example, the optical disc "A" moved toward the fifth position "A5" from the fourth position "A4" (see FIG. 39) is forcibly moved out of the housing 101, the first pivotal member 230 of the second detecting means 203 is pivotably moved toward the other of the angular positions thereof from one of the angular positions thereof while being held in contact with one of the longitudinal ends of the operation member 120, i.e., the first pivotal member 230 of the second detecting means 203 is moved counterclockwise around the center axis of the pivotal shaft 231 of the second detecting means 203 when the pin member 122 of the second detecting means 203 is moved in the fourth direction 16 while being held in contact with the outer peripheral surface of the optical disc "A" moved toward the fifth position "A5" from the fourth position "A4".

The light projected by the light source of the optical sensor 250 of the second detecting means 203 is intercepted by the projected portion 294 of the pivotal member 290 of the second detecting means 203 without being received by the light receiver in association with the light source of the optical sensor 250 of the second detecting means 203, i.e., the second signal "Hi" indicative of the second operational state of the light receiver of the optical sensor 250 of the second detecting means 203 is produced by the optical sensor 250 of the second detecting means 203.

On the other hand, the light projected by the light source of the optical sensor 251 of the first detecting means 202 is received by the light receiver in association with the light source of the optical sensor 251 of the first detecting means 202 without being intercepted by the projected portion 244 of the pivotal member 240 of the first detecting means 202, i.e., the first signal "Lo" indicative of the first operational state of the light receiver of the optical sensor 251 of the first detecting means 202 is produced by the optical sensor 251 of the first detecting means 202.

The judgment is then made by the judging means 104 as the conveyance of the optical disc is not complete within the specific time interval based on results produced by the optical sensors 150 and 151 of the first and second detecting means 102 and 103 and results produced by the first to third optical sensors 160 to 162 of the third detecting means 105.

From the above detail description, it will be understood that the optical disc driving apparatus can prevent partially or entirely overlapped optical discs from being moved into the housing.

When the partially overlapped or entirely overlapped optical discs are forcibly passed through the loading slot 101a of the housing 101, the first and second members 40, 50, and 55 of the regulating means 108 of the optical disc driving apparatus 100, 200 according to the preferred embodiments of the present invention can prevent the partially overlapped or entirely overlapped optical discs from being forcibly passed through the loading slot 101a of the housing 101 without being disfigured out by the partially overlapped or entirely overlapped optical discs forcibly passed through the loading slot 101a of the housing 101 by reason that the second members 50 and 55 of the regulating means 108 are respectively movable toward and away from the longitudinal end portions of the first member 40 of the regulating means 108 while being respectively urged by the urging members 170 and 175 of the urging means 110 toward the first member 40 of the regulating means 108.

When the partially overlapped or entirely overlapped optical discs are forcibly passed through the loading slot 101a of the housing 101, the optical disc driving apparatus 100, 200 according to the preferred embodiments of the present invention ensures to prevent the partially overlapped or entirely overlapped optical discs from being forcibly passed through the loading slot 101a of the housing 101 by reason that the first upper surfaces 42a and 42b of the longitudinal end portions of the first member 40 and the first lower surfaces 51a and 56a of the lever portions 51 and 56 of the second members 50 and 55 form in combination an imaginary passageway 10 not only having the one optical disc passed therethrough, but also having the partially overlapped or entirely overlapped optical discs fail to pass therethrough, and the first upper surfaces 42a and 42b of the longitudinal end portions of the first member 40 and the surface 61a of the roller member 61 of the conveying means 106 form in combination a slot not only having the one optical disc passed therethrough, but also having the partially overlapped or entirely overlapped optical discs fail to pass therethrough.

When the partially overlapped or entirely overlapped optical discs are forcibly passed through the loading slot 101a of the housing 101, the third members 50 and 85 of the regulating means 108 of the optical disc driving apparatus 100, 200 according to the preferred embodiments of the present invention can prevent the roller member 61 of the conveying means 106 from being moved away from the first member 40 of the regulating means 108 by the partially overlapped or entirely overlapped optical discs from being forcibly passed through the loading slot 101a of the housing 101 without being disfigured out by the partially overlapped or entirely overlapped optical discs forcibly passed through the loading slot 101a of the housing 101 by reason that the third members 50 and 85 of the regulating means 108 are respectively movable toward and away from the longitudinal end portions of the first member 40 of the regulating means 108 while being respectively urged by the urging members 170 and 175 of the urging means 110 toward the first member 40 of the regulating means 108.

The optical disc driving apparatus 100 and 200 ensures that the partially overlapped or entirely overlapped optical discs forcibly passed through the loading slot 101a of the housing 101 are hard to be damaged by the first lower surfaces 51a and 56a of the second members 50 and 55 of the guiding means 108 and the first upper surfaces 42a and 42b of the longitudinal end portions of the first member 40 of the regulating means 108 by reason that the second members 50 and 55 of the regulating means 108 are respectively movable toward and away from the longitudinal end portions of the first member 40 of the regulating means 108 while being respectively urged by the urging members 170 and 175 of the urging means 110 toward the first member 40 of the regulating means 108, i.e., toward the imaginary disc path.

The optical disc driving apparatus 100 and 200 ensures that the partially overlapped or entirely overlapped optical discs forcibly passed through the loading slot 101a of the housing 101 are hard to be damaged by the surface 61a of the roller member 61 of the conveying means 106 and the first upper surfaces 42a and 42b of the longitudinal end portions of the first member 40 of the regulating means 108 by reason that the third members 80 and 85 of the regulating means 108 are respectively movable toward and away from the longitudinal end portions of the first member 40 of the regulating means 108 while being respectively urged by the urging members 170 and 175 of the urging means 110 toward the first member 40 of the regulating means 108, i.e., toward the imaginary disc path.

When the one optical disc is passed through the loading slot 101a of the housing 101, the conveyance of the optical disc to be moved into the housing 101 is performed by the conveying means 106 without being prevented by the first lower surfaces 51a and 56a of the second members 50 and 55 of the guiding means 108 and the first upper surfaces 42a and 42b of the longitudinal end portions of the first member 40 of the regulating means 108.

When, in the similar manner, the one optical disc is passed through the loading slot 101a of the housing 101, the conveyance of the optical disc to be moved into the housing 101 is performed by the conveying means 106 without being prevented by the surface 61a of the roller member 61 of the conveying means 106 and the first upper surfaces 42a and 42b of the longitudinal end portions of the first member 40 of the regulating means 108.

When, in the similar manner, the one optical disc is passed through the loading slot 101a of the housing 101, the conveyance of the optical disc to be moved into the housing 101 is performed by the conveying means 106 without being prevented by the surface 61a of the roller member 61 of the conveying means 106 and the first upper surfaces 42a and 42b of the longitudinal end portions of the first member 40 of the regulating means 108.

When the partially overlapped or entirely overlapped optical discs are forcibly passed through the loading slot 101a of the housing 101, the optical disc driving apparatus 100, 200 according to the preferred embodiments of the present invention ensures to prevent the partially overlapped or entirely overlapped optical discs from being passed through the loading slot 101a of the housing 101 by reason that the second members of the regulating means are disposed in spaced relationship with the loading slot of the housing, the roller member of the conveying means being disposed between the second member of the regulating means and the loading slot of the housing, the first surfaces of the lever portions of the second members of the regulating means and the first and upright surfaces of one of the longitudinal end portions of the first member of the regulating means form in combination grooves each having the outer peripheral portion of the one optical disc passed therethrough, and the optical disc is released from the roller member of the conveying means without being held in contact with the surface of the roller member of the conveying means after the peripheral portion of the optical disc is passed through each of the grooves under the condition that the conveyance of the optical disc to be moved in the loading direction is performed by the conveying means.

In the optical disc driving apparatus according to the first embodiment of the present invention, the first upper surfaces 42a and 42b of the longitudinal end portions of the first member 40 of the regulating means 108 each inclined with respect to the imaginary disc path at a predetermined first inclination angle has a first area to be brought into contact with the optical disc, while the first upper surfaces of the longitudinal end portions of the first member of the regulating means each parallel to the imaginary disc path has a second area to be brought into contact with the optical disc.

The first areas of the first upper surfaces 42a and 42b of the longitudinal end portions of the first member 40 of the regulating means 108 are respectively smaller in size than the second areas of the first upper surfaces of the longitudinal end portions of the first member of the regulating means each parallel to the imaginary disc path. This leads to the fact that the optical disc driving apparatus according to the first and second embodiments of the present invention ensures that the optical disc moved into and out of the housing 101 are hard to be damaged by the first surfaces 42$a$ and 42$b$ of the longitudinal end portions of the first member 40 of the regulating means 108.

In the similar fashion, the first lower surfaces 51$a$ and 56$a$ of the lever portions of the second members 50 and 55 of the regulating means 108 each inclined with respect to the imaginary disc path at a predetermined second inclination angle has a third area to be brought into contact with the optical disc, while the first lower surfaces of the lever portions of the second members 50 and 55 of the regulating means 108 each parallel to the imaginary disc path has a fourth area to be brought into contact with the optical disc.

The third areas of the first lower surfaces 51$a$ and 56$a$ of the lever portions of the second members 50 and 55 of the regulating means 108 are respectively smaller in size than the fourth areas of the first lower surfaces of the lever portions of the second members 50 and 55 of the regulating means 108 each parallel to the imaginary disc path. This leads to the fact that the optical disc driving apparatus according to the first and second embodiments of the present invention ensures that the optical disc moved into and out of the housing 101 are hard to be damaged by the second surfaces 50 and 55 of the longitudinal end portions of the first member 40 of the regulating means 108.

The optical disc driving apparatus according to the first and second embodiment of the present invention ensures to have the optical disc moved out of the housing in response to the rotation torque produced by the driving motor by reason that the optical disc is moved into the housing 101 in response to the first rotation torque produced by the driving motor, on the other hand, the optical disc is moved out of the housing 101 in response to the second rotation torque smaller than the first rotation torque produced by the driving motor, i.e., the urging means 110 is adapted to assume two different operational states consisting of a first operational state to resiliently urging each of the second members 50 and 55 of the regulating means 108 in the second direction with a first resilient force thereof under the condition that the conveyance of the optical disc to be moved in the loading direction is performed by the conveying means 106, and a second operational state to resiliently urging each of the second members 50 and 55 of the regulating means 108 in the second direction with a second resilient force thereof which is smaller than the first resilient force under the condition that the conveyance of the optical disc to be moved in the ejection direction opposite to the loading direction is performed by the conveying means 106.

The optical disc driving apparatus according to the first and second embodiment of the present invention ensures to have the optical disc moved out of the housing in response to the rotation torque produced by the driving motor by reason that the optical disc is moved into the housing 101 in response to the first rotation torque produced by the driving motor, on the other hand, the optical disc is moved out of the housing 101 in response to the second rotation torque smaller than the first rotation torque produced by the driving motor, i.e., the urging means 110 is adapted to assume two different operational states consisting of a first operational state to resiliently urging each of the third members 80 and 85 of the regulating means 108 in the second direction with a first resilient force thereof under the condition that the conveyance of the optical disc to be moved in the loading direction is performed by the conveying means 106, and a second operational state to resiliently urging each of the third members 80 and 85 of the regulating means 108 in the second direction with a second resilient force thereof which is smaller than the first resilient force under the condition that the conveyance of the optical disc to be moved in the ejection direction opposite to the loading direction is performed by the conveying means 106.

The optical disc driving apparatus according to the first and second embodiment of the present invention ensures to have the partially overlapped or entirely overlapped optical discs moved out of the housing in response to the rotation torque produced by the driving motor 95 by reason that the partially overlapped or entirely overlapped optical discs are moved into the housing 101 in response to the first rotation torque produced by the driving motor 95, on the other hand, the partially overlapped or entirely overlapped optical discs are moved out of the housing 101 in response to the second rotation torque smaller than the first rotation torque produced by the driving motor 95, i.e., the urging means 110 is adapted to assume two different operational states consisting of a first operational state to resiliently urging each of the third members 80 and 85 of the regulating means 108 in the second direction with a first resilient force thereof under the condition that the conveyance of the optical disc to be moved in the loading direction is performed by the conveying means 106, and a second operational state to resiliently urging each of the third members 80 and 85 of the regulating means 108 in the second direction with a second resilient force thereof which is smaller than the first resilient force under the condition that the conveyance of the optical disc to be moved in the ejection direction opposite to the loading direction is performed by the conveying means 106.

When the partially overlapped or entirely overlapped optical discs are forcibly passed through the loading slot 101$a$ of the housing 101, the optical disc driving apparatus 100, 200 according to the preferred embodiments of the present invention ensures to prevent the partially overlapped or entirely overlapped optical discs from being passed through the loading slot 101$a$ of the housing 101 by reason that the controlling means 107 is adapted to control the driving motor 95 of the conveying means 106 to have the roller member 61 of the conveying means 106 stop moving around the central axis thereof under the condition that the judgment is made by the judging means 104 as the conveyance of the optical disc to be moved into the housing 101 is not complete within the specific time interval based on results detected by the first and second detecting means 102 and 103.

In the optical disc driving apparatus according to the first and second embodiments of the present invention, the numbers of parts of the optical disc driving apparatus according to the first and second embodiments of the present invention can be deceased by reason that the longitudinal end portions of the first member 40 of the regulating means 108 respectively have first surfaces 42$a$ and 42$b$ to be brought into contact with the lower peripheral edge of the optical disc to be moved into and out of the housing 101, and respectively having upright surfaces 43$a$ and 43$b$ constitute in combination guiding means 109 for allowing the optical disc to be moved into and out of the housing 101 on the imaginary disc path while preventing the optical disc from being moved in third and fourth directions 15 and 16 each perpendicular to the imaginary center plane of the housing 101, and each parallel to the imaginary disc path.

In the optical disc driving apparatus according to the first and second embodiments of the present invention, the numbers of parts of the optical disc driving apparatus according to the first and second embodiments of the present invention can be deceased by reason that the urging member 170 of the urging means 110 having first and second urging portions respectively resiliently urging second and third members 50 and 80 of the regulating means 108.

In the optical disc driving apparatus according to the first and second embodiments of the present invention, the numbers of parts of the optical disc driving apparatus according to the first and second embodiments of the present invention can be deceased by reason that the urging members 175 of the urging means 110 each having first and second urging portions respectively resiliently urging second and third members 55 and 85 of the regulating means 108.

While there has been described in the forgoing embodiment about the fact that the conveying means 106 includes a driving motor 95 for producing a rotation torque, and a roller member 61 rotatable around a rotation axis thereof, the conveying means may include a driving motor for producing a rotation torque, the driving motor having a rotation shaft, a first pulley wormed with the rotation shaft of the driving motor, and a roller member having a rotation shaft, a second pulley formed with the rotation shaft of the roller member, and a driving belt stretched on the first and second pulleys to transmit the rotation torque between the first and second pulleys. The driving motor of the conveying means is operative to produce the rotation torque, while the roller member of conveying means is operative to have the optical disc moved into and out of the housing in response to the rotation torque received from the driving motor through the driving belt.

In the optical disc driving apparatus according to the first and second embodiments of the present invention, the urging members 70 and 75 of the conveying means 106 are respectively constituted by the flat springs, however, the urging members of the conveying means may be respectively constituted by coil springs each such as for example a helical extension spring and a helical compression spring.

The controlling means 107 is operative to control the conveying means 106 to allow the driving motor 95 to stop producing the rotation torque under the condition that the judgment is made by the judging means 104 as the optical disc partially passed through the loading slot 101*a* of the housing 101 is ejected from the loading slot 101*a* of the housing 101 based on results detected by the first and second detecting means 102 and 103.

While the subject invention has been described with relation to the preferred embodiment, various modifications and adaptations thereof will now be apparent to those skilled in the art as far as such modifications and adaptations fall within the scope of the appended claims intended to be covered thereby.

What is claimed is:

1. An optical disc driving apparatus for driving an optical disc while reading out information contained in said optical disc, said optical disc having an outer peripheral surface, said optical disc driving applications comprising: a housing formed with a loading slot having said optical disc passed therethrough; first detecting means for performing a detection of said outer peripheral surface of said optical disc being moved into said housing; and second detecting means for performing a detection of said outer peripheral surface of said optical disc being moved into said housing after said detection of said outer peripheral surface of said optical disc is performed by said first detecting means; and judging means for judging whether a single said optical disc or a plurality of partially overlapped said optical discs are passed through said loading slot of said housing based on results detected by said first and second detecting means, in which said housing has an imaginary center plane on which a center axis of said optical disc extends when said optical disc moves into said housing, an imaginary lateral plane perpendicular to said imaginary center plane, and said loading slot of said housing having an imaginary disc path on which said optical disc moves into said housing, said imaginary disc path being in perpendicular relationship with each of said imaginary center plane and said imaginary lateral plane, in which said first detecting means includes a pivotal member pivotably movable between angular positions thereof while being held in contact with said outer peripheral surface of said optical disc to be moved into said housing, and a detecting device for detecting said angular positions of said pivotal member, and in which said second detecting means includes an operation member accommodated in said housing in spaced relationship with said pivotal member of said first detecting means to be movable between operational positions thereof while being held in contact with said outer peripheral surface of said optical disc to be moved into said housing, a pivotal member to be pivotably movable between angular positions thereof in association with said operational positions of said operation member while being held in contact with said operation member, and a detecting device for detecting said angular positions of said pivotal member.

2. An optical disc driving apparatus as set forth in claim 1, in which said detecting device of said first detecting means is constituted by an optical sensor including a light source for projecting a light on a light path thereof, and a light receiver disposed on said light path of said light source, and said light receiver being adapted to receive said projected light from said light source, and in which said pivotal member of said first detecting means has a projected portion for having said optical sensor perform said detection of said pivotal member by intervening between said light source and said light receiver of said optical sensor, said pivotal member of said first detecting means being operative to assume two different operational states consisting of a first operational state to have said light receiver of said optical sensor receive said projected light from said light source of said optical sensor, said optical sensor being operative to produce a first signal indicative of said first operational state of said pivotal member of said first detecting means when said projected light is received from said light source by said light receiver without being intercepted by said projected portion of said pivotal member, and a second operational state to have said light receiver of said optical sensor fail to receive said projected light from said light source of said optical sensor, said optical sensor being operative to produce a second signal indicative of said second operational state of said pivotal member of said first detecting means when said projected light is intercepted by said projected portion of said pivotal member without being received by said light receiver.

3. An optical disc driving apparatus as set forth in claim 1, in which said detecting device of said second detecting means is constituted by an optical sensor including a light source for projecting a light on a light path thereof, and a light receiver disposed on said light path of said light source, and said light receiver being adapted to receive said projected light from said light source, and in which said pivotal member of said second detecting means has a projected portion for having said optical sensor perform said detection of said pivotal member by intervening between said light source and said light receiver of said optical sensor, said pivotal member of said second detecting means being operative to assume two different operational states consisting of a first operational state to have said light receiver of said optical sensor receive said projected light from said light source of said optical sensor, said optical sensor being operative to produce a first signal indicative of said first operational state of said pivotal member of said second detecting means when said projected light is received from said light source by said light receiver without being intercepted by said projected portion of said pivotal member, and a second operational state to have said light receiver of said optical sensor fail to receive said projected light from said light source of said optical sensor, said optical sensor being operative to produce a second signal indicative of said second operational state of said pivotal member of said second detecting means when said projected light is intercepted by said projected portion of said pivotal member without being received by said light receiver.

4. An optical disc driving apparatus as set forth in claim 1, which further comprises third detecting means for performing a detection of said optical disc partially passed through said loading slot of said housing along said disc path; conveying means for performing a conveyance of said optical disc along said imaginary disc path; and controlling means for controlling said conveying means to have said conveying means perform said conveyance of said optical disc along said imaginary disc path in response to results judged by said judging means and results detected by said third detecting means.

5. An optical disc driving apparatus as set forth in claim 4, in which said third detecting means is constituted by a plurality of optical sensors each includes a light source for projecting a light toward said imaginary disc path on a light path thereof, and a light receiver disposed on said light path of said light source, said light receiver of each of said optical sensors being adapted to receive said projected light from said light source in association with said light receiver of each of said optical sensors through said imaginary disc path, said light receiver being operative to assume two different operational states consisting of a first operational state to receive said projected light from said light source in association with said light receiver without being intercepted by said optical disc partially passed through said loading slot of said housing, a second operational state to fail to receive said projected light from said light source in association with said light receiver in response to said optical disc partially passed through said loading slot of said housing, said optical sensors of said third detecting means each being operative to produce a first signal indicative of said first operational state of said light receiver thereof when said projected light is received by said light receiver thereof without being intercepted by said optical disc partially passed through said loading slot of said housing, and to produce a second signal indicative of said second operational state of said light receiver thereof when said projected light is intercepted by said optical disc partially passed through said loading slot of said housing without being received by said light receiver thereof.

6. An optical disc driving apparatus as set forth in claim 4, in which said conveying means includes a driving motor for producing a rotation torque, and a roller member rotatable around a rotation axis thereof, said roller member having a surface to be brought into contact with a surface of said optical disc, and in which said controlling means is operative to control said conveying means to have said roller member of said conveying means rotatably moved around said rotation axis thereof in response to said rotation torque produced by said driving motor of said conveying means under the condition that the judgment is made by said judging means as said optical disc is passed through said loading slot of said housing based on results judged by said judging means.

7. An optical disc driving apparatus as set forth in claim 6, in which said controlling means is operative to control said conveying means to allow said driving motor to stop producing said rotation torque under the condition that the judgment is made by said judging means as said plurality of partially overlapped said optical discs are passed through said loading slot of said housing based on results detected by said first and second detecting means.

8. An optical disc driving apparatus as set forth in claim 6, in which said controlling means is operative to control said conveying means to have said conveying means stop performing said conveyance of said plurality of partially overlapped said optical discs in a loading direction before having said conveying means perform said conveyance of said plurality of partially overlapped said optical discs in an ejection direction opposite to said loading direction under the condition that the judgment is made by said judging means as said partially overlapped optical discs are passed through said loading slot of said housing based on results detected by said first and second detecting means.

9. An optical disc driving apparatus as set forth in claim 1, in which said pivotal member of said first detecting means is operative to push said optical disc toward a specific position on which said information contained in said optical disc is read out after said conveyance of said optical disc to be moved into said housing is performed by said conveying means, and in which said judging means is operative to judge whether or not said conveyance of said optical disc to be moved into said housing is complete by said conveying means based on results detected by said second detecting means.

10. An optical disc driving apparatus for driving an optical disc while reading out information contained in said optical disc, said optical disc having an outer peripheral surface, said optical disc driving applications comprising: a housing formed with a loading slot having said optical disc passed therethrough; first detecting means for performing a detection of said outer peripheral surface of said optical disc being moved into said housing; and second detecting means for performing a detection of said outer peripheral surface of said optical disc being moved into said housing after said detection of said outer peripheral surface of said optical disc is performed by said first detecting means; and judging means for judging whether a single said optical disc or a plurality of partially overlapped said optical discs are passed through said loading slot of said housing based on results detected by said first and second detecting means, in which said housing has an imaginary center plane on which said center axis of said optical disc extends when said optical disc moves into said housing, an imaginary lateral plane perpendicular to said imaginary center plane, and an imaginary disc path on which said optical disc moves into said housing, said imaginary disc path being perpendicular to said imaginary center plane and said imaginary lateral plane, in which said first detecting means includes a pivotal member pivotably movable around a pivotal axis thereof while being held in contact with said outer peripheral surface of said optical disc to be moved into said housing, and a detecting device for performing a detection of said pivotal member, and in which said second detecting means includes an operation member accommodated in said housing in spaced relationship with said pivotal member of said first detecting means to be movable between operational positions thereof while being held in contact with said outer peripheral surface of said optical disc to be moved into said housing, a first pivotal member to be pivotably movable around a pivotal axis thereof while being held in contact with said operation member, a second pivotal member pivotably movable around said pivotal axis of said first pivotal member after said pivotal member of said first detecting means is brought into contact with said outer peripheral surface of said optical disc to be moved into said housing, an urging member for resiliently urging said second pivotal member toward said first pivotal member, and a detecting device for performing a detection of said second pivotal member.

11. An optical disc driving apparatus as set forth in claim 10, in which said detecting device of said second detecting means is constituted by an optical sensor including a light source for projecting a light on a light path thereof, and a light receiver disposed on said light path of said light source, and said light receiver being adapted to receive said projected light from said light source, and in which said second pivotal member of said second detecting means has a projected portion for having said optical sensor perform said detection of said second pivotal member by intervening between said light source and said light receiver of said optical sensor, said second pivotal member of said second detecting means being operative to assume two different operational states consisting of a first operational state to have said light receiver of said optical sensor receive said projected light from said light source of said optical sensor, said optical sensor being operative to produce a first signal indicative of said first operational state of said second pivotal member of said second detecting means when said projected light is received from said light source by said light receiver without being intercepted by said project portion of said second pivotal member, and a second operational state to have said light receiver of said optical sensor fail to receive said projected light from said light source of said optical sensor, said optical sensor being operative to produce a second signal indicative of said second operational state of said second pivotal member of said second detecting means when said projected light is intercepted by said project portion of said second pivotal member without being received by said light receiver.

12. An optical disc driving apparatus as set forth in claim 11, in which said pivotal member is adapted to assume two different operational states consisting of a first operational state to be held in engagement with said second pivotal member of said second detecting means without being brought into contact with said outer peripheral surface of said optical disc to be moved into said housing under the condition that said second signal is produced by said detecting device of said second detecting means, and a second operational state to be held in disengagement with said second pivotal member of said second detecting means while being brought into contact with said outer peripheral surface of said optical disc to be moved into said housing under the condition that said first signal is produced by said detecting device of said second detecting means.

13. An optical disc driving apparatus as set forth in claim 12, in which said controlling means is operative to control said conveying means to allow said driving motor of said conveying means to stop producing said rotation torque under the condition that the judgment is made by said judging means as said optical disc partially passed through said loading slot of said housing is ejected from said loading slot of said housing based on results detected by said first and second detecting means.

14. An optical disc driving apparatus as set forth in claim 6, which further comprises regulating means for allowing said optical disc to be moved into and out of said housing on said imaginary disc path while preventing said optical disc from being movable toward and away from said imaginary disc path.

15. An optical disc driving apparatus as set forth in claim 14, in which said regulating means includes a base member retained by said housing, a first member supported by said base member, and second members each movable toward and away from said first member, said second members respectively having lever portions each having a first surface to be brought into contact with a peripheral edge of said optical disc to be moved into and out of said housing, and said lever portions of said second members each having a second surface extending outwardly from longitudinally outer end of said first surface thereof, and in which said first member of said regulating means has longitudinal end portions and a central plate portion intervening between said longitudinal end portions, said longitudinal end portions of said first member each having a first surface on which said optical disc to be moved into and out of said housing is rested under the condition that said peripheral edge of said optical disc is brought into contact with said first surface of each of said longitudinal end portions of said first member, and said longitudinal end portions of said first member each having a second surface on which said lever portion of said second member is rested under the condition that said second surfaces of said lever portions of said second members are respectively brought into contact with said second surfaces of said longitudinal end portions of said first member.

16. An optical disc driving apparatus as set forth in claim 15, which further comprises urging means for resiliently urging each of said second members of said regulating means in said second direction.

17. An optical disc driving apparatus as set forth in claim 16, in which said first surfaces of said longitudinal end portions of said first member of said regulating means each is inclined with respect to said imaginary disc path at a predetermined first inclination angle, and in which said first surfaces of said lever portions of said second members each is inclined with respect to said imaginary disc path at a predetermined second inclination angle.

18. An optical disc driving apparatus as set forth in claim 16, in which said first surfaces of said longitudinal end portions of said first member and said first surfaces of said lever portions of said second members form in combination an imaginary passageway in the form of a rectangle shape in cross-section taken along said imaginary disc path, said imaginary passageway having said optical disc passed therethrough on said imaginary disc path, and in which said imaginary passageway has first and second imaginary surfaces each parallel to said imaginary disc path, and upright imaginary surfaces respectively equally spaced apart from said upright surfaces of said longitudinal end portions of said first member, said imaginary passageway having first peripheral imaginary edges respectively held in contact with said first surfaces of said lever portions of said second members, and said imaginary passageway having second peripheral imaginary edges respectively held in contact with said first surfaces of said longitudinal end portions of said first member, said upright imaginary surfaces of said imaginary passageway being in spaced relationship with each other at a distance equal to a diameter of said optical disc to be moved into and out of said housing, said first and second imaginary surfaces of said imaginary passageway being in spaced relationship with each other at a distance larger in length than a thickness of said optical disc to be moved into and out of said housing, and smaller in length than twice of said thickness of said optical disc to be moved into and out of said housing.

19. An optical disc driving apparatus as set forth in claim 18, in which said upright surfaces of said longitudinal ends portions of said first member of said regulating means constitute in combination guiding means for allowing said optical disc to be moved into and out of said housing on said imaginary disc path while preventing said optical disc from being moved in third and fourth directions each perpendicular to said imaginary center plane of said housing, and each parallel to said imaginary disc path.

20. An optical disc driving apparatus as set forth in claim 15, in which said urging means is adapted to assume two different operational states consisting of a first operational state to resiliently urging each of said second members of said regulating means in said second direction with a first resilient force thereof under the condition that said conveyance of said optical disc to be moved in said loading direction is performed by said conveying means, and a second operational state to resiliently urging each of said second members of said regulating means in said second direction with a second resilient force thereof which is smaller than said first resilient force under the condition that said conveyance of said optical disc to be moved in said ejection direction opposite to said loading direction is performed by said conveying means, and which further comprises setting means for having said urging means selectively assume said first and second operational states in response to results judged by said judging means.

21. An optical disc driving apparatus as set forth in claim 14, in which said first surfaces of said longitudinal end portions of said first member are collectively adapted to bring said surface of said optical disc into contact with said surface of said roller member of said conveying means before failing to bring said surface of said optical disc into contact with each of said first surfaces of said second members of said regulating means under the condition that said conveyance of said single said optical disc to be moved in said loading direction is performed by said conveying means, and in which said first surfaces of said longitudinal end portions of said first member are collectively adapted to bring said surface of said plurality of partially overlapped said optical discs into contact with said surface of said roller member of said conveying means before bring said surface of said plurality of partially overlapped said optical discs into contact with each of said first surfaces of said second members of said regulating means under the condition that said conveyance of said plurality of partially overlapped said optical discs to be moved in said loading direction is performed by said conveying means.

22. An optical disc driving apparatus as set forth in claim 15, in which said roller member of said conveying means is supported by said base member of said regulating means to be movable toward and away from said imaginary disc path, in which said regulating means includes third members collectively for preventing said roller member of said conveying means from being moved in said first direction said third members each supported by said base member of said regulating means to be movable toward and away from said imaginary disc path, and in which said urging means is adapted to resiliently urge each of said third members of said regulating means in said second direction.

23. An optical disc driving apparatus as set forth in claim 22, in which said roller member of said conveying means includes supporting members for rotatably supporting said roller member, said supporting members respectively having outer surfaces, in which said third members of said regulating means respectively have projected portions respectively having surfaces to be brought into contact with said outer surfaces of said supporting members, in which said first surfaces of said longitudinal end portions of said first member of said regulating means are adapted to fail to bring said outer surfaces of said supporting members of said conveying means into contact with said surfaces of said third members of said regulating means with said surface of said single said optical disc brought into contact with said surface of said roller member of said conveying means under the condition that said conveyance of said single said optical disc to be moved in said loading direction is performed by said conveying means, and in which said first surfaces of said longitudinal end portions of said first member of said regulating means are adapted to bring said outer surfaces of said supporting members of said conveying means into contact with said surfaces and of said third members of said regulating means with said surface of said plurality of partially overlapped said optical discs brought into contact with said surface of said roller member of said conveying means under the condition that said conveyance of said plurality of partially overlapped said optical discs to be moved in said loading direction is performed by said conveying means.

24. An optical disc driving apparatus as set forth in claim 23, in which said surface of one of said third members of said regulating means and said outer surface of one of said supporting members of said conveying means form in combination a first gap between said surface of one of said third members of said regulating means and said outer surface of one of said supporting members of said conveying means under the condition that said surface of said roller member of said conveying means is brought into contact with said surface of said single said optical disc to be moved into said housing, and said first surfaces of said longitudinal end portions of said first member of said regulating means being brought into contact with said peripheral edge of said single said optical disc to be moved into said housing, in which said surface of the other of said third members of said regulating means and said outer surface of the other of said supporting member of said conveying means form in combination a second gap between said surface of the other of said third members of said regulating means and said outer surface of the other of said supporting members of said conveying means under the condition that said surface of said roller member of said conveying means is brought into contact with said surface of said single said optical disc to be moved into said housing, and said first surfaces of said longitudinal end portions of said first member of said regulating means being brought into contact with said peripheral edge of said one optical disc to be moved into said housing, and in which said first gap between said surface of single said of said third members of said regulating means and said outer surface of one of said supporting members of said conveying means is smaller than said thickness of said one optical disc to be moved into and out of said housing, and said second gap between said surface of the other of said third members of said regulating means and said outer surface of the other of said supporting members of said conveying means being smaller than said thickness of said single said optical disc to be moved into and out of said housing.

25. An optical disc driving apparatus as set forth in claim 24, in which said second members of said regulating means are disposed in spaced relationship with said loading slot of said housing, in which said roller member of said conveying means is disposed between said second member of said regulating means and said loading slot of said housing, in which said first surfaces of said lever portions of said second members of said regulating means and said first and upright surfaces of single said of said longitudinal end portions of said first member of said regulating means form in combination grooves each having said outer peripheral portion of said one optical disc passed therethrough, and in which said optical disc is released from said roller member of said conveying means without being held in contact with said surface of said roller member of said conveying means after said peripheral portion of said optical disc is passed through each of said grooves under the condition that said conveyance of said optical disc to be moved in said loading direction is performed by said conveying means.

26. An optical disc driving apparatus as set forth in claim 25, in which said urging means is adapted to assume two different operational states consisting of a first operational state to resiliently urging each of said third members of said regulating means in said second direction with a first resilient force thereof under the condition that said conveyance of said optical disc to be moved in said loading direction is performed by said conveying means, and a second operational state to resiliently urging each of said third members of said regulating means in said second direction with a second resilient force thereof which is smaller than said first resilient force under the condition that said conveyance of said optical disc to be moved in said ejection direction opposite to said loading direction is performed by said conveying means, and which further comprises setting means for having said urging means selectively assume said first and second operational states in response to results judged by said judging means.

27. An optical disc driving apparatus as set forth in claim 26, in which said urging means is constituted by first and second urging members, said first urging member being adapted to resiliently urge both one of said second members of said regulating means and one of said third members of said regulating means in said second direction, and said second urging member being adapted to resiliently urge both the other of said second members of said regulating means and the other of said third members of said regulating means in said second direction.

28. An optical disc driving apparatus as set forth in claim 27, in which said first urging member of said urging means has a plate portion, and first and second lever portions respectively having a first free end held in engagement with one of said second members of said regulating means, and a second free end held in engagement with one of said third members of said regulating means, said first and second lever portions forming part of said first urging member respectively having first and second fix ends each integrally formed with said plate portion forming part of said first urging member, and in which said second urging member of said urging means has a plate portion, and first and second lever portions respectively having a first free end held in engagement with the other of said second members of said regulating means, and a second free end held in engagement with the other of said third members of said regulating means, said first and second lever portions forming part of said second urging member respectively having first and second fix ends each integrally formed with said plate portion forming part of said second urging member.

29. An optical disc driving apparatus as set forth in claim 28, in which said setting means includes first and second base members each supported by said housing, and first and second cam members respectively slidably supported by said first and second base members each to be movable between first and second operational positions in association with said first and second operational states of said first and second urging members of said urging means.

30. An optical disc driving apparatus as set forth in claim 29, in which said controlling means is adapted to control said first and second cam members of said setting means to have said first and second cam members of said setting means selectively assume said first and second operational positions based on results judged by said judging means.

31. An optical disc driving apparatus as set forth in claim 30, in which said controlling means is adapted to control said first and second cam members of said setting means to have each of said first and second cam members of said setting means assume said first operational position when said conveyance of said optical disc to be moved in said loading direction is performed by said conveying means, and in which said controlling means is adapted to control said roller member of said conveying means to have said roller member of said conveying means stop performing said conveyance of said optical disc when said judgment is made by said judging means as said conveyance of said optical disc to be moved into said housing is complete based on results judged by said judging means.

32. An optical disc driving apparatus as set forth in claim 31, in which said controlling means is adapted to control said first and second cam members of said setting means to have each of said first and second cam members of said setting means assume said second operational position before controlling said roller member of said conveying means to have said roller member of said conveying means perform said conveyance of said optical disc to be moved in said ejection direction.

33. An optical disc driving apparatus as set forth in claim 14, in which said regulating means includes a base member retained by said housing, a first member supported by said base member, and at least one second member movable toward and away from said first member, said second member having a first surface to be brought into contact with one of peripheral edges of said optical disc to be moved into and out of said housing, and a second surface extending outwardly from longitudinally outer end of said first surface thereof, and in which said first member of said regulating means has longitudinal end portions each having a first surface on which said optical disc to be moved into and out of said housing is rested under the condition that one of said peripheral edges of said optical disc is brought into contact with said first surface of each of said longitudinal end portions of said first member, and said longitudinal end portions of said first member each having a second surface on which said second member is rested under the condition that said second surface of said lever portion of said second member is brought into contact with one of said second surfaces of said longitudinal end portions of said first member.

34. An optical disc driving apparatus as set forth in claim 33, which further comprises urging means for resiliently urging said second member of said regulating means toward said imaginary disc path.

35. An optical disc driving apparatus as set forth in claim 34, in which said first surface, of each of said longitudinal end portions of said first member of said regulating means is inclined with respect to said imaginary disc path at a predetermined first inclination angle, and in which said first surface of said second member is inclined with respect to said imaginary disc path at a predetermined second inclination angle.

36. An optical disc driving apparatus as set forth in claim 34, in which said first surface of each of said longitudinal end portions of said first member and said first surface of said second member form in combination an imaginary passageway in the form of a rectangle shape in cross-section taken along said imaginary disc path, said imaginary passageway having said optical disc passed therethrough on said imaginary disc path, and in which said imaginary passageway has first and second imaginary surfaces each parallel to said imaginary disc path, and third and fourth imaginary surfaces each parallel to said center plane of said housing, in which said first surface of said second member is held in contact with one of said longitudinal extreme ends of one of said first and second imaginary surfaces of said imaginary passageway, in which said first surfaces of said longitudinal end portions of said first member are respectively held in contact with said longitudinal extreme ends of the other of said first and second imaginary surfaces of said imaginary passageway, and in which said third and fourth imaginary surfaces of said imaginary passageway are in spaced relationship with each other at a first distance equal to a diameter of said optical disc to be moved into and out of said housing, said first and second imaginary surfaces of said imaginary passageway being in spaced relationship with each other at a second distance larger in length than a thickness of said optical disc to be moved into and out of said housing, and smaller in length than twice of said thickness of said optical disc to be moved into and out of said housing.

37. An optical disc driving apparatus as set forth in claim 36, in which said third and fourth surfaces of said longitudinal ends portions of said first member of said regulating means constitute in combination guiding means for allowing said optical disc to be moved into and out of said housing on said imaginary disc path while preventing said optical disc from being moved in third and fourth directions each perpendicular to said imaginary center plane of said housing, and each parallel to said imaginary disc path.

38. An optical disc driving apparatus as set forth in claim 37, in which said urging means is adapted to assume two different operational states consisting of a first operational state to resiliently urging said second member of said regulating means toward said imaginary disc path with a first resilient force thereof under the condition that said conveyance of said optical disc to be moved in said loading direction is performed by said conveying means, and a second operational state to resiliently urging said second member of said regulating means toward said imaginary disc path with a second resilient force thereof which is smaller than said first resilient force under the condition that said conveyance of said optical disc to be moved in said ejection direction opposite to said loading direction is performed by said conveying means, and which further comprises setting means for having said urging means selectively assume said first and second operational states in response to results judged by said judging means.

39. An optical disc driving apparatus as set forth in claim 14, in which said second member of said regulating means is in spaced relationship with said loading slot 101a of said housing 101, in which said roller member of said conveying means is disposed between said second member of said regulating means and said loading slot 101a of said housing 101.

40. An optical disc driving apparatus as set forth in claim 33, in which said roller member of said conveying means is supported by said base member of said regulating means to be movable toward and away from said imaginary disc path, in which said regulating means includes at least one third member for preventing said roller member of said conveying means from being movable toward and away said imaginary disc path, said third member being supported by said base member of said regulating means to be movable toward and away from said imaginary disc path, and in which said urging means is adapted to resiliently urge said third member of said regulating means toward said imaginary disc path.

41. An optical disc driving apparatus as set forth in claim 40, in which said roller member of said conveying means includes supporting members for rotatably supporting said roller member, said supporting members respectively having outer surfaces, in which said third member of said regulating means respectively have projected portion having a surface to be brought into contact with said outer surface of said supporting members, in which said first surfaces of said longitudinal end portions of said first member of said regulating means are adapted to fail to bring said outer surfaces of said supporting members of said conveying means into contact with said surface of said third member of said regulating means with said surface of said single said optical disc brought into contact with said surface of said roller member of said conveying means under the condition that said conveyance of said single said optical disc to be moved in said loading direction is performed by said conveying means, and in which said first surfaces of said longitudinal end portions of said first member of said regulating means are adapted to bring said outer surfaces of said supporting members of said conveying means into contact with said surface of said third member of said regulating means with said surface of said plurality of partially overlapped said optical discs brought into contact with said surface of said roller member of said conveying means under the condition that said conveyance of said plurality of partially overlapped said optical discs to be moved in said loading direction is performed by said conveying means.

42. An optical disc driving apparatus as set forth in claim 41, in which said surface of said third member of said regulating means and said outer surface of one of said supporting members of said conveying means form in combination a first gap between said surface of said third member of said regulating means and said outer surface of one of said supporting members of said conveying means under the condition that said surface of said roller member of said conveying means is brought into contact with said surface of said single said optical disc to be moved into said housing, and said first surfaces of said longitudinal end portions of said first member of said regulating means being brought into contact with said peripheral edge of said single said optical disc to be moved into said housing, and in which said first gap between said surface of said third member of said regulating means and said outer surface of one of said supporting members of said conveying means is smaller than said thickness of said single said optical disc to be moved into and out of said housing.

43. An optical disc driving apparatus as set forth in claim 41, in which said second member of said regulating means is disposed in spaced relationship with said loading slot of said housing, in which said roller member of said conveying means is disposed between said second member of said regulating means and said loading slot of said housing, in which said first surface of said lever portion of said second member of said regulating means and said first and upright surfaces of one of said longitudinal end portions of said first member of said regulating means form in combination a groove having said outer peripheral portion of said single said optical disc passed therethrough, and in which said optical disc is released from said roller member of said conveying means without being held in contact with said surface of said roller member of said conveying means after said peripheral portion of said optical disc is passed through said groove under the condition that said conveyance of said optical disc to be moved in said loading direction is performed by said conveying means.

44. An optical disc driving apparatus as set forth in claim 43, in which said urging means is adapted to assume two different operational states consisting of a first operational state to resiliently urging said third member of said regulating means toward said imaginary disc path with a first resilient force thereof under the condition that said conveyance of said optical disc to be moved in said loading direction is performed by said conveying means, and a second operational state to resiliently urging said third member of said regulating means toward said imaginary disc path with a second resilient force thereof which is smaller than said first resilient force under the condition that said conveyance of said optical disc to be moved in said ejection direction opposite to said loading direction is performed by said conveying means, and which further comprises setting means for having said urging means selectively assume said first and second operational states in response to results judged by said judging means.

45. An optical disc driving apparatus as set forth in claim 44, in which said urging means is constituted by at least one urging member, said urging member being adapted to resiliently urge both said second member of said regulating means and said third member of said regulating means toward said imaginary disc path.

46. An optical disc driving apparatus as set forth in claim 45, in which said urging member of said urging means has a plate portion, and first and second lever portions respectively having a first free end held in engagement with said second member of said regulating means, and a second free end held in engagement with said third member of said regulating means, said first and second lever portions forming part of said urging member respectively having first and second fix ends each integrally formed with said plate portion forming part of said urging member.

47. An optical disc driving apparatus as set forth in claim 46, in which said setting means includes at least one base member supported by said housing, and at least one cam member slidably supported by said base member to be movable between first and second operational positions in association with said first and second operational states of said urging member of said urging means.

48. An optical disc driving apparatus as set forth in claim 47, in which said controlling means is adapted to control said cam member of said setting means to have said cam members of said setting means selectively assume said first and second operational positions based on results judged by said judging means.

49. An optical disc driving apparatus as set forth in claim 48, in which said controlling means is adapted to control said cam member of said setting means to have said cam member of said setting means assume said first operational position when said conveyance of said optical disc to be moved in said loading direction is performed by said conveying means, in which said conveying means is adapted to perform said conveyance of said optical disc to be moved in said loading direction, and in which said controlling means is adapted to control said roller member of said conveying means to have said roller member of said conveying means stop performing said conveyance of said optical disc when said judgment is made by said judging means as said conveyance of said optical disc to be moved into said housing is complete within said specific time interval by said conveying means based on results judged by said judging means.

50. An optical disc driving apparatus as set forth in claim 49, in which said controlling means is adapted to control said cam member of said setting means to have said cam member of said setting means assume said second operational position before controlling said roller member of said conveying means to have said roller member of said conveying means perform said conveyance of said optical disc to be moved in said ejection direction under the condition that said judgment is made by said judging means as said conveyance of said optical disc to be moved into said housing is not complete within said specific time interval by said conveying means based on results judged by said judging means.

51. An electronic apparatus for reproducing a information contained in an optical disc having an outer peripheral surface comprising a casing and an optical disc driving apparatus accommodated by said casing, said optical disc driving apparatus for driving an optical disc while reading out information contained in said optical disc, including: a housing formed with an loading slot having said optical disc passed therethrough; first detecting means for performing a detection of said outer peripheral surface of said optical disc to be moved into said housing; and second detecting means for performing a detection of said outer peripheral surface of said optical disc to be moved into said housing after said detection of said outer peripheral surface of said optical disc is performed by said first detecting means; and judging means for judging whether a single said optical disc or a plurality of partially overlapped said optical discs are passed through said loading slot of said housing based on results detected by said first and second detecting means, in which said housing has an imaginary center plane on which a center axis of said optical disc extends when said optical disc moves into said housing, an imaginary lateral plane perpendicular to said imaginary center plane, and said loading slot of said housing having an imaginary disc path on which said optical disc moves into said housing, said imaginary disc path being in perpendicular relationship with each of said imaginary center plane and said imaginary lateral plane, in which said first detecting means includes a pivotal member pivotably movable between angular positions thereof while being held in contact with said outer peripheral surface of said optical disc to be moved into said housing, and a detecting device for detecting said angular positions of said pivotal member, and in which said second detecting means includes an operation member accommodated in said housing in spaced relationship with said pivotal member of said first detecting means to be movable between operational positions thereof while being held in contact with said outer peripheral surface of said optical disc to be moved into said housing, a pivotal member to be pivotably movable between angular positions thereof in association with said operational positions of said operation member while being held in contact with said operation member, and a detecting device for detecting said angular positions of said pivotal member.

52. A vehicular electronic apparatus for reproducing information contained in an optical disc having an outer peripheral surface comprising a casing and an optical disc driving apparatus accommodated by said casing, said optical disc driving apparatus for driving an optical disc while reading out information contained in said optical disc, including: a housing formed with an loading slot having said optical disc passed therethrough; first detecting means for performing a detection of said outer peripheral surface of said optical disc to be moved into said housing; and second detecting means for performing a detection of said outer peripheral surface of said optical disc to be moved into said housing after said detection of said outer peripheral surface of said optical disc is performed by said first detecting means; and judging means for judging whether a single said optical disc or a plurality of partially overlapped optical discs are passed through said loading slot of said housing based on results detected by said first and second detecting means, in which said housing has an imaginary center plane on which a center axis of said optical disc extends when said optical disc moves into said housing, an imaginary lateral plane perpendicular to said imaginary center plane, and said loading slot of said housing having an imaginary disc path on which said optical disc moves into said housing, said imaginary disc path being in perpendicular relationship with each of said imaginary center plane and said imaginary lateral plane, in which said first detecting means includes a pivotal member pivotably movable between angular positions thereof while being held in contact with said outer peripheral surface of said optical disc to be moved into said housing, and a detecting device for detecting said angular positions of said pivotal member, and in which said second detecting means includes an operation member accommodated in said housing in spaced relationship with said pivotal member of said first detecting means to be movable between operational positions thereof while being held in contact with said outer peripheral surface of said optical disc to be moved into said housing, a pivotal member to be pivotably movable between angular positions thereof in association with said operational positions of said operation member while being held in contact with said operation member, and a detecting device for detecting said angular positions of said pivotal member.

* * * * *

UNITED STATES PATENT AND TRADEMARK OFFICE
CERTIFICATE OF CORRECTION

PATENT NO. : 7,210,150 B2
APPLICATION NO. : 10/675013
DATED : April 24, 2007
INVENTOR(S) : Kenji Urushihara et al.

It is certified that error appears in the above-identified patent and that said Letters Patent is hereby corrected as shown below:

In the Specifications:

Column 3, line 52: Delete the word "maimer"; replace with the word --manner--;

Column 39, line 48: Delete the word "AS"; replace with the word --A5--;

In the Claims:

Column 79, line 18: Insert the word --said-- before the word "optical"

Signed and Sealed this

Fourth Day of September, 2007

JON W. DUDAS
*Director of the United States Patent and Trademark Office*